United States Patent
Karabin

(10) Patent No.: US 8,734,622 B2
(45) Date of Patent: May 27, 2014

(54) HYDROGEN PRODUCING UNIT

(71) Applicant: Wood Stone Corporation, Bellingham, WA (US)

(72) Inventor: Tadeusz Karabin, Bellingham, WA (US)

(73) Assignee: Wood Stone Corporation, Bellingham, WA (US)

(*) Notice: Subject to any disclaimer, the term of this patent is extended or adjusted under 35 U.S.C. 154(b) by 0 days.

(21) Appl. No.: 13/686,254

(22) Filed: Nov. 27, 2012

(65) Prior Publication Data

US 2013/0126338 A1     May 23, 2013

Related U.S. Application Data

(63) Continuation of application No. 11/942,356, filed on Nov. 19, 2007, now Pat. No. 8,317,985.

(60) Provisional application No. 60/866,426, filed on Nov. 19, 2006.

(51) Int. Cl.
| | | |
|---|---|---|
| *C25B 15/08* | (2006.01) | |
| *C25B 9/20* | (2006.01) | |
| *C25B 1/08* | (2006.01) | |
| *C25B 9/06* | (2006.01) | |

(52) U.S. Cl.
CPC ............ *C25B 15/08* (2013.01); *C25B 9/206* (2013.01); *C25B 9/066* (2013.01); *C25B 1/08* (2013.01)
USPC ............ 204/237; 204/256; 204/270; 204/278

(58) Field of Classification Search
None
See application file for complete search history.

(56) References Cited

U.S. PATENT DOCUMENTS

| | | | |
|---|---|---|---|
| 1,222,809 A | | 4/1917 | Sebille |
| 2,717,872 A | * | 9/1955 | Zdansky ..................... 204/256 |
| 4,002,552 A | * | 1/1977 | Bunn et al. ................ 204/228.2 |
| 4,077,863 A | * | 3/1978 | Nasser ........................ 204/268 |
| 4,081,656 A | * | 3/1978 | Brown ..................... 219/137.31 |
| 4,137,145 A | | 1/1979 | Wallace |
| 4,371,433 A | * | 2/1983 | Balko et al. ............... 204/230.2 |
| 4,431,508 A | | 2/1984 | Brown et al. |
| 4,457,816 A | | 7/1984 | Galluzzo et al. ............ 205/630 |
| 4,590,135 A | | 5/1986 | Warszawski et al. ........ 429/460 |
| 4,604,171 A | | 8/1986 | Morris et al. |
| 4,654,136 A | | 3/1987 | Dang et al. |
| 4,718,997 A | * | 1/1988 | Grimes et al. ............ 204/230.2 |
| 4,720,331 A | | 1/1988 | Billings |
| 4,729,822 A | * | 3/1988 | James ........................ 204/255 |
| 4,785,322 A | * | 11/1988 | Harrison et al. ............ 396/106 |
| 5,004,543 A | | 4/1991 | Pluskal et al. |
| 5,244,558 A | * | 9/1993 | Chiang ....................... 204/241 |

(Continued)

FOREIGN PATENT DOCUMENTS

WO    WO 98/32900 A1 *  7/1998

*Primary Examiner* — Harry D Wilkins, III

(74) *Attorney, Agent, or Firm* — Dwayne E. Rogge; Schacht Law Office, Inc.

(57) ABSTRACT

An electrolyte electrolyzer adapted to create hydrogen and oxygen from electrolyte fluid at or near atmospheric pressure. The electrolyzer is comprised in a preferred form of a plurality of cells which collectively create oxygen and hydrogen chambers separated by an ion permeable membrane. The electrolyzer is further defined by a passive electrode that is electrically interposed between a charged anode and cathode. The chambers defined by the cells are in communication with oxygen and hydrogen supply lines to transfer the hydrogen gas from the unit.

9 Claims, 46 Drawing Sheets

(56) References Cited

U.S. PATENT DOCUMENTS

| | | | |
|---|---|---|---|
| 5,614,069 A * | 3/1997 | Lin | 204/268 |
| 5,628,887 A * | 5/1997 | Patterson et al. | 204/241 |
| 5,667,647 A | 9/1997 | Suga et al. | |
| 5,783,051 A | 7/1998 | Hirai et al. | |
| 6,036,827 A | 3/2000 | Andrews et al. | |
| 6,165,331 A | 12/2000 | Hughes | |
| 6,214,181 B1 | 4/2001 | Iacopetti et al. | |
| 6,254,741 B1 | 7/2001 | Stuart et al. | |
| 6,395,154 B1 * | 5/2002 | Stuart et al. | 204/253 |
| 6,395,155 B1 | 5/2002 | Bressel et al. | |
| 6,569,298 B2 | 5/2003 | Merida-Donis | |
| 6,630,061 B2 * | 10/2003 | Lee et al. | 204/270 |
| 6,740,436 B2 | 5/2004 | Chou et al. | |
| 6,773,561 B1 | 8/2004 | Noaki et al. | |
| 6,852,205 B1 | 2/2005 | Toyoshima et al. | |
| 6,977,120 B2 * | 12/2005 | Chou et al. | 429/422 |
| 7,510,633 B2 * | 3/2009 | Shimko et al. | 204/260 |
| 2003/0216045 A1 | 11/2003 | Wang et al. | |
| 2004/0118677 A1 | 6/2004 | Streckert et al. | |
| 2005/0072688 A1 | 4/2005 | Meltser | |
| 2006/0049039 A1 * | 3/2006 | Brand et al. | 204/237 |

* cited by examiner

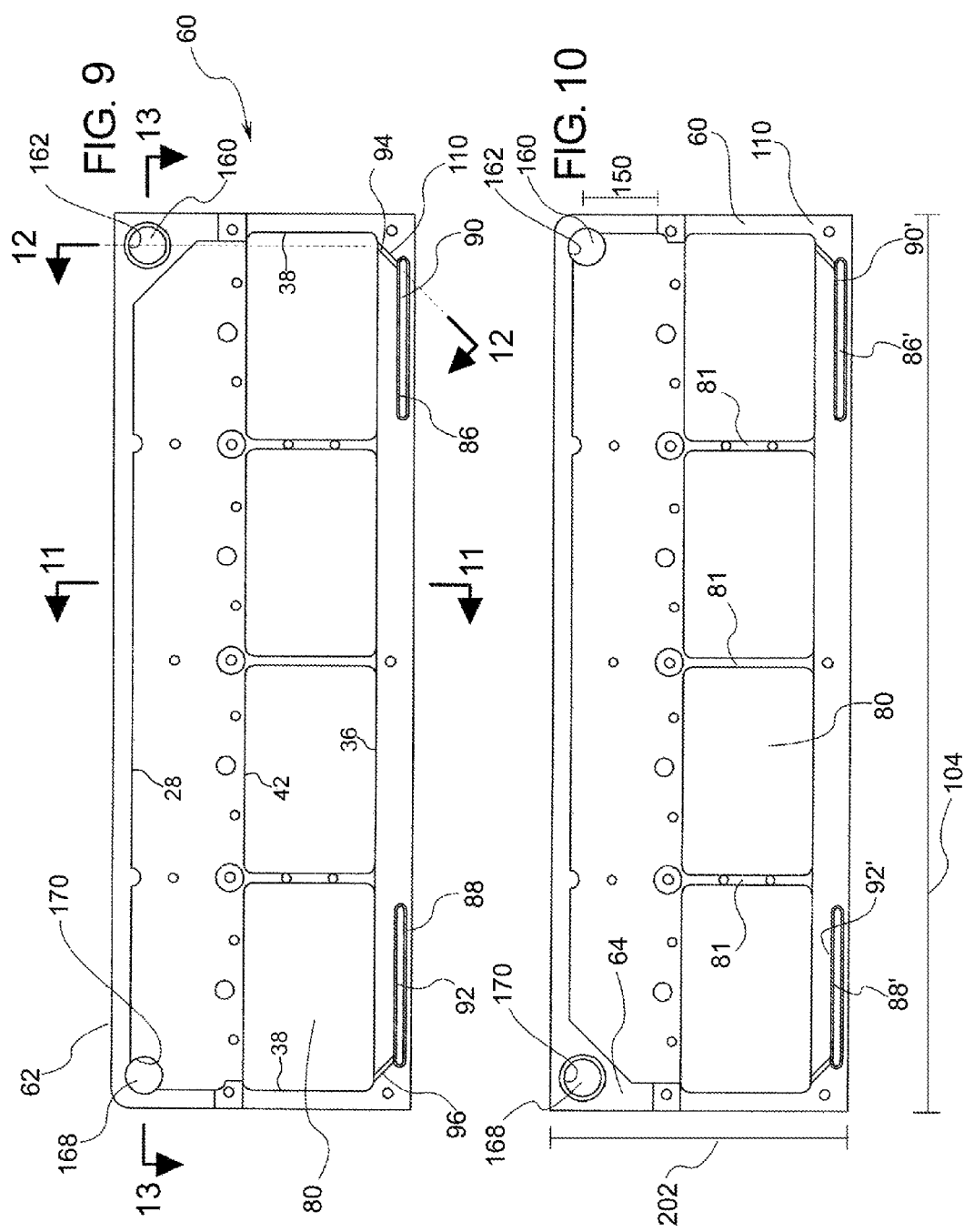

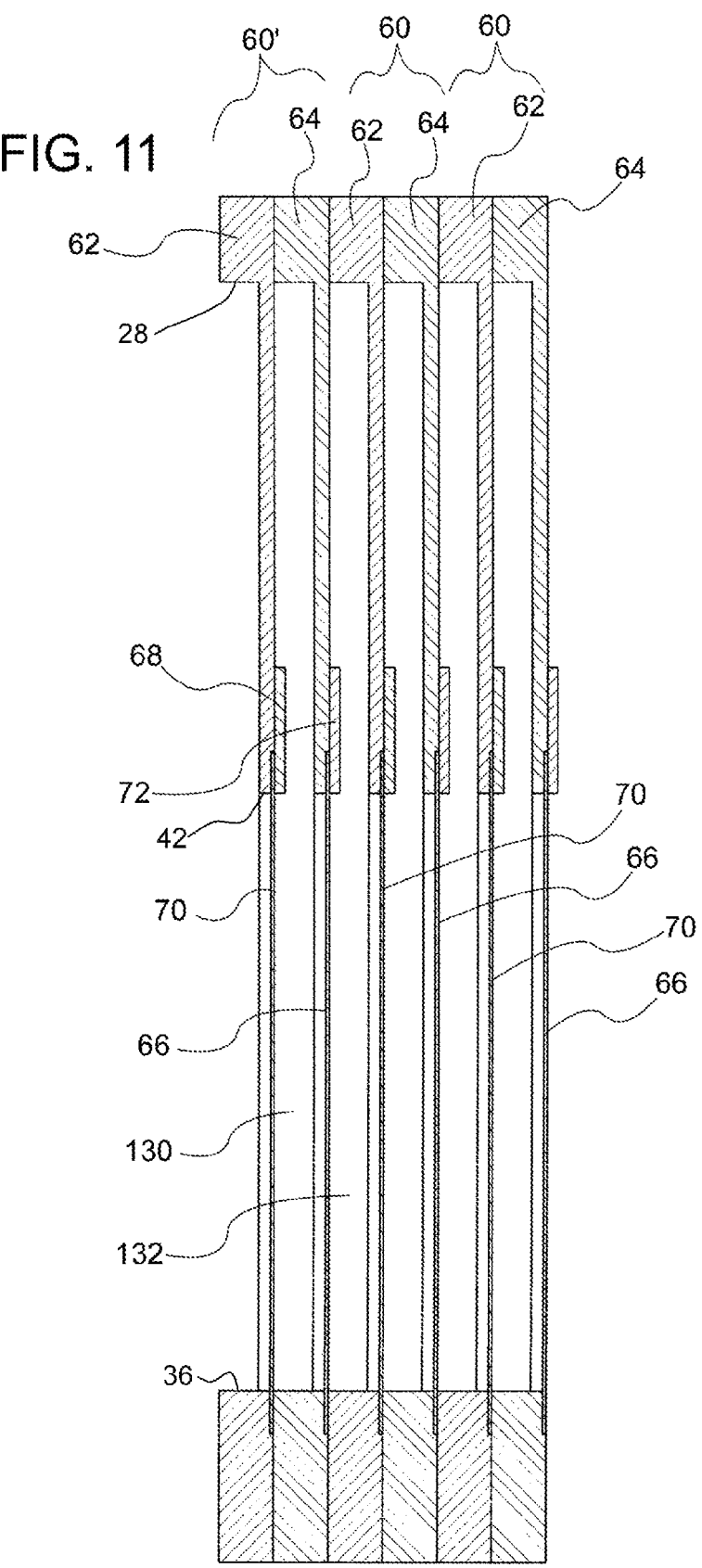

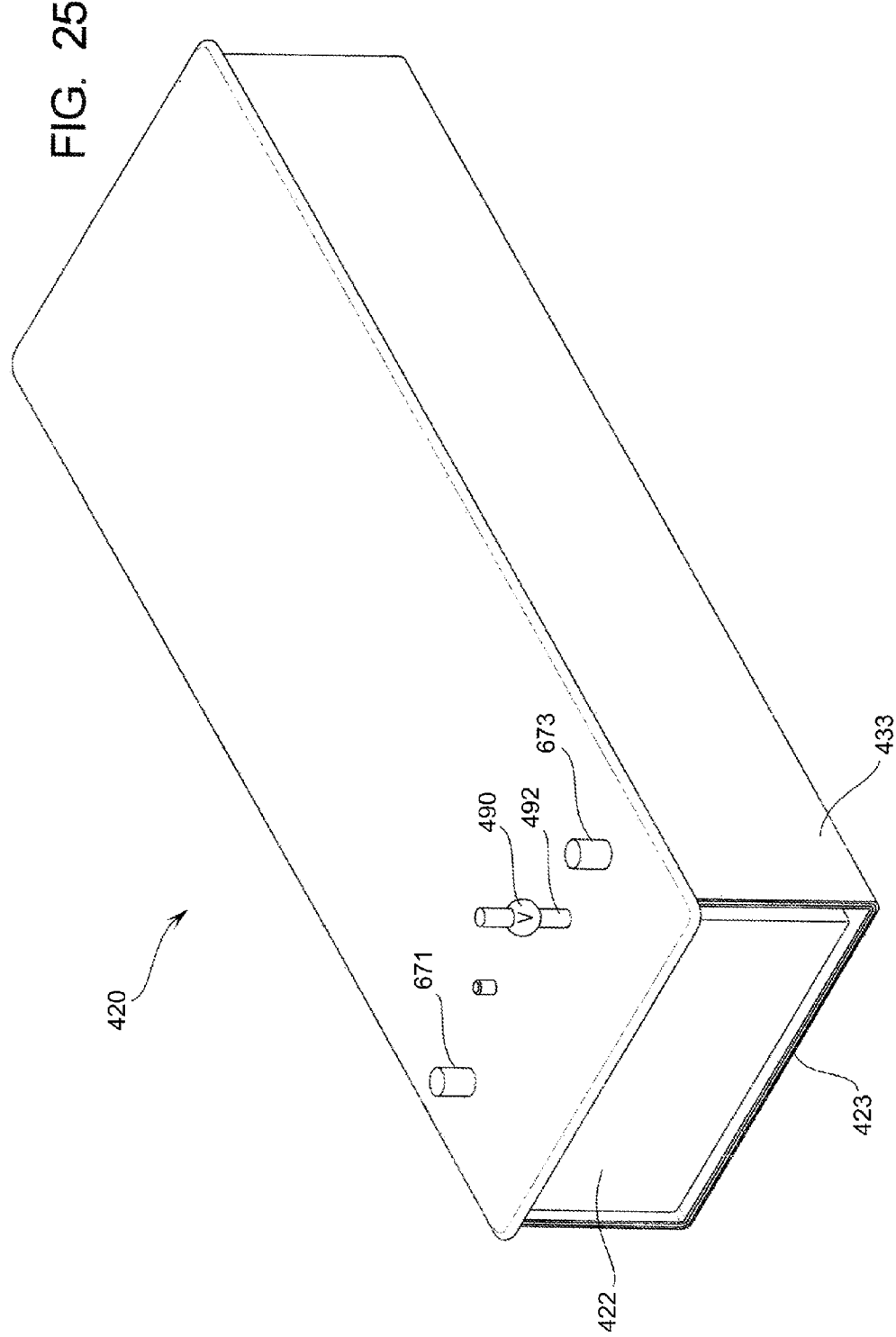

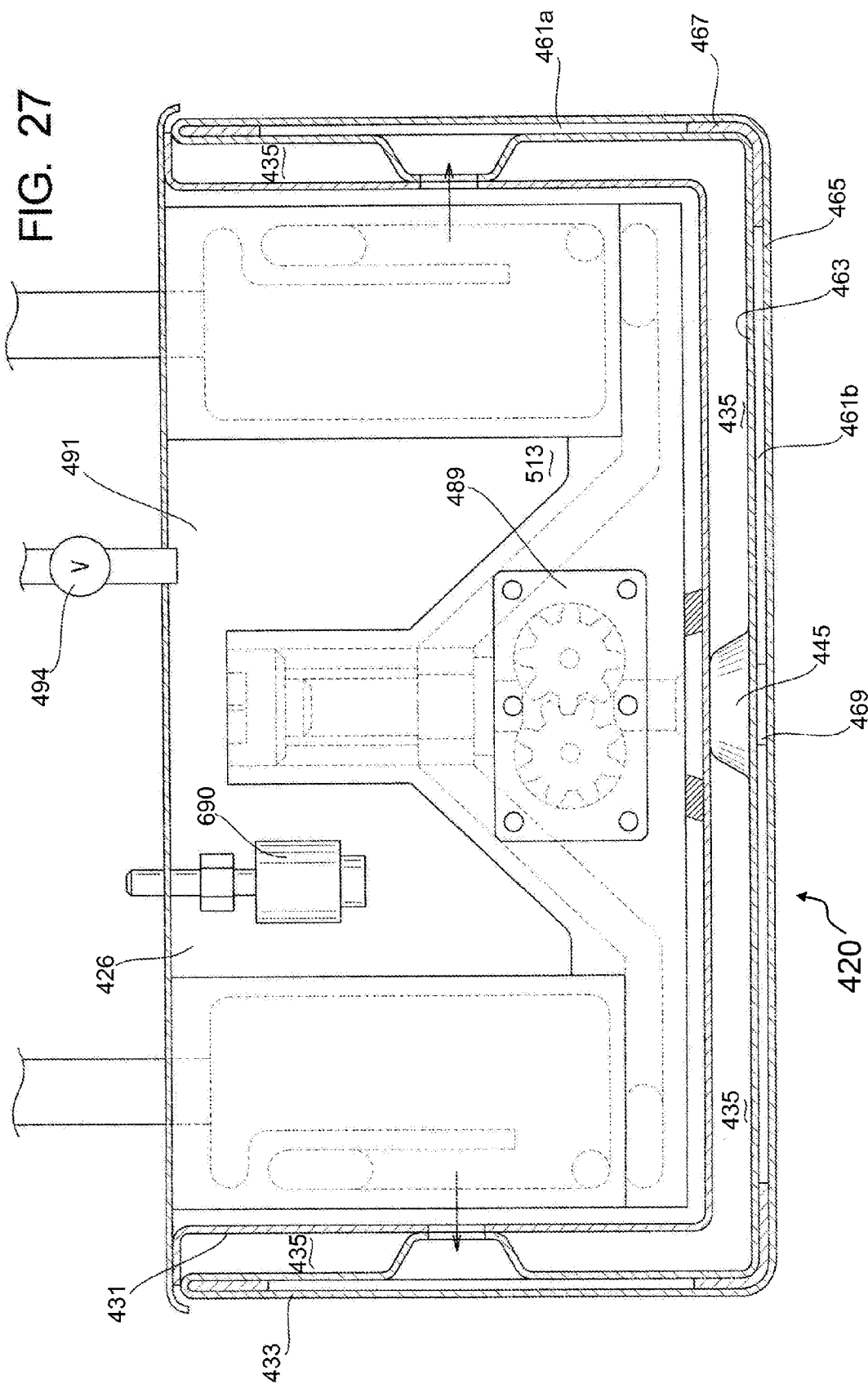

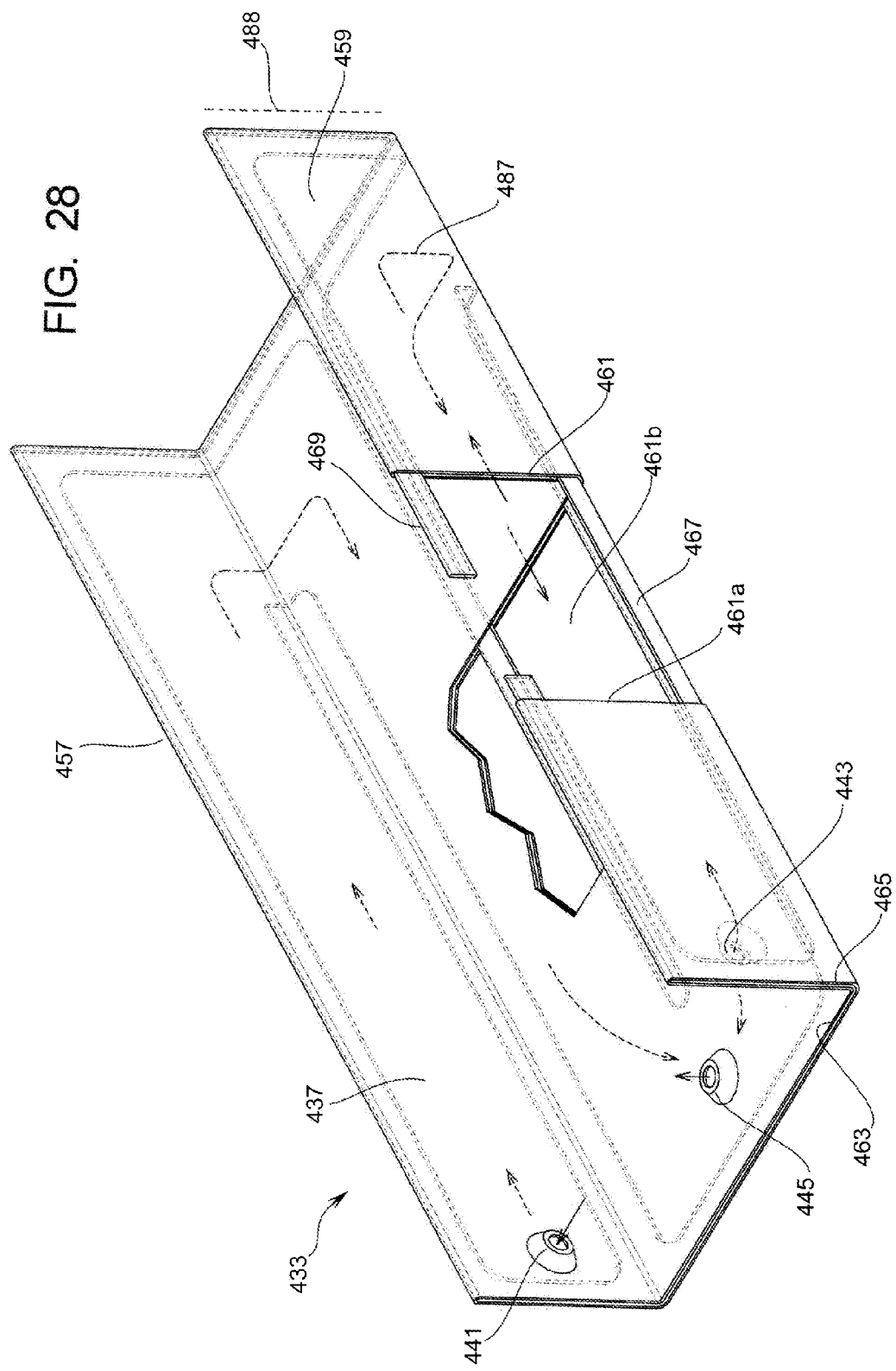

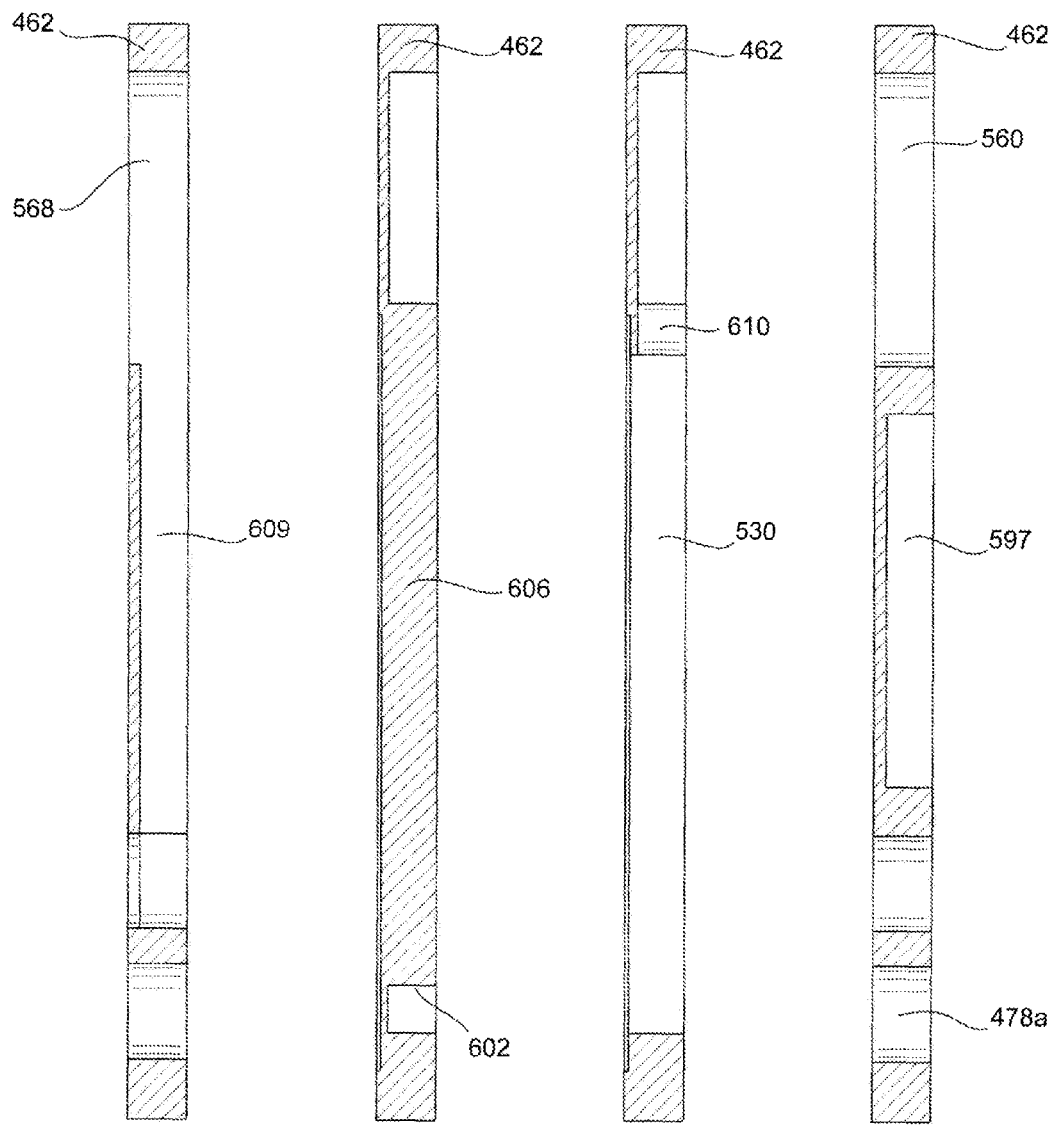

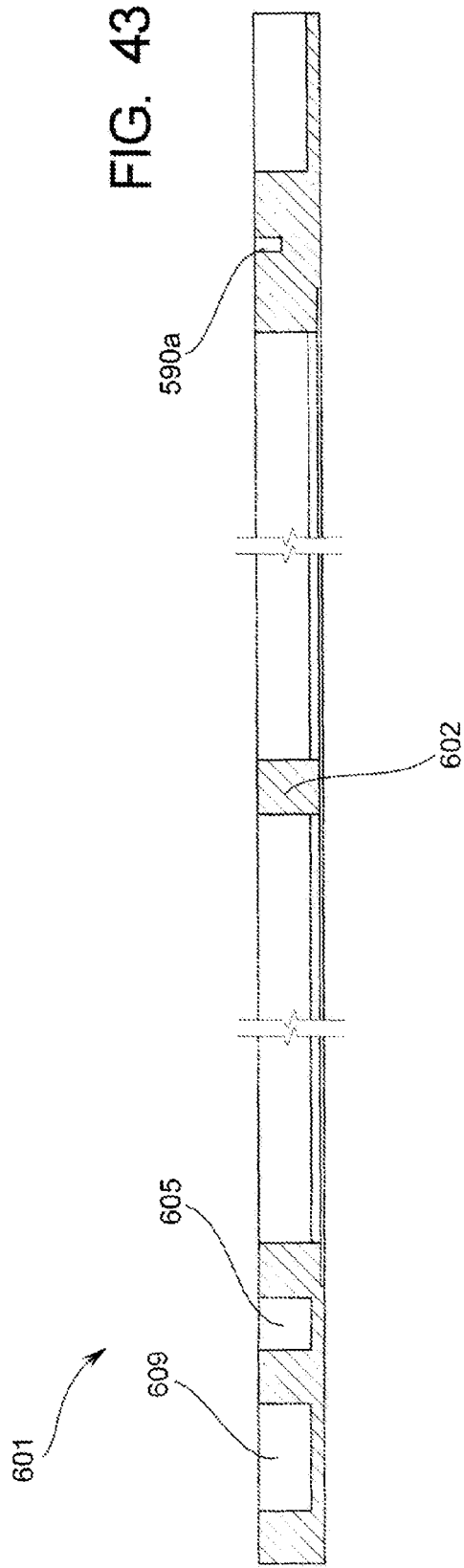

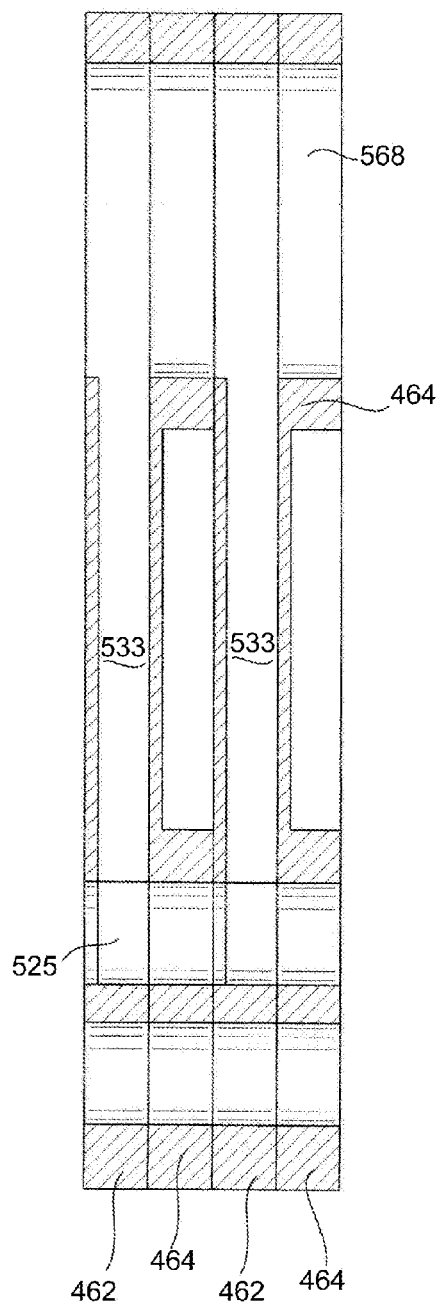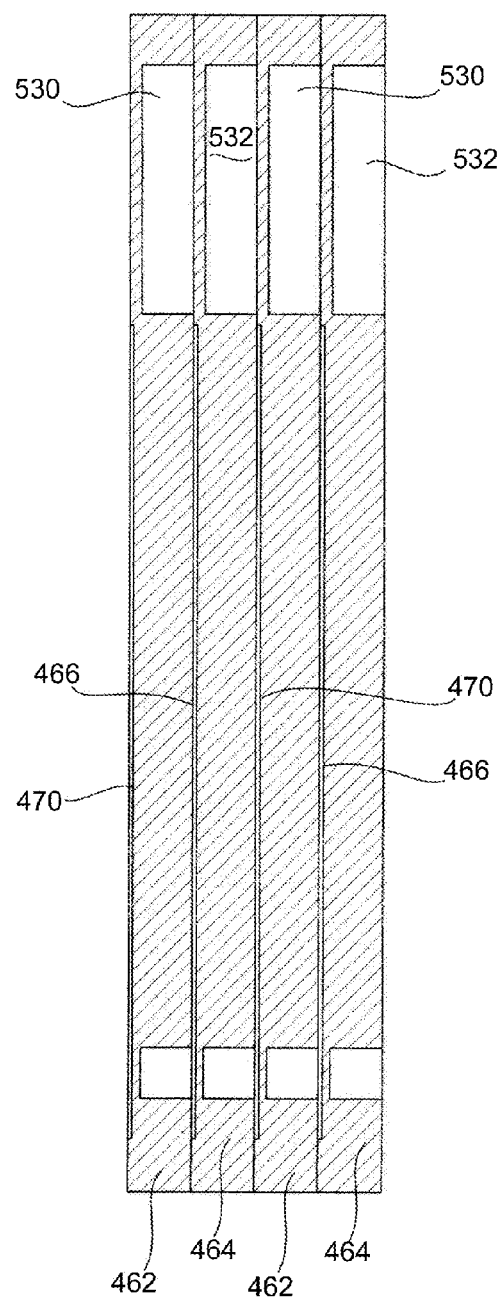

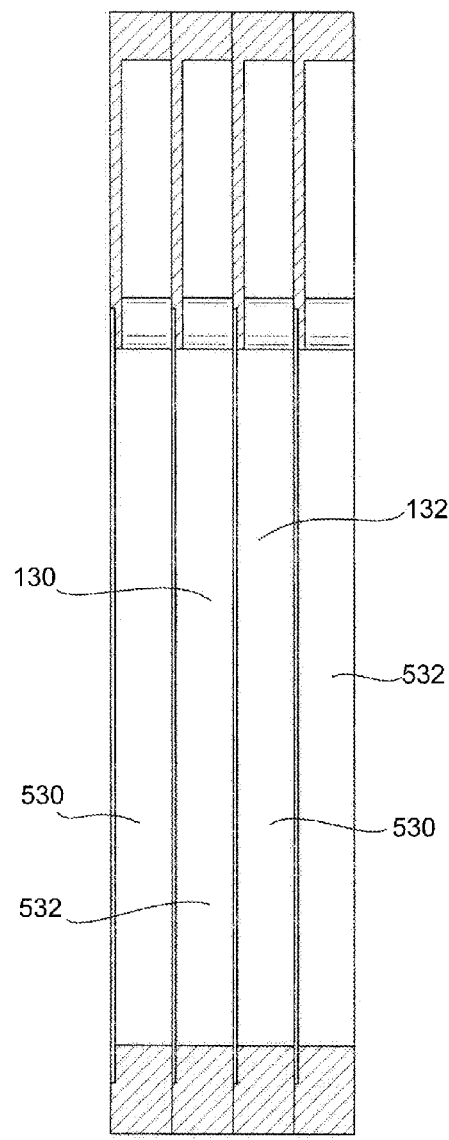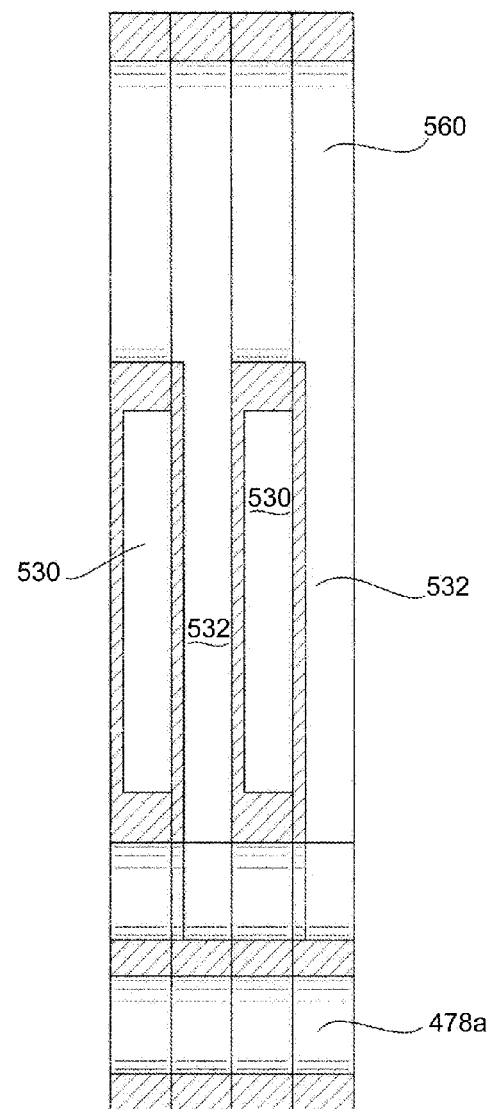

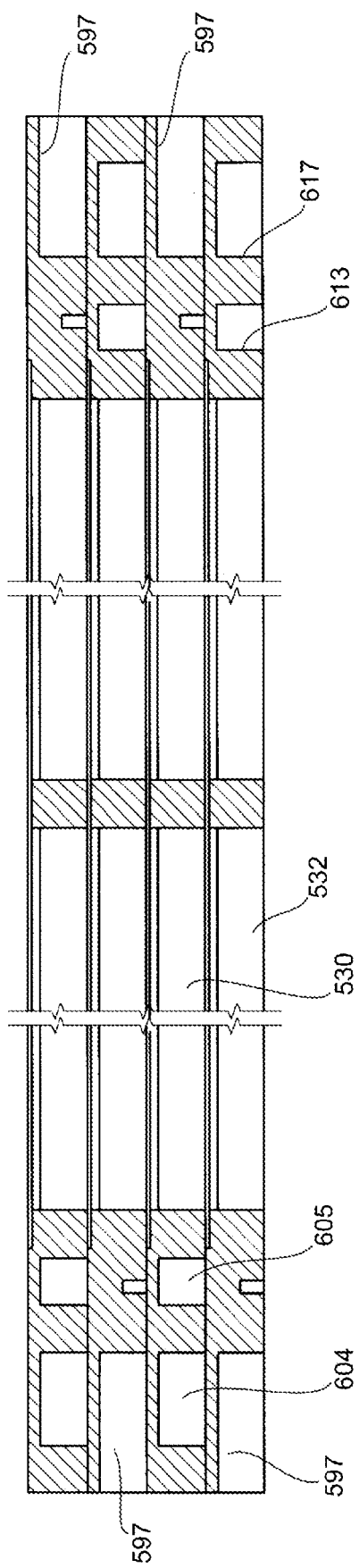

HYDROGEN PRODUCING UNIT

RELATED APPLICATIONS

This application claims priority benefit of U.S. Ser. No. 11/942,356 filed Nov. 19, 2007 incorporated herein by reference now U.S. Pat. No. 8,317,985, which in turn claims priority benefit of U.S. Provisional Ser. No. 60/866,426, filed Nov. 19, 2006 also incorporated herein by reference.

BACKGROUND OF THE DISCLOSURE

Electrolysis has been utilized in many forms for separating water into molecules of hydrogen and oxygen to create these elements in gaseous form. Many prior art methods of engaging in electrolysis are executed by way of pressurized water chambers with electrolyte solution. There are certain electrolysis devices known as bipolar electrochemical cell type electrolysis devices, which apply a direct current voltage between outermost electrodes that are in electronic communication with electrolyte fluid. These devices employ a plurality of electrode plates which are positioned interposed between the outer electrodes, and effectively act as bipolar electrode plates with one side operating as an anode and one side operating as a cathode.

SUMMARY OF THE DISCLOSURE

Disclosed below is an electrolyzer adapted to create gas. The electrolyzer is comprised of a plurality of cells that comprise a first frame portion and a second frame portion. In one form the first frame portion has a first longitudinal side and a recess area and a surface defining a lower open region. The second frame portion has a second recess area and a surface defining a second lower open region. A passive electrode is positioned adjacent to the first lower open region and positioned adjacent to the first frame portion creating a first chamber region.

The passive electrode is further in engagement with the second frame portion where the passive electrode is in engagement with the second lower open region to partially define a second chamber region.

It should be noted that a charged cathode is positioned on one end of the unit and an opposing anode is positioned at the opposing end of the unit with the passive electrodes electrically interposed therebetween.

A membrane is positioned on the second frame portion on an opposing side of the second lower open region as to the location of the passive electrode. The membrane is adapted to allow ions to pass therethrough but inhibit passage of gaseous bubbles through the membrane. The membrane is operatively configured to engage the first longitudinal side of the first frame portion for defining the first chamber region. The first chamber region has an upper chamber portion in communication with a first conduit for extracting an electrolyzed gas therefrom. The second chamber region has an upper chamber portion in communication with a second conduit for removal of the gas formed in the second chamber region. The first and second chamber regions are not in communication with one another where gas formed in the first and second chamber regions are not in communication with one another.

In other forms the electrolyzer has the first and second conduits in communication with a water replenishment and hydrogen removal system. The water replenishment and hydrogen removal system can comprise an oxygen chamber and a hydrogen chamber where hydrogen dispersion orifices are positioned in a lower portion of the hydrogen chamber beneath where a fluid is to be contained therein. In one form the oxygen chamber and the hydrogen chamber are in communication at lower passage positioned beneath where the fluid is to be contained therein. A preferred fluid in the chambers is an electrolyzer fluid that is in fluid communication with the plurality of cells.

With regard to the membrane of the cell, in one form it is comprised of a hydrophobic material. The hydrophobic material has a tendency to maintain the surface tension of the water surrounding the hydrogen and oxygen bubbles.

To define the electrolyzer in another fashion it comprises a housing adapted to house electrolyte fluid therein. The housing comprising a plurality of cells, and has a first chamber defined by a first ion permeable membrane and a first electrode. Further a second chamber is defined by the longitudinally rearward portion and a longitudinally forward portion of a second ion permeable membrane, the second chamber being in communication with a longitudinally extending hydrogen passage and first chamber being in communication with an oxygen longitudinally extending passage. The housing having a longitudinal, vertical and lateral axes a rearward longitudinal location and a forward longitudinal location. A cathode is positioned in the rearward longitudinal location and an anode positioned in the forward longitudinal location with a plurality of first and second chambers positioned therebetween, the plurality of first and second chambers being filled with an electrolyte solution whereby gas formed in the rearward and forward longitudinal portions of the electrode produces hydrogen which is passed through the hydrogen longitudinally extending passage and the forward portion of the electrode produces oxygen which passes through the oxygen laterally extending conduit and the first and second chambers are not in gaseous communication with one another.

In one form the electrolyzer comprises an electrolyte containment chamber operatively configured to contain electrolyte solution therein. The electrolyte containment chamber comprises a plurality of electrodes and ion permeable membranes that are interposed amongst one other. The plurality of electrodes and ion permeable membranes defining in part the oxygen and hydrogen chambers.

A cathode and an anode are positioned at first and second longitudinal locations within the electrolyte containment chamber. A first electrolyte supply channel in communication with a first lateral region of the hydrogen and oxygen chambers and a second electrolyte supply channel in communication with a second lateral region of the hydrogen and oxygen chambers, a pump operatively configured to bias the electrolyte solution from the first electrolyte supply channel through a lower portion of the hydrogen and oxygen chambers to the second lateral region through the second electrolyte supply channel, whereas the ion permeable membrane allows for electrical communication of the electrolyte solution therethrough between the forward and rearward adjacent electrodes which the ion permeable membrane is interposed between.

The disclosure recites herein a hydrogen gas producing unit adapted to produce hydrogen from water and having a longitudinal, vertical and lateral axes. The hydrogen gas producing unit comprises a hydrogen gas producing portion comprising a plurality of gas production cells, where the gas production cells comprising first and second chamber regions having lower and upper region portions. The first and second chamber regions are separated from one another for each cell in part by an electrode and by an ion permeable membrane. The first and second chamber regions having a width dimension in the lateral axis greater than the height dimension in the vertical axis direction.

A re-circulatory channel is provided and positioned in communication with the first and second chambers, the first chambers of the plurality of cells having an upper portion in communication with a first passage, and the second chamber being in communication with a second passage.

A fluid replenishment system is provided and has a fluid compartment having a fluid height sensor measuring the level of fluid therein, the switch and the fluid compartment being in fluid communication with the first and second chambers of the plurality of cells, the gas exiting from the first chamber being hydrogen gas and being deposited through a fluid trap and extracted through a gas extractor. A power control system provides direct current to the anode and cathode to be conducted between the cathode and the anode.

The electrolyzer in one form can be arranged where a second conductor is interposed between the anode and cathode where when the resistance is greater through the plurality of cells, the second conductor is in electrical communication with the either the anode or the cathode so that electrical current only passes through a limited number of the plurality of cells.

In one form the recirculatory passages are positioned beneath the first and second chambers. The first and second frame portions can have a lower first and second longitudinally extending conduit adapted to pass electrolyte fluid therethrough, where a surface defining an opening defines the first and second electrolyte re-circulatory paths. In this form the cross-sectional area of the electrolyte supply path can be less than 5% of the cross-sectional area of the hydrogen chamber in the longitudinal direction. Each of the cells can have a surface that collectively creates a manifold structure for distributing electrolyte fluid through each of the oxygen and hydrogen cells where the fluid travels in a lateral direction.

Other attributes and variations of the hydrogen producing unit are described herein.

BRIEF DESCRIPTION OF THE DRAWINGS

FIG. 9 is a front view of itself;

FIG. 10 shows a front view of one of the components to comprise a cell;

FIG. 11 is taken along line 11-11 of FIG. 9 and shows a plurality of cells in a cross-sectional view;

FIG. 25 shows another embodiment of an electrolyzer in an isometric view;

FIG. 27 shows a cross-sectional view taken along line 27-27 of FIG. 26 showing the control system;

FIG. 28 shows an isometric view of the outer containment structure which shows the path of the various cooling channels for cooling the operating fluid of the unit which in one form is an electrolyte solution;

FIG. 39 is taken along line 39-39 of FIG. 33 showing a portion of the oxygen passageway;

FIG. 40 is taken along line 40-40 of FIG. 33 showing the central portion of the cell and the separating member;

FIG. 41 is a cross-sectional view taken at line 41-41 of FIG. 33 showing a portion of the oxygen subchamber;

FIG. 42 is taken along line 42-42 of FIG. 33 showing the hydrogen passageway;

FIG. 43 is taken along 43-43 of FIG. 33 showing a sectional top view in part with broken lines of the oxygen subchamber;

FIG. 47 is a sectional view taken along line 47-47 of FIG. 46 showing the oxygen passageway;

FIG. 48 is a sectional view taken along line 48-48 of FIG. 46 showing the central region of a cell;

FIG. 49 is a sectional view taken along line 149-49 of FIG. 46 showing the hydrogen subchamber;

FIG. 50 is a sectional view taken along line 50-50 of FIG. 46 showing the hydrogen passageway;

FIG. 51 is a sectional view taken along 51-51 of FIG. 46 showing a top sectional view of a plurality of cells, including first and second cell section members.

DESCRIPTION OF THE PREFERRED EMBODIMENTS

Figure 1:
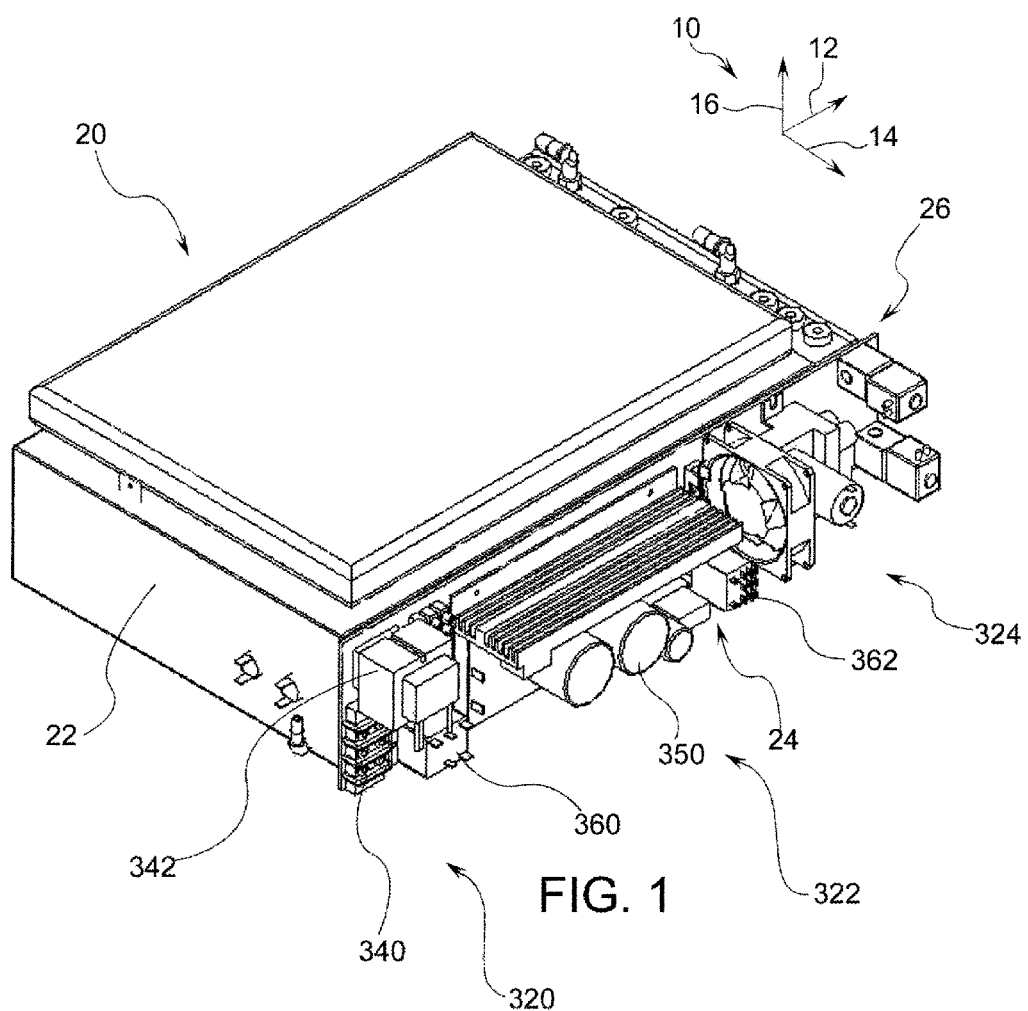
FIG. 1 shows an isometric view of the electrolyzer showing the rearward portion, namely the power electronic section.

In FIG. 1, there is an isometric view of an electrolyzer 20. In general, the electrolyzer comprises a hydrogen/oxygen-producing portion 22, a power control system 24, and a water replenishment and hydrogen removal portion 26. To aid in the description of the electrolyzer 20, an axis system is defined which is indicated at 10, where the axis 12 indicates a longitudinal direction and the axis 14 generally indicates a lateral direction. Further, the axis 16 indicates a vertical direction. Of course the axis system 10 is not intended to limit the disclosed apparatus to any specific orientation, but rather is used to generally aid in the description of the various forms of the disclosed embodiment.

In general, the hydrogen producing portion 22 produces hydrogen by way of electrolysis, and as described herein. The electrolysis process is executed by way of a serial electrolysis type arrangement with the first and second electrodes having anode and cathode voltage differential and a plurality of intermediate cathodes. The incremental voltage difference drop from the cathode to the anode is divided by the number of electrodes 70 (see FIG. 8) so the voltage drop between two adjacent electrodes is sufficient (e.g. approximately 2 volts) to allow electrolysis to occur.

Figure 4:
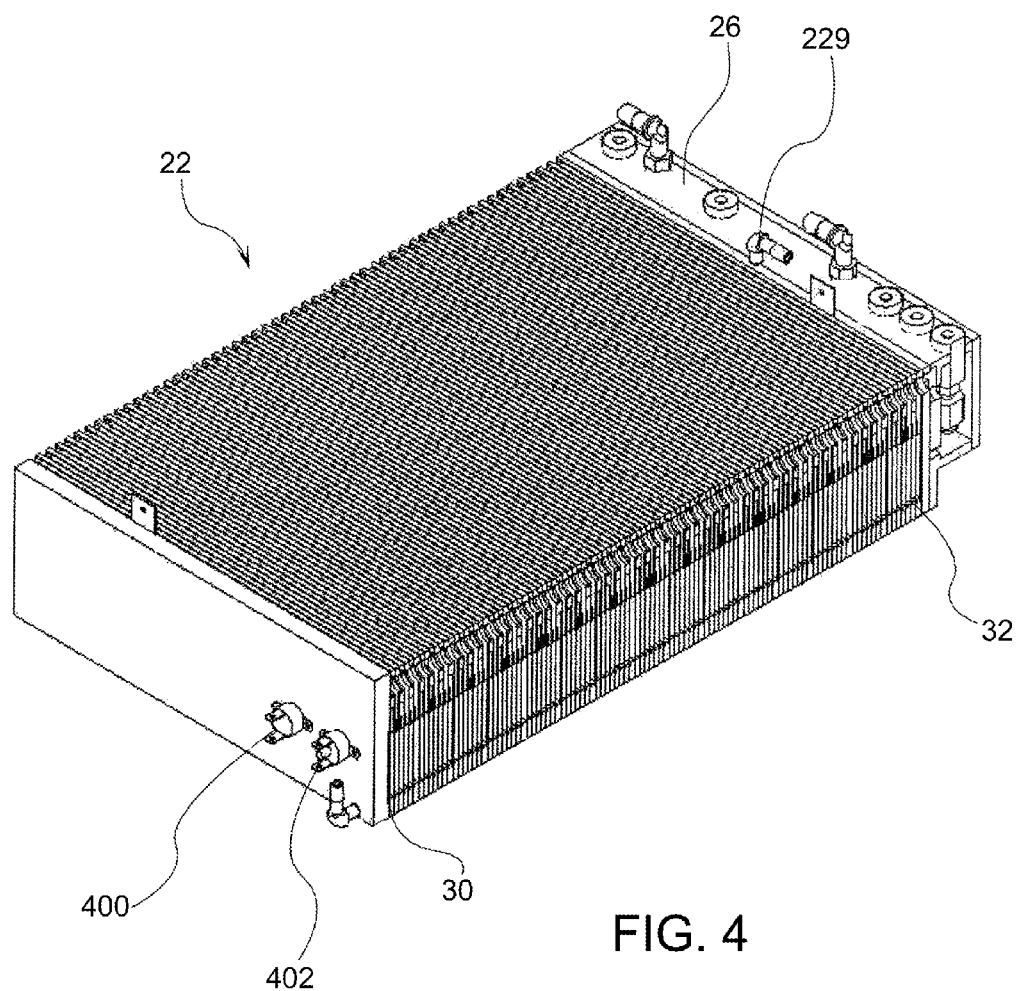
FIG. 4 shows another isometric view of the hydrogen producing portion.
Figure 5A:
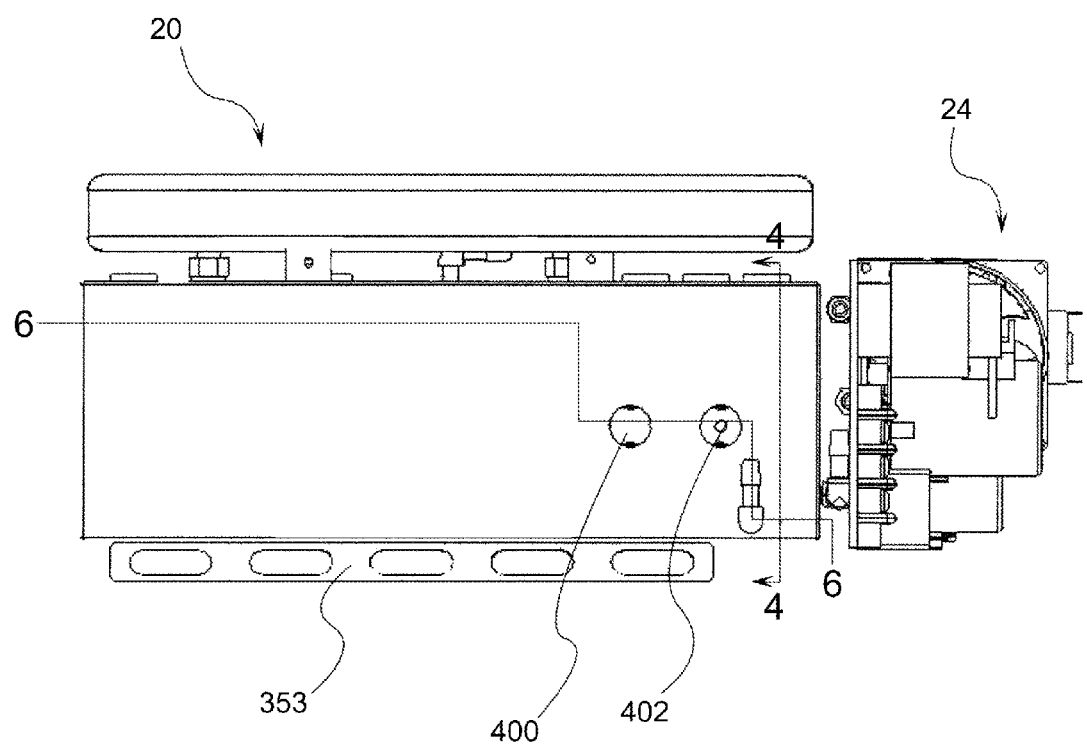
FIG. 5A shows a view taken along the longitudinal axis of the unit.
Figure 6:
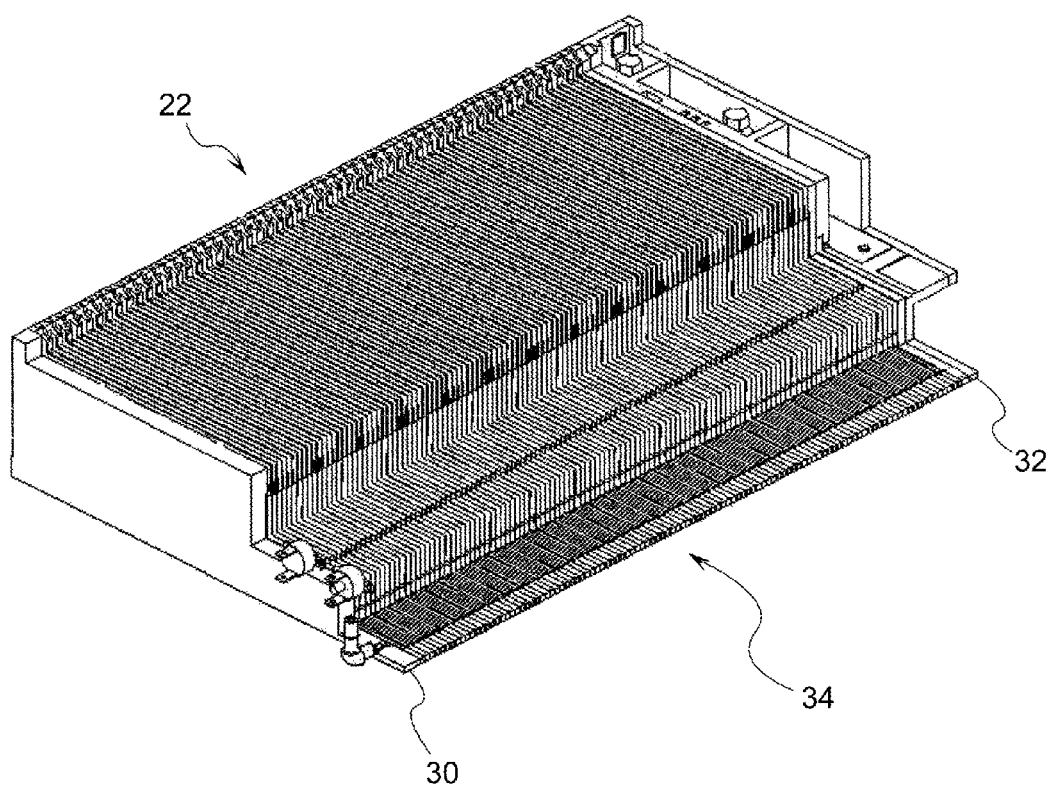
FIG. 6 is taken at line 6-6 of FIG. 5A and shows the plurality of hydrogen producing cells in a broken cross-section.
Figure 7:
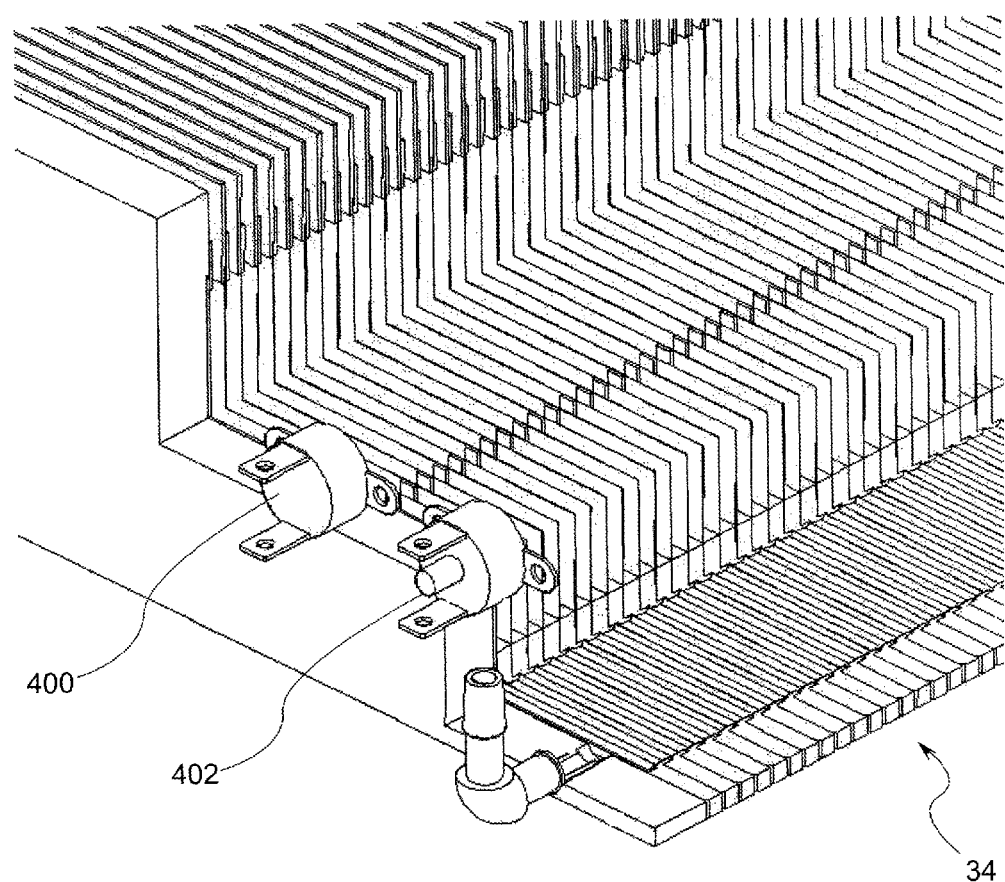
FIG. 7 shows a close up view of the end portion of the broken view of the plurality of cells.

As shown in FIG. 6, there is a partial sectional view of the hydrogen-producing portion taken along the brake line 4-4 of FIG. 5A. In general, the hydrogen producing portion 22 comprises an anode 30 and a cathode 32 which are on opposing ends of the unit. FIGS. 6 and 7 show the cross-sectional view of the plurality of cells 34 described further herein. In general, a cell is shown in an exploded view in FIG. 8 and comprises a hydrogen producing unit which is interposed between the anodes and cathodes 30 and 32 as shown in FIG. 4. The electrolyzer portion has a width dimension which is greater than the height dimension to facilitate the production of hydrogen at atmospheric or near atmospheric pressures. Further, an electrolyte is recirculated through the recirculatory channels in the lower portion of the unit at 90 and 92 (see FIG. 8), further described herein.

Figure 3:
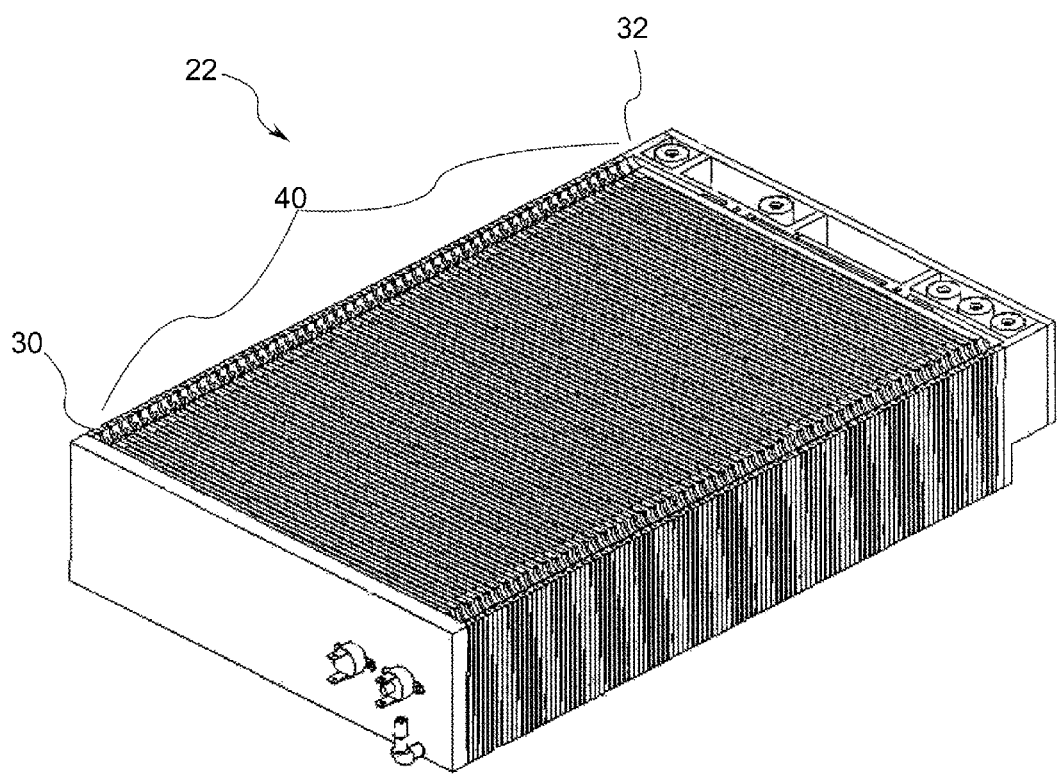
FIG. 3 shows the hydrogen producing portion of the electrolyzer.

In FIG. 3, there is a view of the hydrogen producing portion 22. Between the anode 32 and the cathode 30 is a cell section 40 which comprises a plurality of cells 60 described further herein (see FIG. 8). FIG. 3 shows a partial cut away view of the unit where the plurality of cells in the cell section 40 are stacked interposed between the anode 30 in the cathode 32. FIG. 4 is a similar view to that of FIG. 3 except the upper portion of the water replenishment and hydrogen removal portion 26 is shown.

Figure 8:
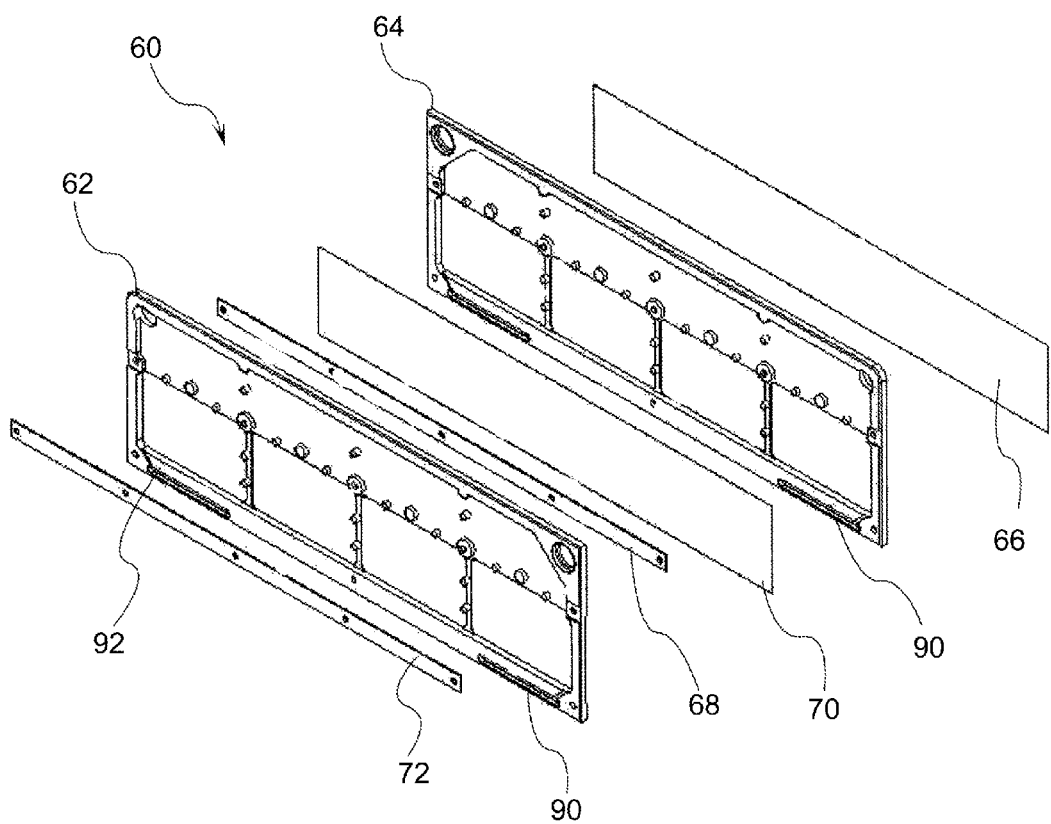
FIG. 8 shows an exploded view of a cell structure which provides for hydrogen and oxygen production chambers.

Referring ahead now to FIG. 8, there is shown an exploded view of a cell 60. In general, the cell 60 in one form is comprised of a first section 62 and a second section 64. The first and second sections 62 and 64 are connected together where a membrane 66 is attached in one form to the second section 64 by an attachment strip 72 which is described further herein. Further, the electrode 70 is positioned on the first section 62 by the attachment strip 68 and is located adjacent to the second section 64.

As shown in FIG. 9, the first section 62 is shown a frontal view. In general, the cells 60 comprise a central chamber region 80. The central chamber region is divided into subchambers each one respectively producing hydrogen having hydrogen and oxygen produce therein in an intermittent order described further herein. Each of these subchambers is separated by either the membrane 66 or the electrode 70 of FIG. 8. It should be noted that by removing these barriers, there is clear access through the central chamber region 80 which as shown in FIGS. 9 and 10 is comprised of in one form for section laterally across the span of the cell 60. It should be further noted that first and second electrolyte supply channels 86 and 88 are provided in the lower portion of the cell 60. Each of the central chamber regions 80 is defined by a lower inner face 36, an upper inner face 28, and opposing lateral inner faces 38. In one embodiment, each of the cells 60 also comprise a downward extension having a lower edge 42. As seen in FIG. 11, the upper edge 44 of the membrane 66 and/or electrode 70 is attached to this downward extension.

Figure 12:
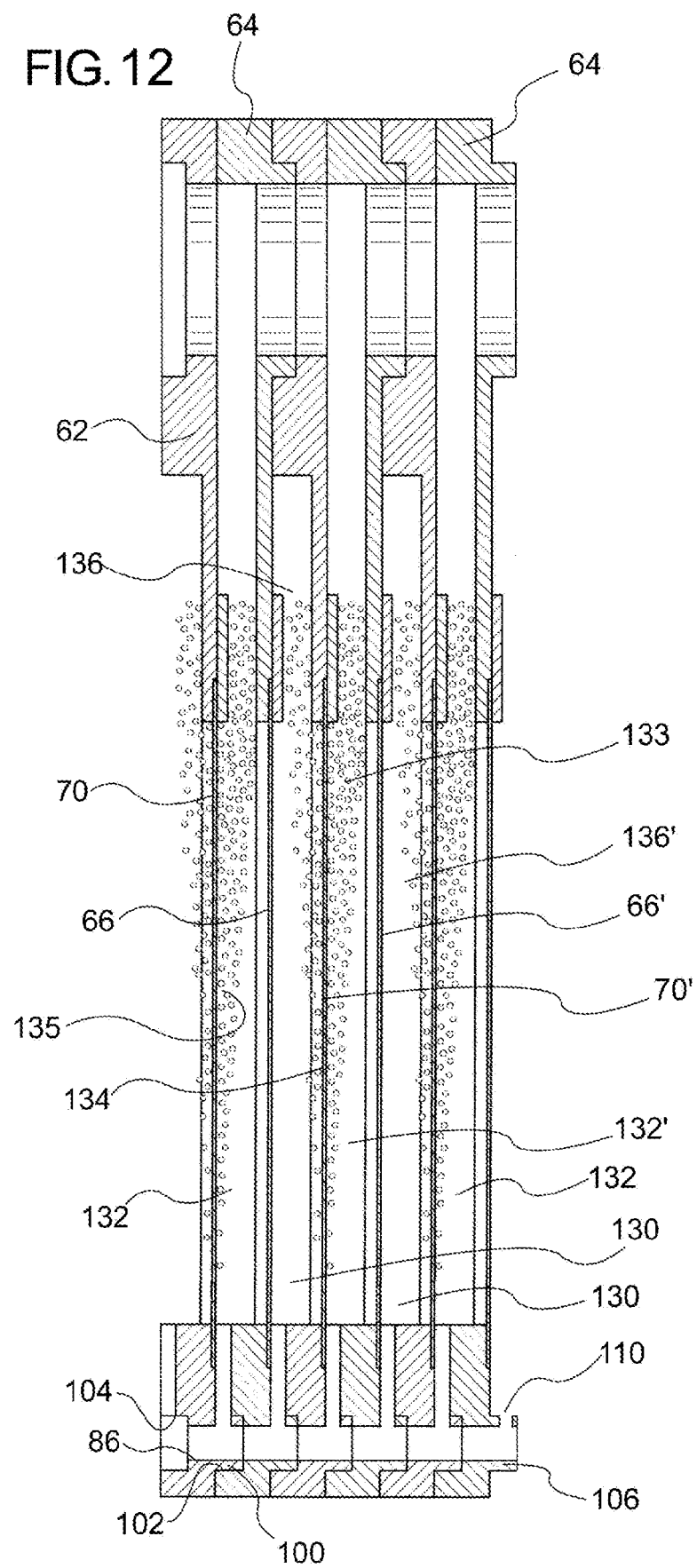
FIG. 12 is taken along line 12-12 of FIG. 9 illustrating the production of hydrogen and oxygen in separate chambers.
Figure 14:
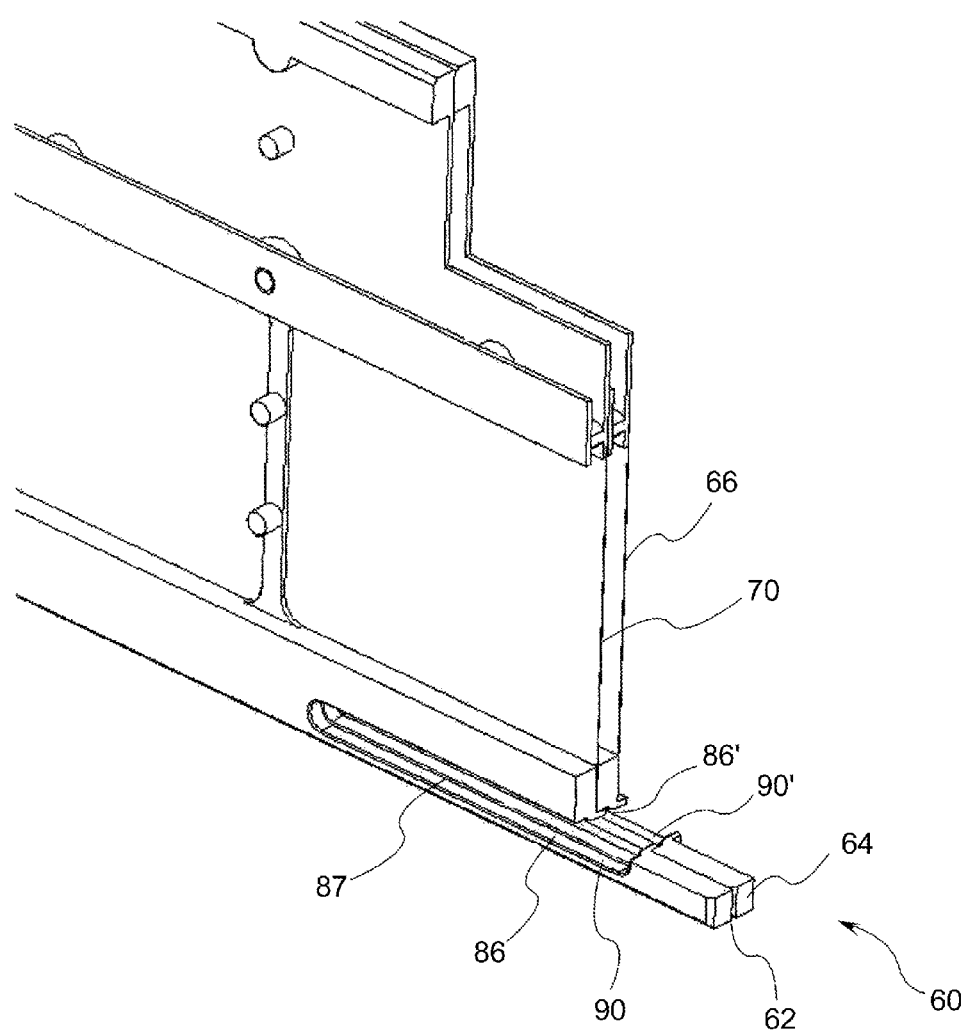
FIG. 14 shows a broken sectional view of a cell showing the recirculation path of the electrolyte fluid in the lower-right hand portion.
Figure 15:
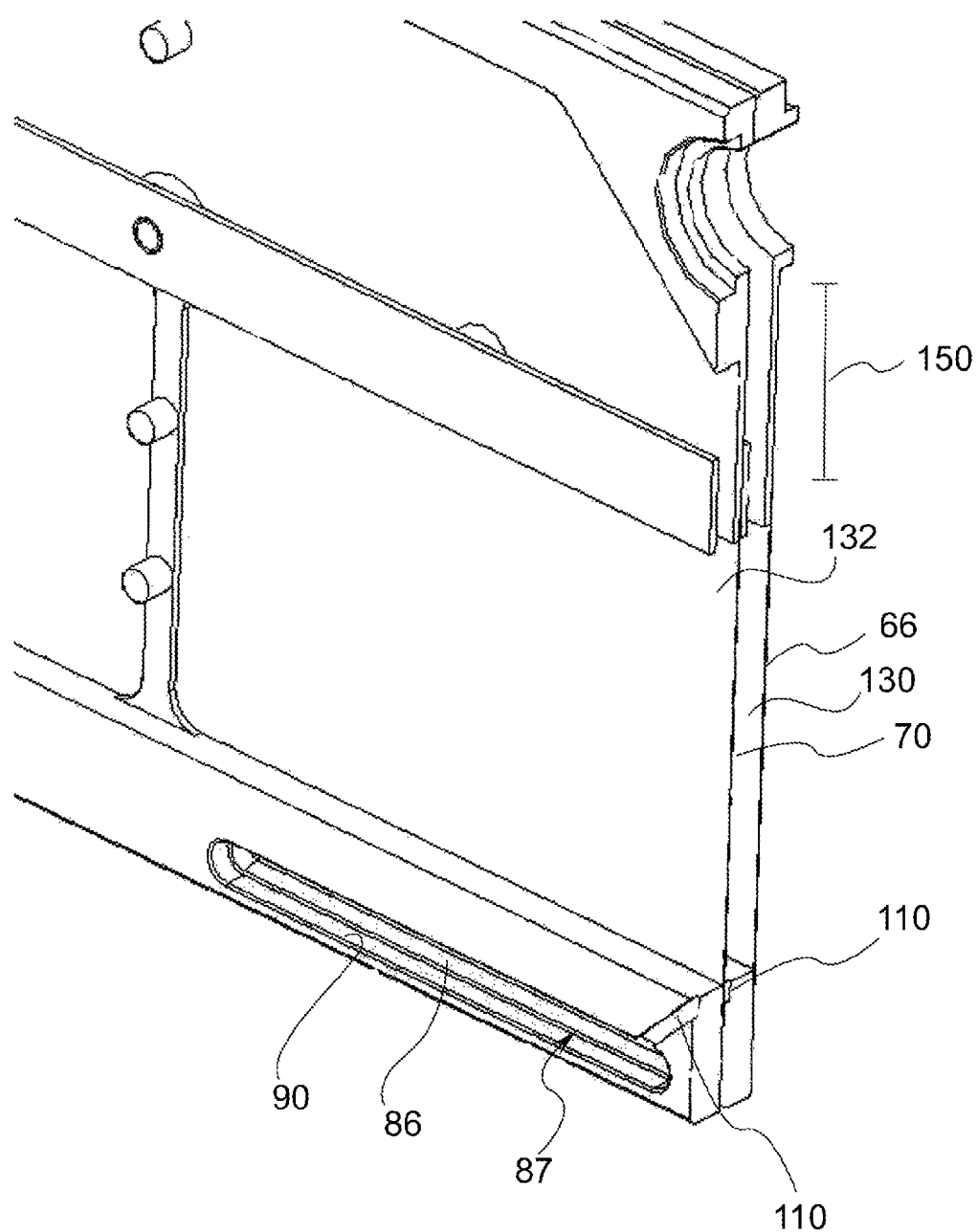
FIG. 15 shows another broken view of an end region of a cell.
Figure 16:
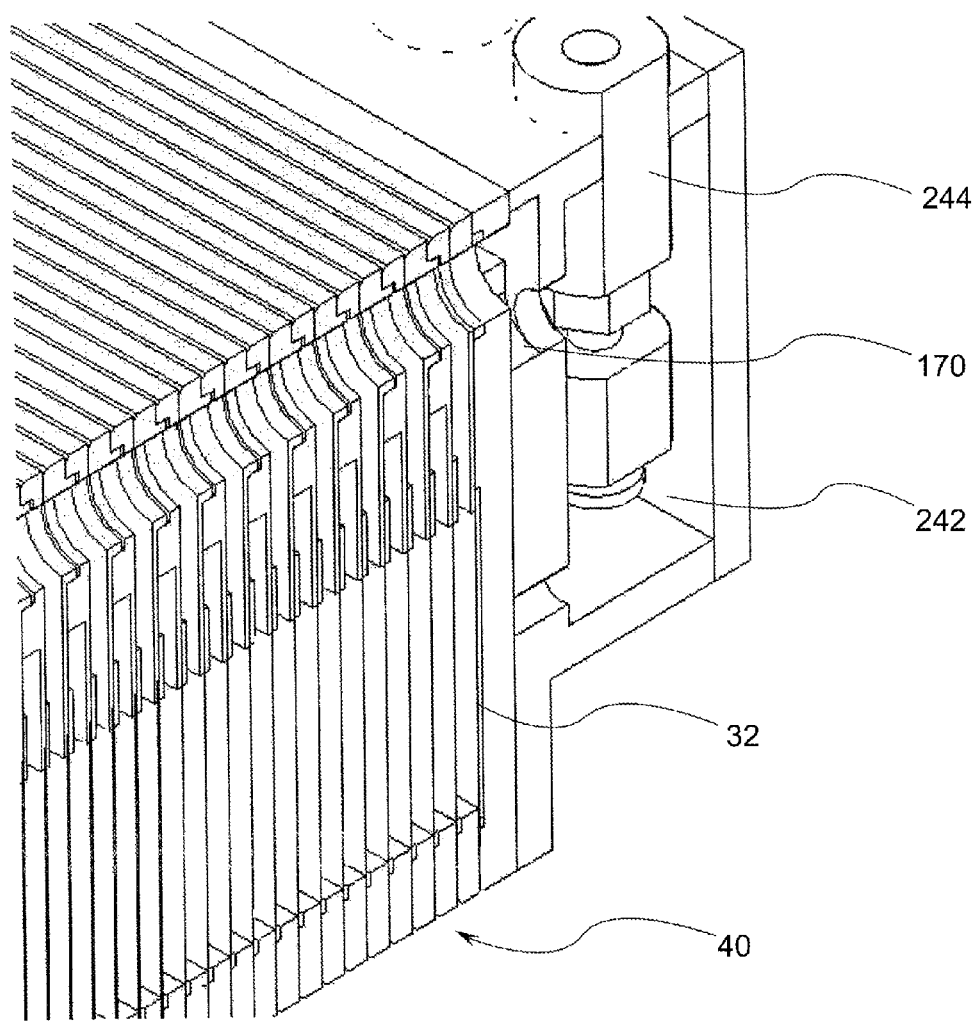
FIG. 16 shows a broken view of an end region of the plurality of cells

The first and second electrolyte supply channels 86 and 88 extend the longitudinal axis of the unit whereby the first and second lower openings 90 and 92 define the first and second electrolyte supply channels 86 and 88. Therefore, there is an unobstructed path through the plurality of cells where the openings 90 and 92 all are in alignment along the cell section 40 (see FIG. 3) to create a manifold type structure where electrolyte passes through the first and second passageways 94 and 96 to circulate electrolyte there through the central chamber region 80 (comprised of the oxygen and hydrogen subchambers 130 and 132, as shown in FIG. 11). For greater understanding of the manifold-like structure comprised of the plurality of cell surfaces 90 and 92, reference is made to FIGS. 14 and 15 where it can be seen how the surfaces 90 are in positional alignment with adjacent components (i.e. the second section 64 and the surface 90'). As shown in FIG. 15 there is shown how the passages 110 provide fluid communication to the oxygen and hydrogen sub-chambers 130 and 132. It should be noted that it is desirable to keep the cross-sectional area of the surfaces defined in the openings 90 and 92 to a minimum because it is desired have a majority of the electric current to pass through the electrode 70 (see FIGS. 11 and 12) to produce hydrogen. Therefore, the cross-sectional area of the first and second electrolyte supply channels 86 and 88 is much less than the cross-sectional area in the longitudinal direction of the oxygen and hydrogen chambers in the central chamber region 80, such as that shown in FIG. 9. For example, the cross-sectional area can be less than 5% of the electrolyte supply channel than the central chamber region 80. In a more preferred form, the cross-sectional area can be less than 2% and even less than 1% of the area. FIG. 10 is a front view of the second section 64 of the cell 60. As shown in this figure the openings 86' and 88' correspond in location to the openings 86 and 88 of FIG. 9 in one form, as shown in FIG. 12 the first section 62 is partially comprised of an extension 100. The extension 100 is a lip like member substantially the shape of the front cross-sectional area of the surface 90 as shown FIG. 9. Near the passage 110 as shown in FIG. 9 is a slight cut out of this extension that is the approximate width of the passage 110, thereby allowing communication to the inner sub-chambers 130 and 132 for circulation of the electrolyte fluid (see FIG. 15). The second section 64 has a receiving portion 102 as adapted to sealingly engage the extension 100. In a like manner, the first section has a receiving portion 104 adapted to receive the extension such as that is shown at 106 of the second section 64 (see FIG. 12). Of course it should be noted that the sectional view in FIG. 12 is taken along the broken sectional line 12-12 of FIG. 9 which extends along the passageway 110 to illustrate the fluid passage for circulation of the electrolyte solution.

Referring back to FIG. 11, there will now be a more detailed discussion of the first and second sections 62 and 64. FIG. 11 is taken along the section line 11-11 of FIG. 9 illustrating subchambers which are formed by way of stacking the plurality of cells 60. For example, the first cell 60' is formed by the first and second section 62 and 64 in the left-hand portion of the array of cell in FIG. 11. The first section 62 comprises an attachment strip 68 which in one form is a suitable way for attaching the electrode 70 thereto. The membrane 66 is attached in a similar manner with the attachment strip 72 where the electrode and the membranes are positioned in an alternative manner throughout the assembly of the cells 60. The oxygen subchamber 130 is formed between the membrane 66 and the electrode 70. The hydrogen sub-chamber 132 is positioned on the other side of the electrode 70 and is defined by the adjacent membrane 66 as described further herein, it should be noted that the electrode 70 is a passive electrode where it itself is not specifically connected to an anode or a cathode but has anode and cathode like portions on opposing sides thereof. With an anode or cathode positioned at the longitudinal ends of the cell assembly, the current passing through the electrolyte results in electrolysis of the electrolyte.

As noted above, the first electrolyte supply channel 86 is formed by the plurality of stacked cells 60. As seen in FIG. 14, the first and second plates 62 and 64 form the manifold channel 87. It should be noted that the cross-sectional area of the first and second electrode supply channel 86 and 88, as well as the passages 110 (see FIG. 9) are kept to a minimum cross-sectional area. As described in detail below, a function of the hydrogen production is based upon the amount of current traveling through the electrodes 70. Now referring to FIG. 12, it can be seen how bubbles are formed on either side of the electrodes 70. In particular, referring to the electrode indicated at 70' in FIG. 12, it can be seen if the current passes from the right-hand portion to the left-hand portion, where the anode 30 as shown in FIG. 3 and the cathode 32 supply current through all of the cells 60. The hydrogen production occurs along the hydrogen producing surface 135, and the hydrogen bubbles rise vertically through the electrolyte solution which is flooded through the hydrogen sub-chamber 132. Now referring to the adjacent oxygen sub-chamber 130, it can be appreciated how the oxygen bubbles 136 form on the opposing side of the electrode 70' on the oxygen producing surface 134. As schematically shown in FIG. 12, in general there will be twice as much hydrogen gas 133 produced by volume as compared to the oxygen gas 136.

Figure 17:
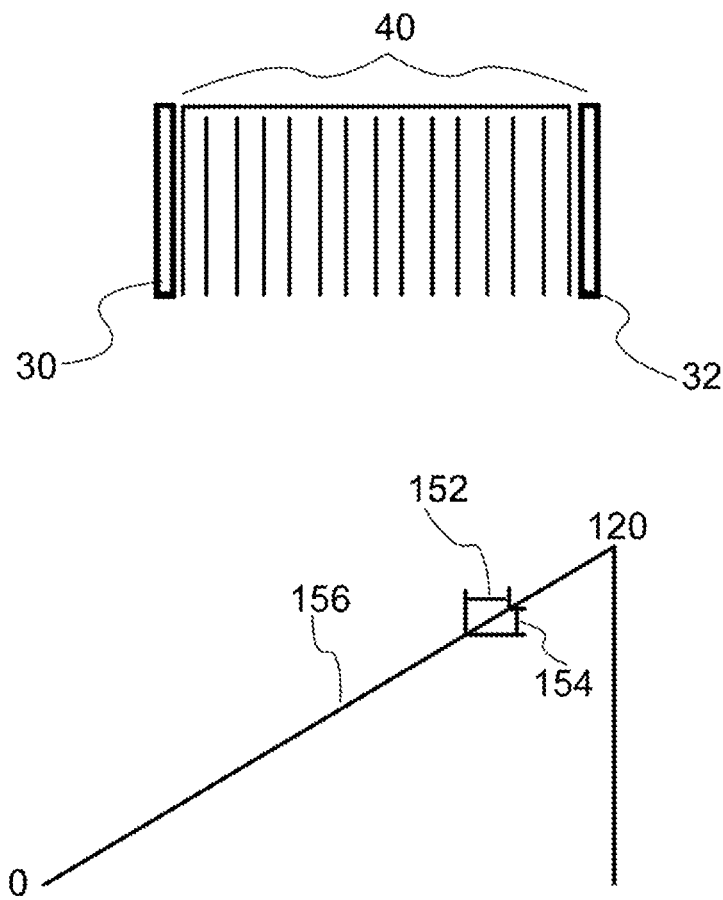
FIG. 17 schematically shows the number of cells and further shows the voltage drop from the cathode to the anode therebelow.

Now referring ahead to FIG. 17, there is schematically shown a plurality of cells comprised in the cell section 40 which are all placed between the cathode 30 and anode 32. It should be noted that in a direct current (DC) application, the voltage drop throughout the cells is schematically shown in the lower portion of FIG. 17. Given an approximate linear resistance with respect to the longitudinal direction amongst the cell section 40, the voltage drop will be substantially linear pursuant to the equation V=I×R (where V=voltage in volts [V], I=current in amperes [A], and R=resistance in ohms [Ω]). In general, having an approximate 2 volt drop between each of the cells provides a desirable factor of safety for having sufficient voltage differentiation amongst the adjacent cells to produce hydrogen. Of course, this factor can be adjusted depending upon temperature, electrolyte, say for example 15% in one range and up to say 25% in a broader range.

Therefore, having for example sixty cells with a voltage differential of one hundred and twenty volts between the cathode 32 and the anode 30, the system achieves an approximate two-volt drop per cell. In other words, referring to FIG. 17, if the distance indicated at 152 represents the distance between two adjacent electrodes and adjacent cells, the voltage drop 154 would be, for example, approximately 2 volts. Of course, the voltage drop line 156 is shown as linear in FIG. 17, and given the various changes of medium through the membranes where current must travel through the membrane and the electrode, there would be slight deviations in the slope of this line, but FIG. 17 presents the general idea of the voltage differentiation created amongst the plurality of passive electrodes.

In general, the length of the cell is dictated by the amount of gas produced in the current therethrough. The current is primarily restricted by the amount of a general outlet which is approximately 13 amps and 120 V in North America which is converted to direct current for the application. The upper gas separation chamber is generally about one fourth of the total height of the entire chamber region (see FIG. 10). There should be a certain fluid level sitting above the electrode for operation. Further, gas is produced so a fluid level raises because the gas obviously occupies volume when in operation. In one form there is approximately a half-inch buffer zone 150 (as shown in FIG. 15) in the upper portion to allow the gas outlet to escape to the hydrogen and oxygen collection lines 160 and 168 (see FIGS. 9 and 10). Of course, the dimension 150 as shown in FIG. 15 can be within various ratios with respect to the overall size and dimension of the cells. For example, as shown in FIG. 10, the dimension 150 can be, for example, between one half and one fourth the dimension of the overall height of the cell indicated at 202 in the left-hand portion of FIG. 10.

By having an ambient pressure system (or substantially ambient), a certain ratio of dimensions for the unit is desirable. Looking in the left-hand portion of the FIG. of the cross sectional view in FIG. 18, it should be noted that there is greater current in the lower portion of the chambers than in the upper portion. Using a basic equation V=I×R, present analysis indicates that the upper integral section has a greater resistance of electrical flow due to the resistance of the bubbles that accumulate therein. Since the voltage is fixed, the bubbles cause greater electrical resistance and therefore the current therefore should be lower in this region. If the current is lower, the current is a function of bubble production and the upper region 161 will produce less hydrogen or oxygen per linear portion in the vertical direction.

Figure 18:
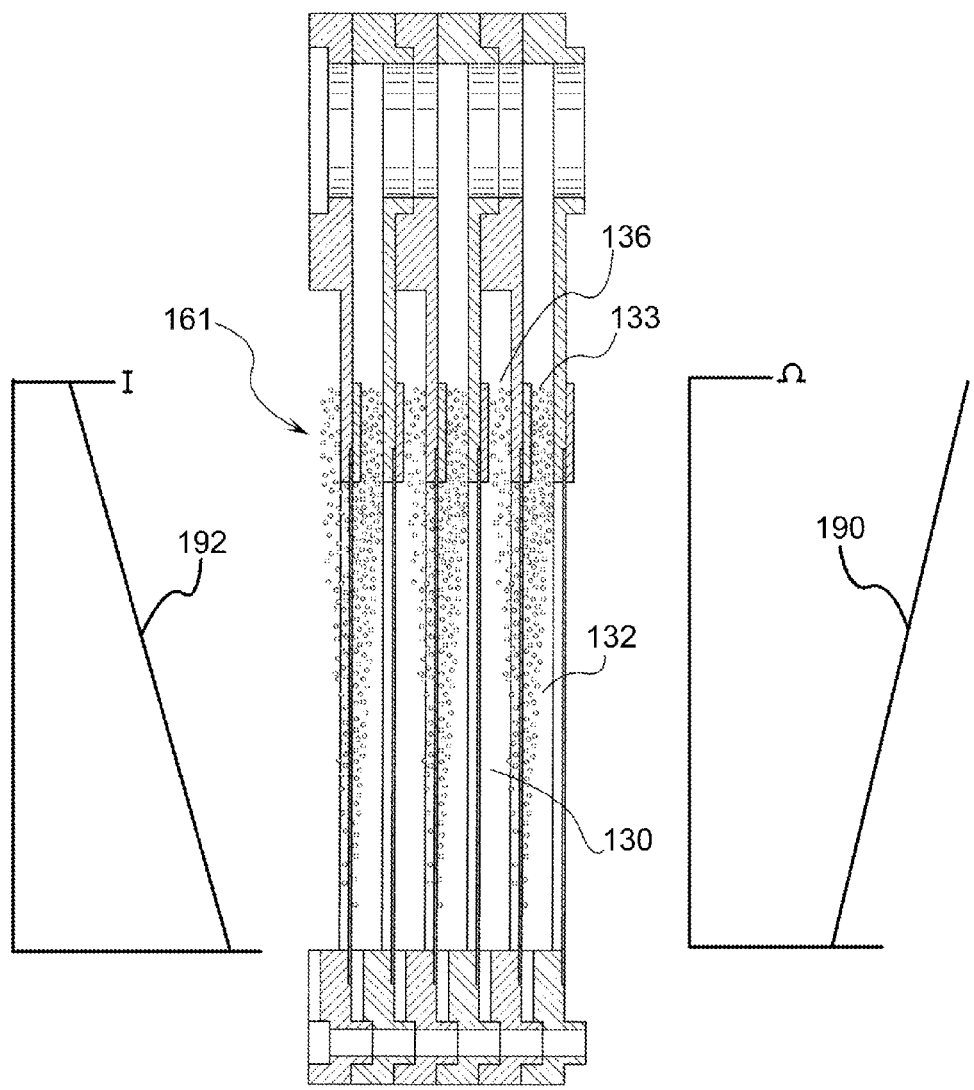
FIG. 18 schematically shows the resistance and amperage in the vertical direction along a cell, which is producing gaseous bubbles of hydrogen and oxygen.

Still referring to FIG. 18, there is shown a non-uniform amperage-type flow with respect to the vertical direction through the electrolyte solution in the plurality of cells. The resistance line indicated at 190 is generally greater in the upper portion because the hydrogen and oxygen gas bubbles 133 and 136 have a greater inherent resistance to lowering electrical current passing therethrough. Of course, given that V=I×R, the corresponding amperage indicated at 192 will be lower than the top portion and a greater amount of amps flow in the bottom portion. However, the greater amount of resistance in the amps that does pass therethrough create $I^2$ losses.

It should be noted of course that each electrode has gas generated on either side on hydrogen and oxygen, and if the chambers were angled, it would reduce the volume in the other portion of the adjacent chamber. The electrode could be slanted where the hydrogen produces twice as much gas as oxygen. For example, the unit could be slanted at, say, between 2-12° of the broader range with all sub-ranges included therebetween for purposes of allowing the gas to be extracted more readily from the hydrogen side of, for example, the surface 135 in FIG. 12. Therefore, the hydrogen sub-chamber 132 could have the electrode slanted away therefrom for an optimized type of effect of producing maximum hydrogen. It should further be noted that, in theory, there may be less surface tension, and the angle may be helpful to have the bubbles raise right up and not be conducive to stick or otherwise adhere to the portion of the electrode.

Now looking at the isometric view which is shown in a partial sectional portion in FIGS. 3 and 8, given the external parameters of power which is about 120 V, between 13 to 15 amps, and a safe operating range of 13 amps, the preferred sweet spot for the thickness 200 (see FIG. 13) dimensional size of a cell has been found to be about ¼ of an inch, plus or minus 50% in the broader range, and likely 10% to 20% in more preferred ranges. The height indicated at 202 (see FIG. 10) is approximately 3.0 to 4.0 inches, which appears to have a desirable vertical height given the amount of gas production on either side as described herein. The width 104 in one form is approximately 12 inches minus approximately two ¼ inch segments on the ends and the three ⅛ inch support portions 81. Of course, this could vary by plus or minus 40% or 20% in a more preferred variation. discussed further herein is a second embodiment with reference to FIGS. 33-51 which shows a more preferred embodiment where the approximate width overall width dimension 680 (see FIG. 36) is 6.5 inches (+/−20% in other preferred forms) and the other dimensions are to scale as drafted in these drawings. Of course, the height dimension could be lowered, and it could be wider at the same current density, which in a preferred form is approximately 0.12 amps per centimeter squared, but could be as low as 0.08 amps per centimeter squared. If the cell is much wider and shorter, there is an issue of having a higher concentration of bubbles in the upper portion of the cell. However, the practical effects of structural integrity and having a proper form factor for fitting it in various usable types of environments, the width dimension 104 should be reasonable, and 12 inches is operational in one form. The dimensions specified above are one method of undertaking the general teachings of the invention claimed herein.

With the foregoing description in mind, there will now be a discussion of the membrane 66, which is permeable to be extended and allows ions to pass therethrough. In other words, in an electrolyte solution, the passage of the current is executed by way of an exchange of ions. Therefore, for electrical communication between the first and second electrodes, the membrane 66 should be ion-permeable. However, the membrane should not allow communication of gases from adjacent oxygen and hydrogen cell chambers. For example, as shown in FIG. 12, the hydrogen sub-chamber 132' is separated from the oxygen sub-chamber 136'. In other words, the membrane 66' prevents cross-contamination of hydrogen and oxygen gas, which is an explosive mixture. Therefore, the porosity of the membrane should provide holes at least 2.88 Å, which would be about the smallest size to allow hydrogen ions to pass therethrough. However, holes from 1-2μ should be acceptable values. It should be noted that although hydrogen gas molecules (H2) are very small, when the bubbles 133/136 form within the hydrogen sub-chamber 132, there is a water surface tension around the formed bubble.

If the membrane is, for example, hydrophilic where it "likes" water (a polar molecule) and presumably is more of a polarized structure or material, the membrane could have a tendency to break away the small boomerang-shaped water molecules and destroy the surface tension. However, if it is more of an oil-like substrate where it is hydrophobic (i.e. lipophilic), the membrane will tend to "stay away" from the polar bonds creating the water molecule surface tension and leave it intact.

It should also be noted that present analysis indicates that smallest bubbles that are formed are approximately 100μ across. The range can be from the smallest range to allow ion flow therethrough, which is approximately the size of the ions minus any interfering forces on either side to inhibit the flow and up to a size below the bubble size which present analysis estimates to be approximately 100μ. Of course in a broad range, this could be between 0.1μ to 90μ, and in one form a 1.2μ membrane has been utilized, but a 10μ porosity appears to be a safe porosity size to inhibit cross-contamination with the reasonable factor of safety worked therein. Present analysis indicates that certain membranes may have a certain type of fibrosity property to them where small fibers extend therefrom which can be problematic by causing a rupture of bubbles, compromising the surface tension therearound. Further, they could hold the bubbles without having to move vertically to get out of the unit. Of course it is desirable for this flow of the gas so resistance is minimized and production is sustained. Therefore, other properties to the membrane should be relatively smooth or otherwise not inhibit bubble destruction or slow the vertical flow through the fluid.

Figure 13:
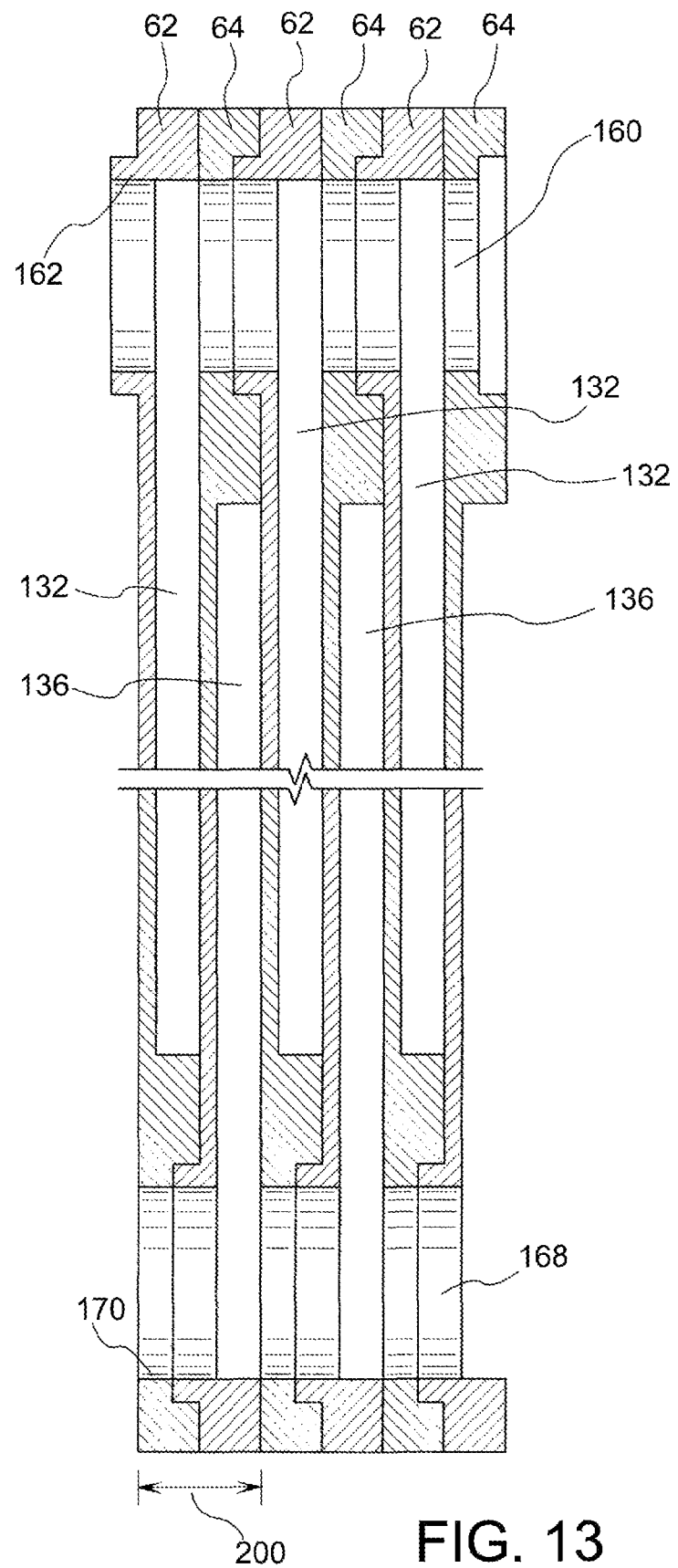
FIG. 13 is taken along line 13-13 of FIG. 9 showing a top sectional view looking downward upon the chambers defining longitudinally extended passageways for removal of the oxygen and the hydrogen.

Referring now to FIG. 13, there is shown a top sectional view taken along line 13-13 of FIG. 9. This view illustrates the gas chambers which are formed, where the hydrogen sub-chambers 132 all pass upwardly to the hydrogen collection line 160. The hydrogen collection line 160 is formed from the plurality of surfaces 162 of the first and second sections 62 and 64. The oxygen sub-chambers 136 are in communication with the oxygen collection line 168 which is formed by the plurality of surfaces 170. Therefore, in a similar manner as the electrode supply channels 86 and 88 (see FIGS. 9 and 10), the collection lines 160 and 168 are formed by the stacking of the plurality of cells.

Figure 2:
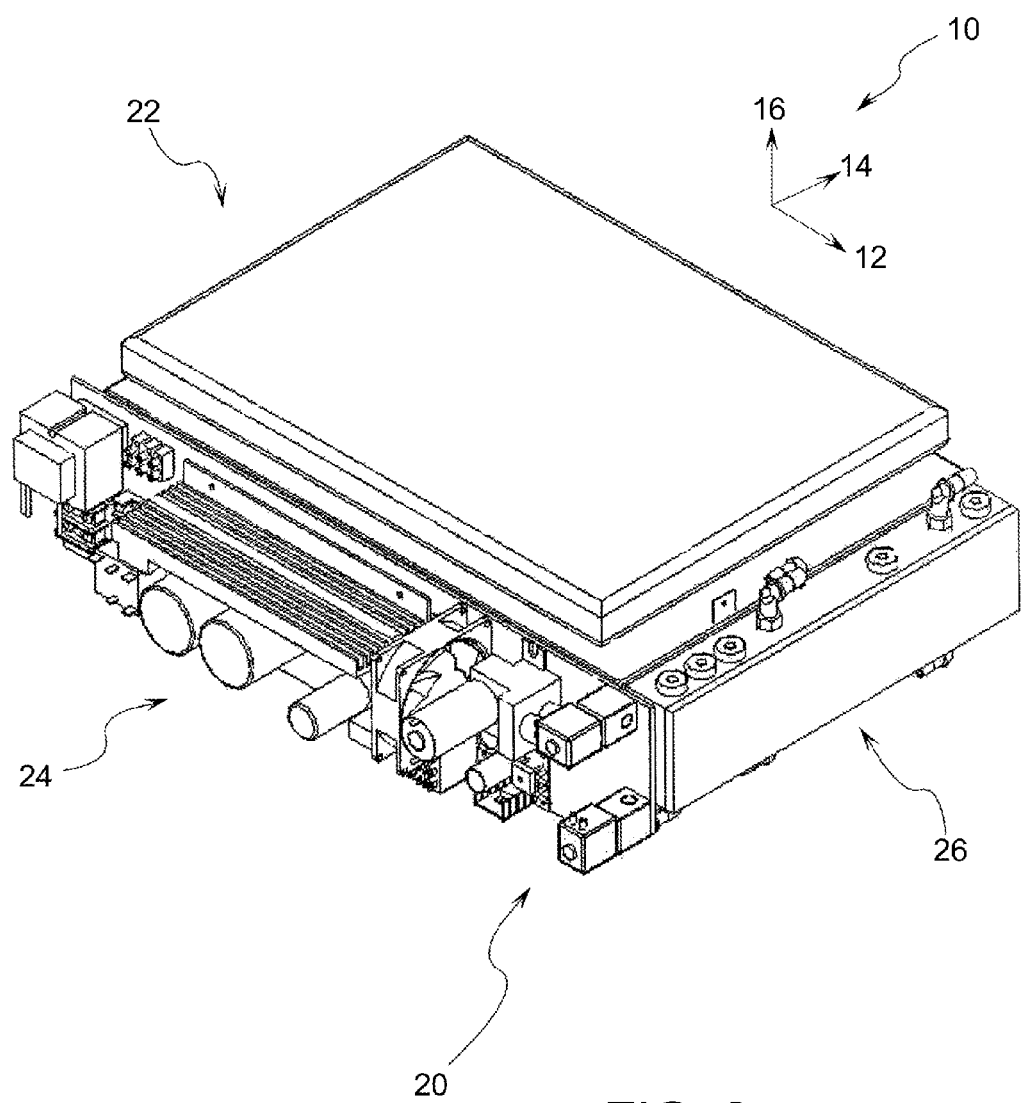
FIG. 2 shows another isometric view of the electrolyzer, in part showing the hydrogen removal portion and water replenishment mechanism.

With the foregoing description in mind, there will now be a discussion of the hydrogen water replenishment and hydrogen removal portion 26 as shown in FIG. 2. As described in detail below, the system 26 discloses one form of replenishing the expended water, thus forming oxygen and hydrogen and further replenishing the water so it mixes properly with the electrolyte solution to form a conducting electrolyte. Further, the system 26 performs a back check system to prevent an explosion from traveling back into the unit 22, causing damage to the unit and possible injury.

Figure 19:
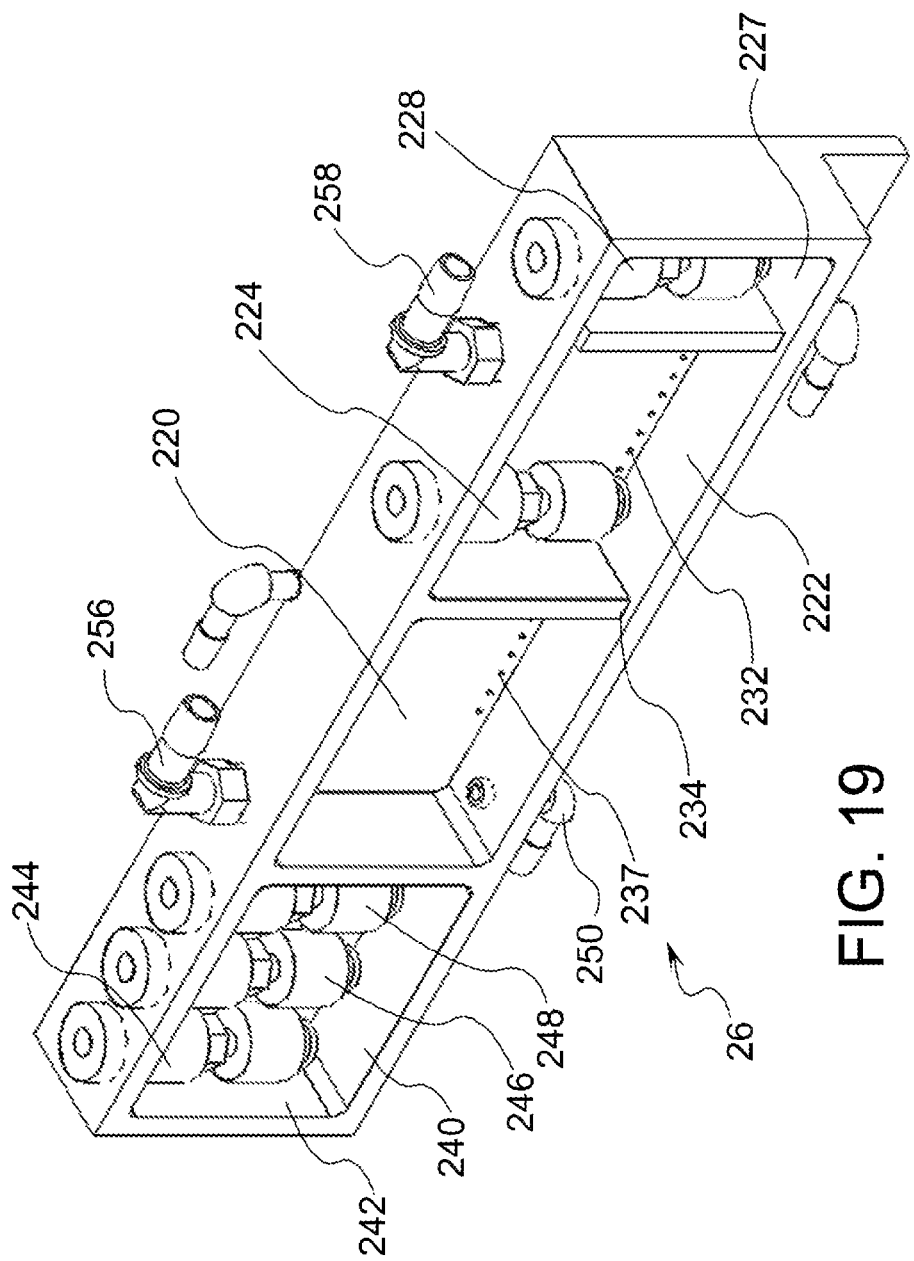
FIG. 19 shows one form of the water replenishment and hydrogen removal system.
Figure 20:
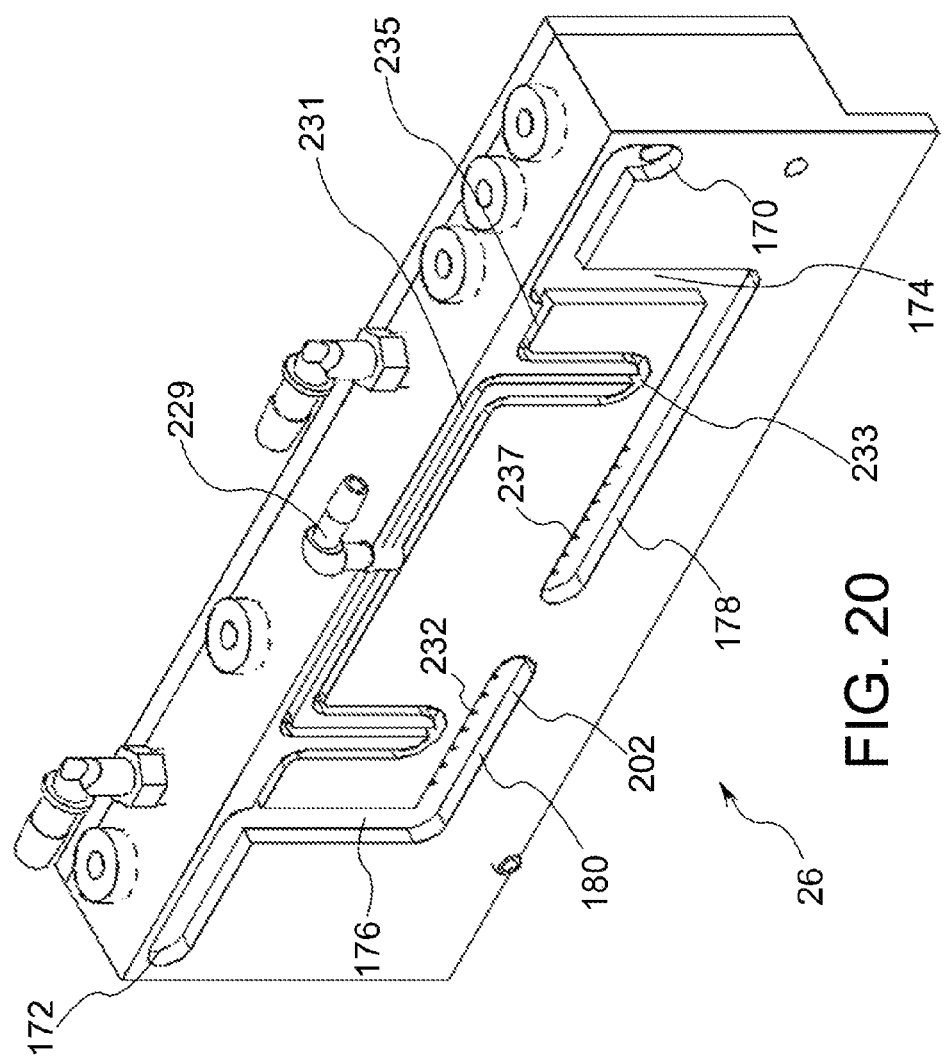
FIG. 20 is a rear view of the hydrogen removal and water replenishment system.
Figure 21:
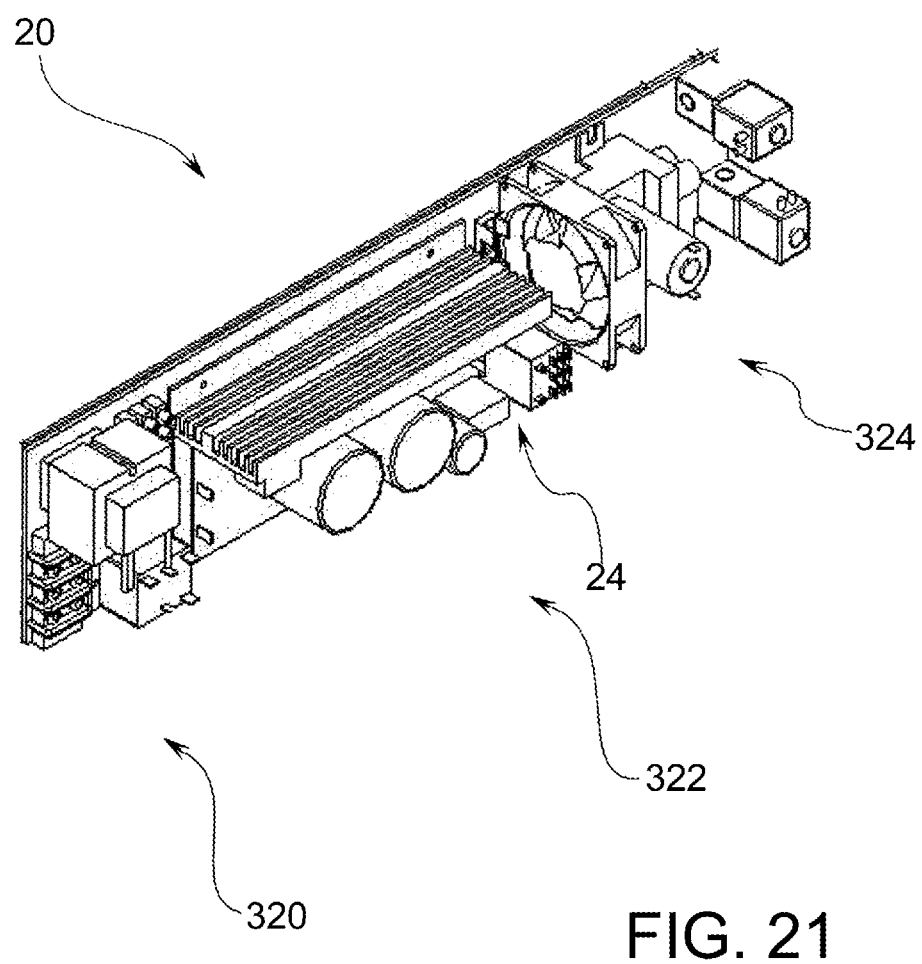
FIG. 21 is an isometric view of the rearward portion of the electrolyzer.

Referring ahead now to FIGS. 19-21, there is shown in FIG. 19 a front partial sectional view of the water replenishment and hydrogen removal portion of 26.

On the left hand portion there is a hydrogen chamber 220, on the right hand portion there is an oxygen chamber 222. Within the oxygen chamber 222, there is a float valve (fluid height sensor) 224 which is in electrical communication with the relay 244' (see FIG. 22). The purpose of the sensor 224 is to ensure that the unit 20 does not operate when there is no ignition in the area of use where it is used as an oven, and prevent amperage passing through the unit if the water level is too low. One of the functions of the chamber 222 is as a flame arrester where the water bufferance will not allow passages of flame into the main hydrogen and oxygen producing unit 24. The whole front unit operates as a P-trap which is conventional in the plumbing arts. The unit could be used to fuel an oven such as that as shown in U.S. Ser. No. 11/747,732 which is fully incorporated by reference.

On the right-hand portion in FIG. 19 there is a water input valve chamber 227 which is in fluid communication with the left and right chambers. It is advantageous to have the chamber 227 isolated because the hydrogen dispersion orifices indicated at 237 as well as the oxygen dispersion orifices 232, as described further herein, are somewhat isolated from this portion to properly gauge the water level in the hydrogen producing portion 22 (see FIG. 2). The chambers 220 and 222 are in fluid communication at a lower passage 234 just to maintain the hydro-static pressure therein, which keeps them substantially level with respect to one another.

The operation control chamber 240 is in fluid communication with the electrolyte fluid to gauge the actual amount of fluid throughout the whole unit. Any of the valves contained therein will shut off the unit if the electrolyte level is too low. The operation valve assembly 242 operates as follows. The float switch 244 adjusts the electrolyte level, which opens a valve to allow water to enter the system. The second float switch 246 actually controls the high electrolyte level, which is described further below. The third switch indicated at 248 will shut off the unit if the electrolyte level keeps rising and is too high within the unit. It should further noted that the float switches are somewhat advantageous for tilt control, at least about the longitudinal axis of the unit whereby tilted excessively in either direction of the floats will essentially gauge this height variation from the adjacent fluid and shut off the machine.

There will now be a reference to the second switch 246. When this switch is "triggered" when the water level is low, the control system draws fluid from the right-hand hydrogen and oxygen chambers 220 and 222 through the opening 250 which has a metering orifice to control the flow rate therethrough. Of course any type of flow rate manipulative device could be utilized. It should be noted that there is another fluid circuit system which is in communication with the operation control chamber 242. The pump re-circulates fluid through the cells for various reasons, such as a cooling of the liquid (pumping the liquid through some sort of refrigeration unit), and filtering the water.

Figure 24:
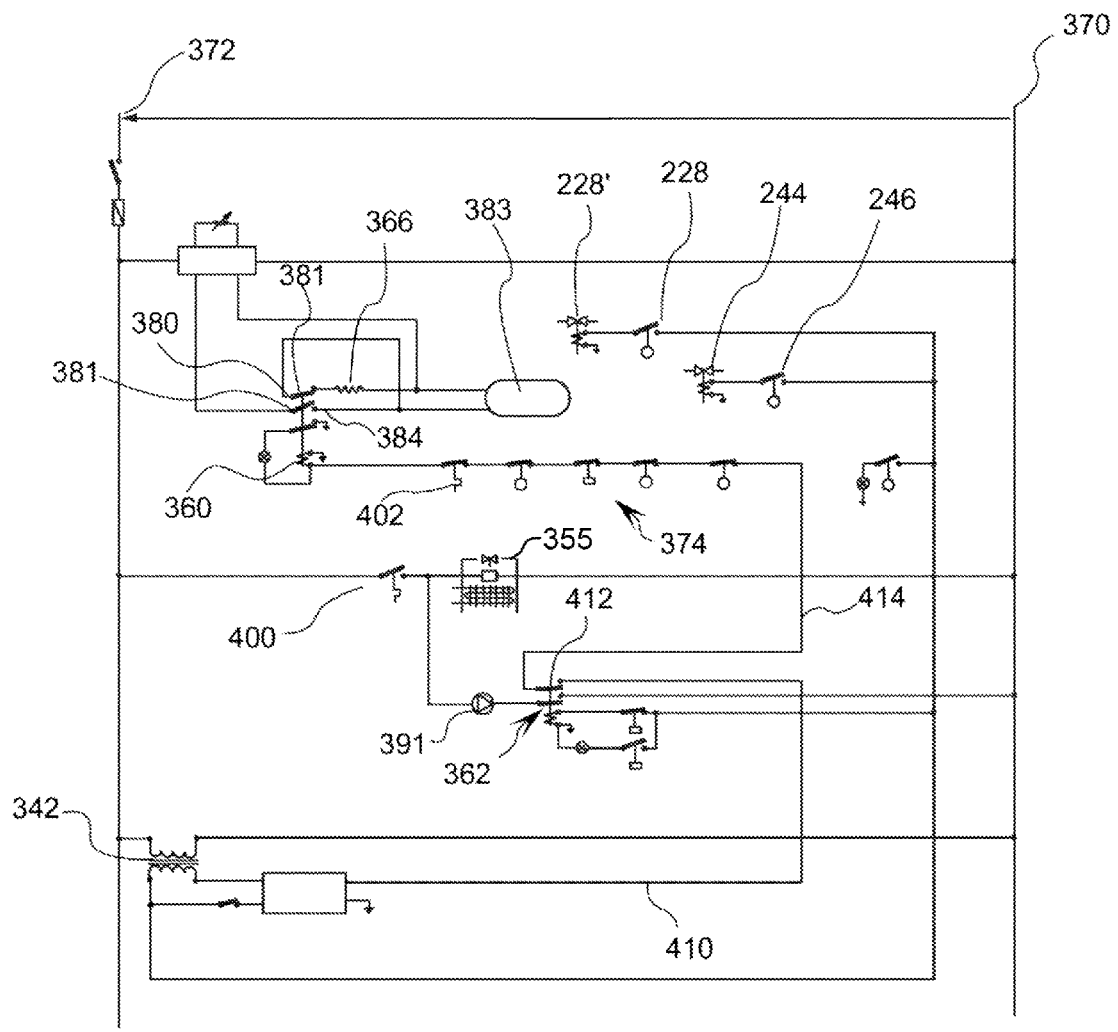
FIG. 24 shows a circuit schematic diagram of one form of a control system for running the unit.

As shown in FIG. 24 the valve 228', which in one form is a solenoid valve, is controlled by the float 228 of FIG. 19 where when the water level is low, this valve is opened and additional water is fed into the system by a siphon opening 229 in FIG. 4. As shown in FIG. 20, the inlet 229 is in communication with the passageways 231 to the lower point 233 and back up to the upper portion 235 and into each respective chamber near the ports 237 and 232.

Figure 22:
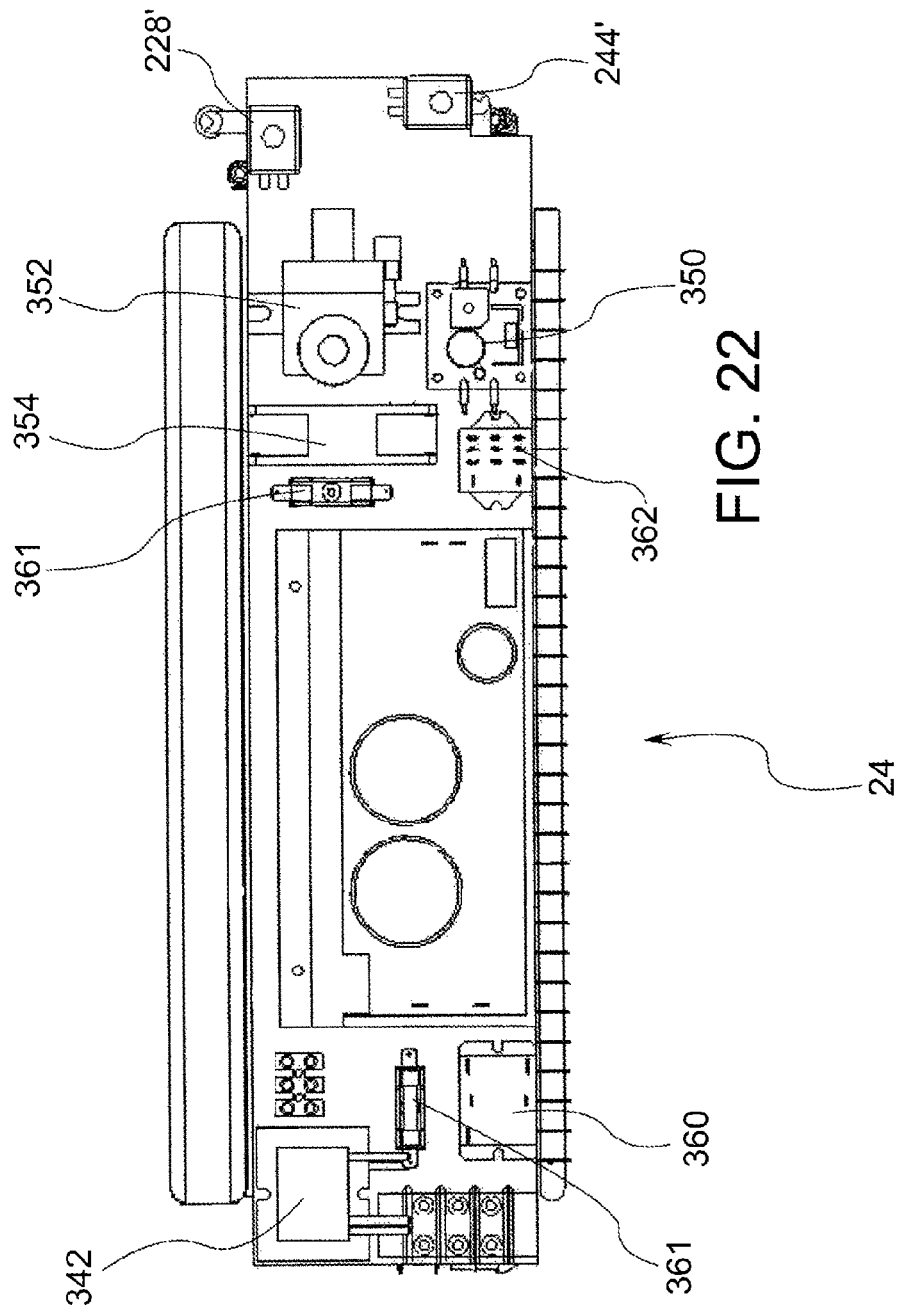
FIG. 22 shows a lateral view of one form of the power control system.
Figure 23:
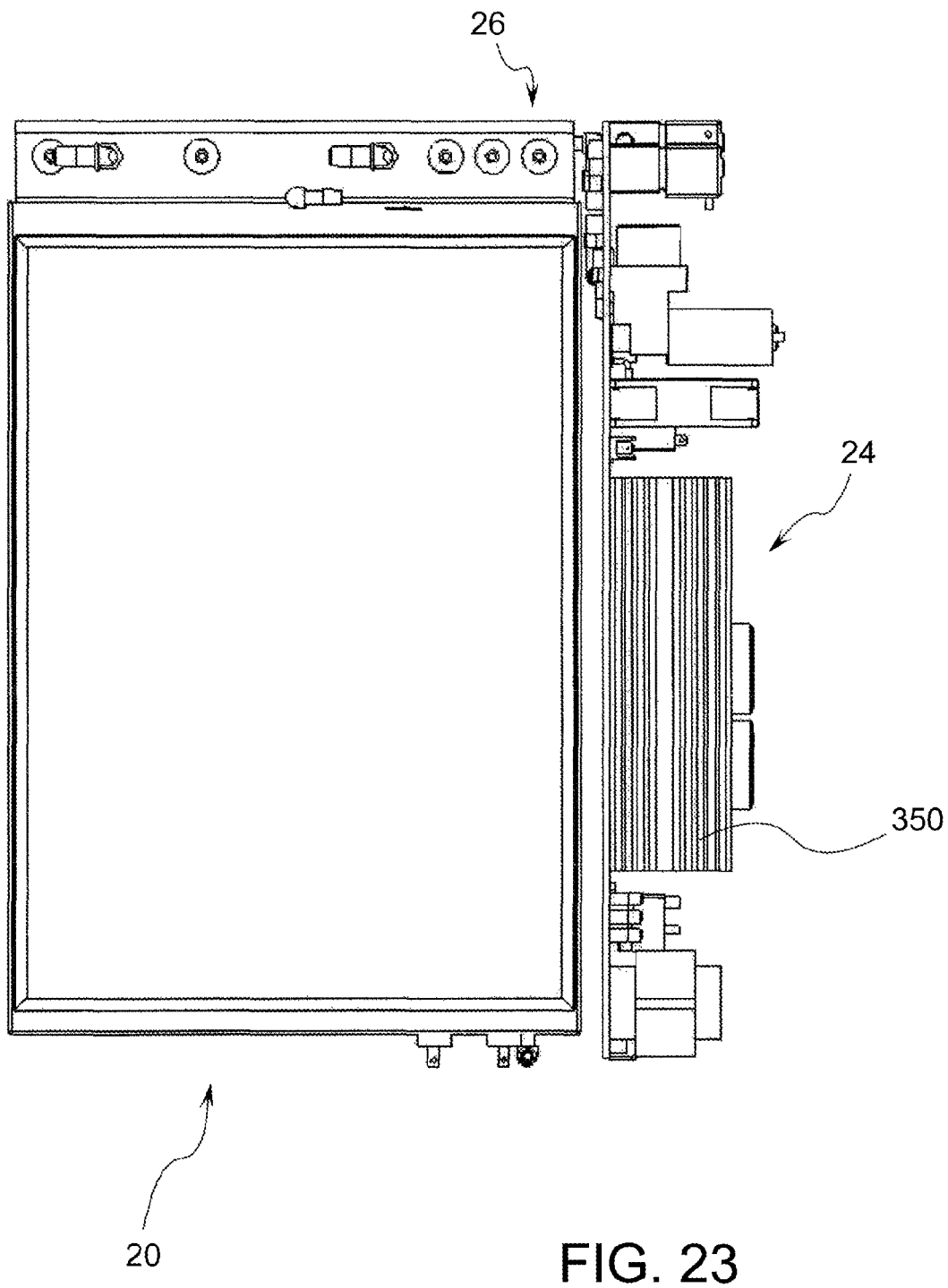
FIG. 23 shows a top view of the unit.

Therefore, the valve 244' as shown in FIG. 22 is in communication with the outlet 250 in FIG. 19, therefore when the float valve 244 is in the low position, the electrolyte solution contained within the chambers 220 and 222 are withdrawn therefrom.

Figure 5B:
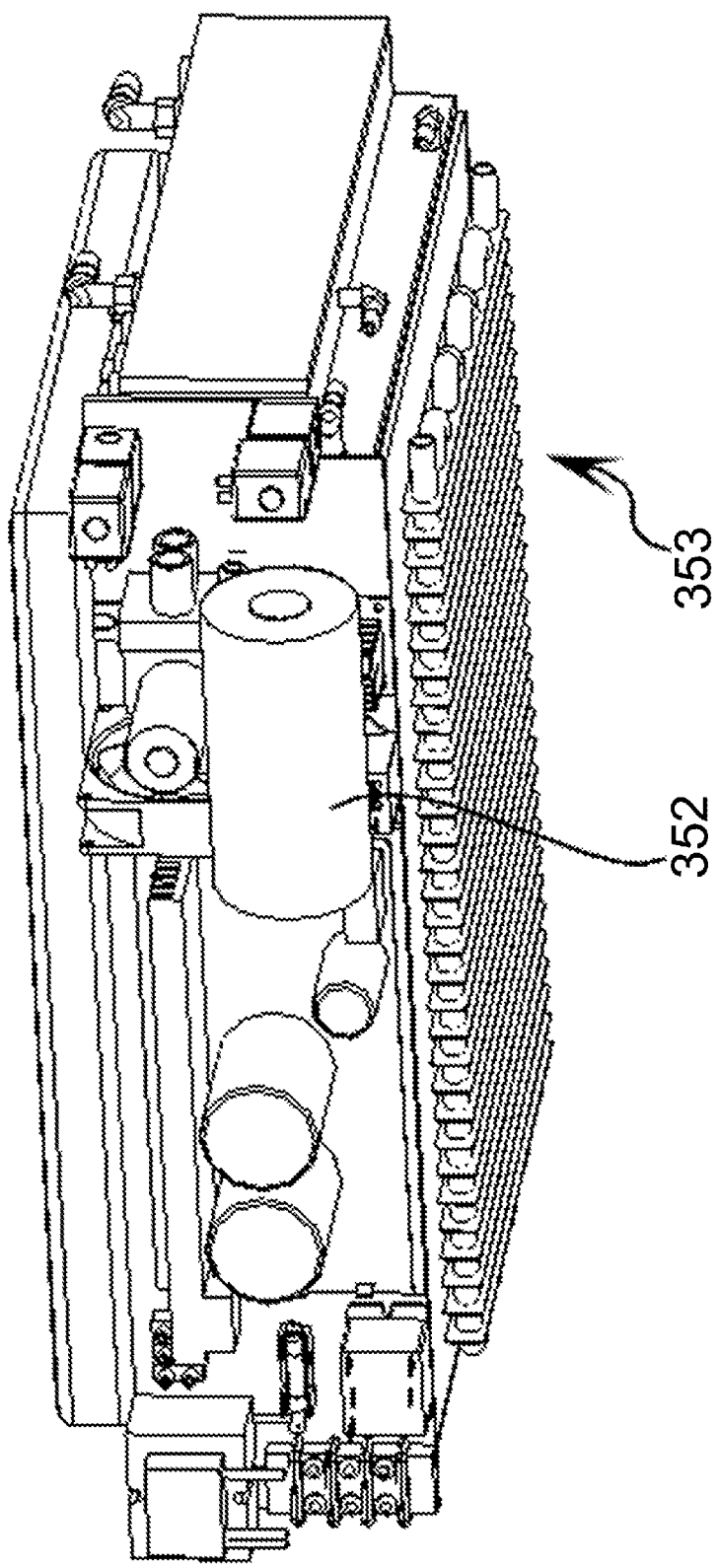
FIG. 5B shows the water filter of the unit as well as the lower cooling grid for the electrolyzer solution.
Figure 5C:
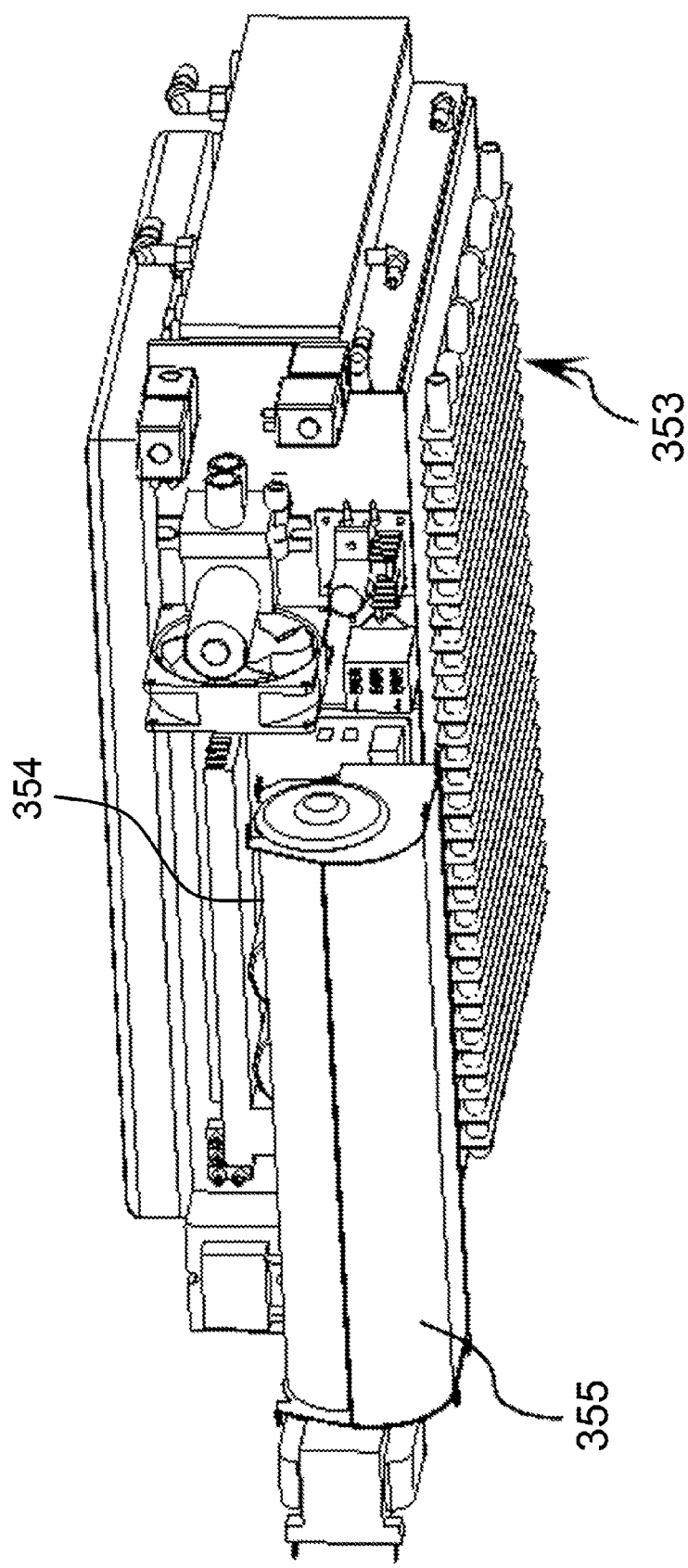
FIG. 5C shows the cooling fan that is configured to bias air across the cooling grid.
Figure 26:
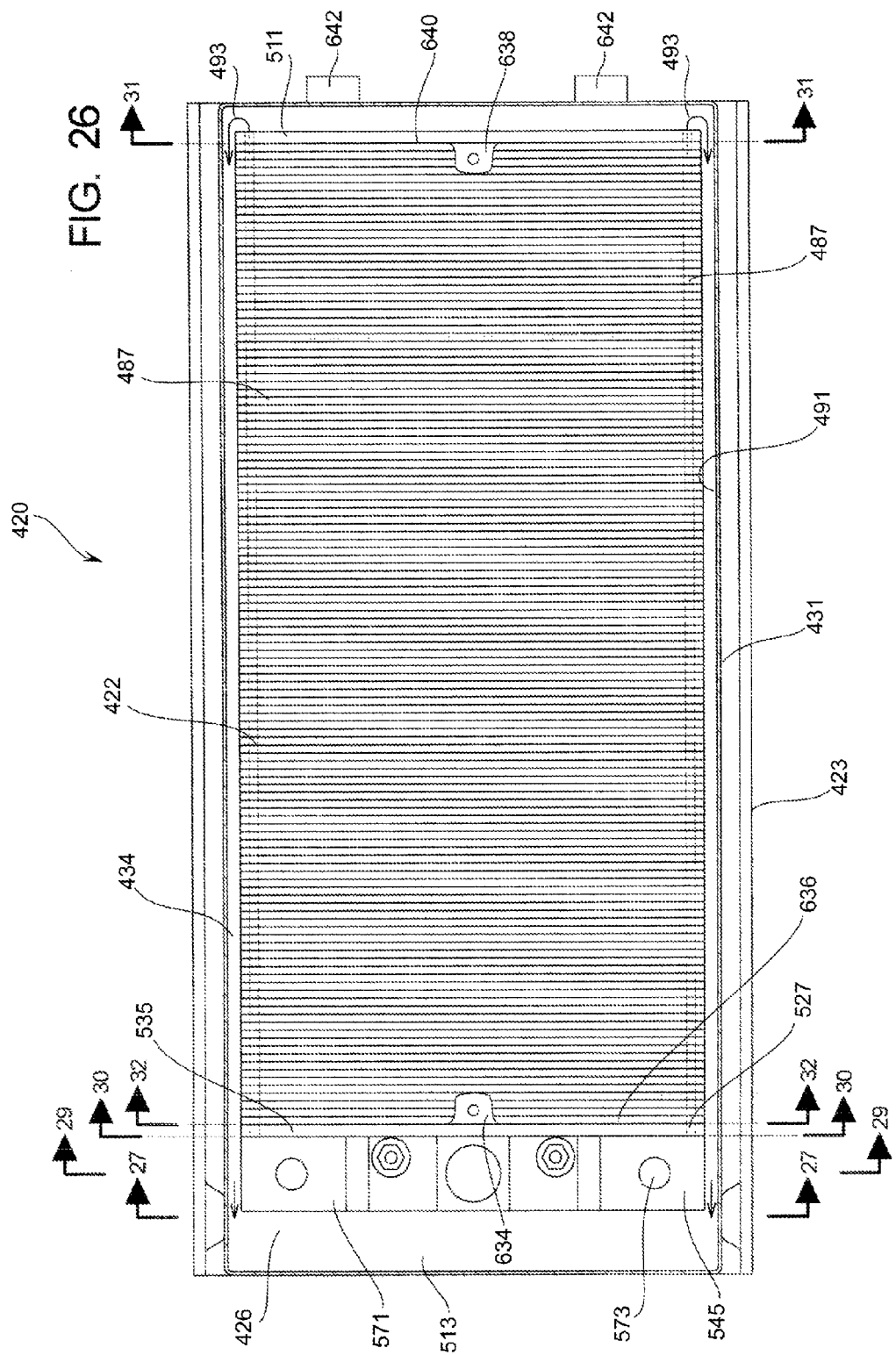
FIG. 26 shows a top view of the second embodiment.
Figure 26A:
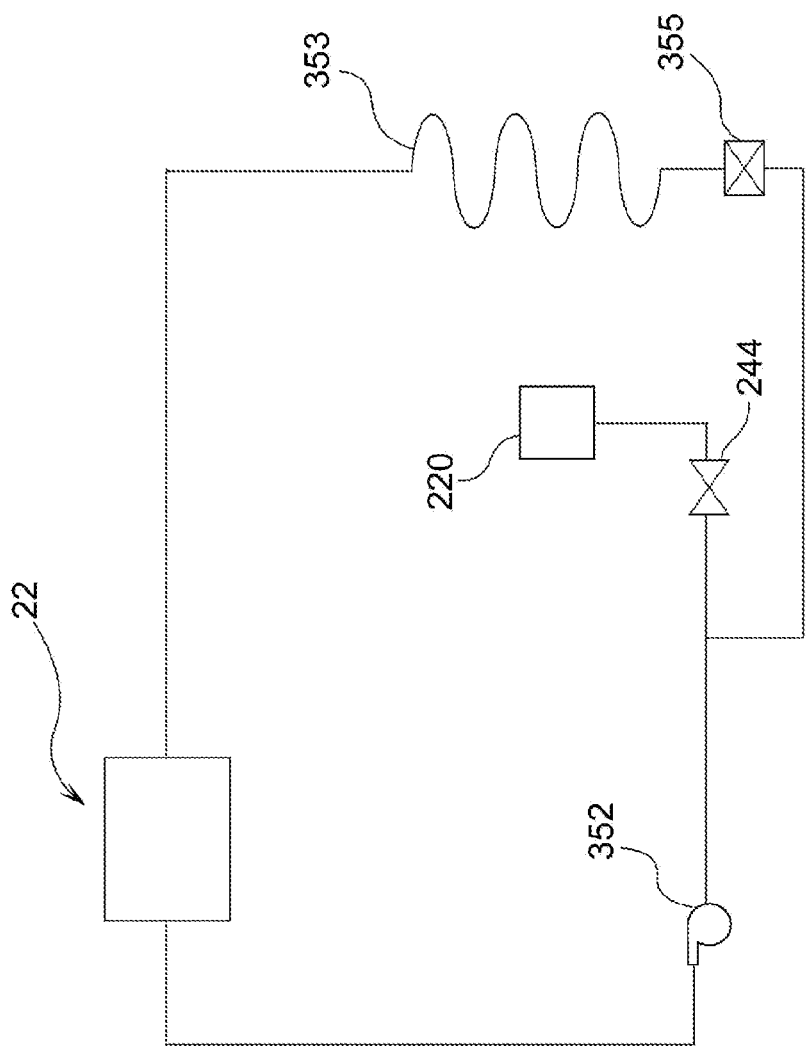
FIG. 26A schematically shows a circuit diagram for recirculating the electrolyte solution and replenishment of the same.

As shown in FIG. 26A, when the valve 244 opens water is siphoned from chamber 220 where the action of the pump 352 draws water therefrom and circulates the water through the hydrogen producing portion 22 and through the heat exchanger/cooling grid 353 and the filter 355 schematically show in FIG. 26A (shown in detail in FIGS. 5C and 5B).

Referring back to FIG. 19, the hydrogen gas is extracted through the output line 256, and the oxygen gas is extracted to the output line 258. As shown in FIG. 20, there is a rear view of the system 26 where it can be seen that the oxygen receiving opening 170 is in communication with the oxygen collection line 168 such as that shown in FIG. 13. In a like manner, the hydrogen receiving opening 172 is in communication with the hydrogen collection line 160, also shown in FIG. 13. The vertically oriented slots 174 and 176 are submerged in the electrolyte fluid in operation, and the lower passages 178 and 180 are in communication with the hydrogen and oxygen dispersion orifices 237 and 232 respectively.

With regard to FIG. 1 above, there is a synergistic effect of utilizing the hydrogen and oxygen exit ports with the back flame protection abilities, and also with utilizing the support to supply the unit with the fresh fluid. Of course, the electrolysis reaction consumes water and breaks it into its components, oxygen and hydrogen gas, so it must be constantly supplied with fresh water. It should also be noted that in one form, sponges contained within the chambers 220 and 222 have the effect of condensing some of the water within the hydrogen and acting as a scrubber. Also, the sponges cut down noise and intend to change the characteristics and diameter of the bubbles in a more desirable fashion.

Figure 25A:
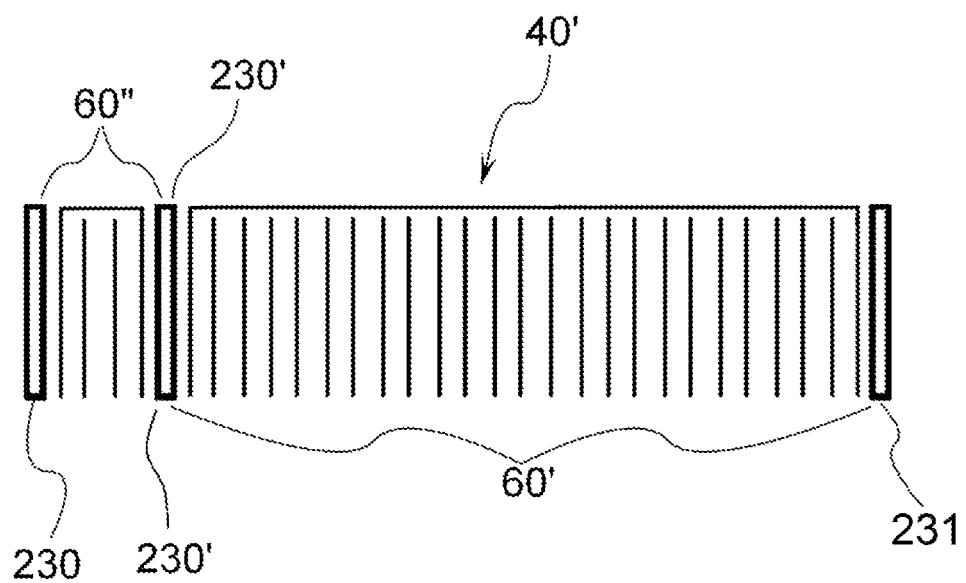
FIG. 25A shows a schematic second embodiment of the unit having an interposed cathode/anode which can intercept and receive current to reduce the amount of resistance from one of the outer cathode/anodes for an alternative system for adjusting the amount of current flowing through the unit.

There will now be a discussion of an alternative power control system with reference to FIG. 25A. In general, given the basic concept of Ohm's law, the electrical resistance is a function of the temperature of the unit. The resistance is initially higher, the voltage is presumably constant across from the anode and cathode, therefore the current is lower (in general). However, if say for example, there is an additional cathode or anode interposed between the outer and housing inner cathodes. In summary, a short circuit is created halfway along the resistance pass through the plurality of cells. Therefore, the resistance is lower in the shorter electrical path along the longitudinal direction because it is simply not as long. The resistance being lower means the amps are the greater, which means a greater production of hydrogen since the production of hydrogen is a function of the current. Now, after the unit heats up, the resistance will gradually decrease thereby increasing the current. Of course, the heat and resistance relationship can have a recurring effect. If the unit heats up beyond an acceptable level, and the current flow caused the heat, generally there is $I^2$ losses creating additional heat. In this situation, the control unit will shut off or cut electrical communication to the interposed anode/cathode (depending on the configuration of the outer anode/cathode) and the outer extreme electrode will be employed thereby increasing the resistance and hence controlling the current.

Therefore, with reference to FIG. 25A, there is shown a highly schematic version of an alternative power control system, where an anode 230 is positioned at one end of an array of cells 40'. The cathode 231 is positioned at an opposing end in a longitudinal direction with the plurality of cells 60' interposed their between. Therefore, as generally described above, an intermediate anode 230' (or alternatively an intermediate cathode) is positioned in closer proximity to the anode 231, whereby a switch would electrically place the anode 230' in electrical communication, and the cell array indicated at 60" would not be invoked. In other words, the anode 230' shortcuts the system to only pass current through the cells indicated at 60'.

Referring to FIGS. 1 and 21, in general the power control board 24 comprises an AC input region 320, a power supply portion 322, and a DC portion 324. Of course these portions can be present in a variety of locations on the unit and are noted with the abstract labels to generally classify the operation of the electronic controls. In general the AC input region 320 comprises a terminal block 340 which in one form provides an input for 120 V, 13 amp regular power input that is conventional in North America of course the unit could be arranged for other inputs such as 220V. There is a transformer 342 which supplies low-voltage to the low-voltage power supply 350 described herein which is a 12V unit to supply various solenoids and functionality such as the pump 352 and the cooling fan 354 (see FIGS. 5B and 5C). It should be noted that the low-voltage power supply 350 also energizes the relays 228' and 244' as shown in FIG. 24. It should be further noted that in one form, the valves 228 and 244 operating the relays are 24V AC and of course these valves are controlled by the relays by the floats as described above. Of course any number of power controls could be utilized, but this is just one method of implementing the system.

There will now be a discussion of the first and second relays 360 and 362. On the AC portion 320, the relay 360 is, in one form, implemented prior to the conversion of alternating current to direct current. One reason for the position in the pre-direct current portion of the unit is because present analysis indicates there may be better longevity in contacts, and the current is simpler to handle when it is in an alternating current state. The relay 360 is controlled by the relay 362 which is described further herein, in particular with reference to circuit schematic in FIG. 24. When the circuit relay 360 closes, the relay provides current power to the power supply 350 (see FIG. 1). Of course this power supply is conventionally available to convert 120V AC to 120V DC. In one form, this power supply 350 has a current limiting feature whereby the current will not exceed a certain amount given the resistance between the anode and cathode. Of course, with the embodiment as disclosed in FIG. 25A, a simpler type of power supply can be utilized whereby the control of the amperage is by way of a change in the resistance effectively by altering which anode is utilized.

As shown in FIG. 24, the discharge fuse 366 is utilized to prevent voltage build-up between the anode and cathode. In other words, when the unit ceases production, there is hydrogen and oxygen in the various chambers. By way chemical potential energy, they can effectively operate as a fuel-cell producing electricity and inducing erosion and break down within the various metallic pieces in the passive conductors.

Still referring to FIG. 24, the ground wire is indicated at 370 and the 120V AC current is received at 372. As further shown in FIG. 24, there is a plurality of safety switches 374 where if they are all closed, the unit is in proper condition for operation. Therefore, as shown in FIG. 24, when the main relay 360 is de-energized, the unit shuts off. The relay 360 is de-energized when one of the switches 374 are open or otherwise hydrogen is not being produced and the power supply 350 (see FIG. 1) is not in operation.

Therefore, when the relay 360 is un-energized the schematic indications for switches in are shown in a manner as in FIG. 24 where the contacts 380 and 381 are closed, then the electrodes are in communication with the resistor or fuse 366, whereby this inhibits the formation of electricity as described above.

However, when the unit is activated, the contact 380 is in electrical communication with the conductor 384 whereby the resistor/fuse 366 is not in electrical communication, and the power supply 350 is in an operational state. Basically, direct current is fed to the electrodes schematically indicated at 383.

Now referring to the lower portion of the wiring schematic FIG. 24, the pump 391 is activated when the unit is turned on, and controlled by the relay 362 (see also in FIG. 22). The switch 402 as shown in FIG. 4 is a temperature switch. In a preferred form, this is the manual reset switch, and when it is thrown it must be depressed again, presumably by a certified technician to inspect the machine to see why the temperature increased beyond acceptable levels. The blower switch 400 as shown in FIG. 4 and schematically shown in FIG. 24 is normally open because the unit is initially cold. However, when the unit heats up, the temperature sensitive blower switch 400 closes and the blower unit 355 is activated (see FIG. 5C) and is part of a heat exchanger to cool the electrolyte fluid. Of course, a normal refrigeration type pump can be utilized to cool this fluid. In general the electrolyte fluid as it passes through the re-circulatory channel passes through the cooling grid 353 as shown in FIGS. 5A and 5B and the blower unit 355 as shown in FIG. 5C passes air therethrough to cool the electrolyte fluid.

With reference back to FIG. 24, 24V AC current is generated by the transformer 342. The AC current passes through lines 410 and through the normally closed switch and passes through the second relay 362. The switch member 412 provides electrical communication to the line indicated 414. As described above, when the array of switches 374 are closed when the unit is in proper functioning order and the relay 360 is activated allowing current to pass to the electrodes indicated at 383.

Now referring to FIGS. 25-51, there is shown another embodiment. For ease of utilizing identifying numerals, where possible, similar numeral designations to previous components will be utilized and the numbers will be incremented by 400.

Figure 31:
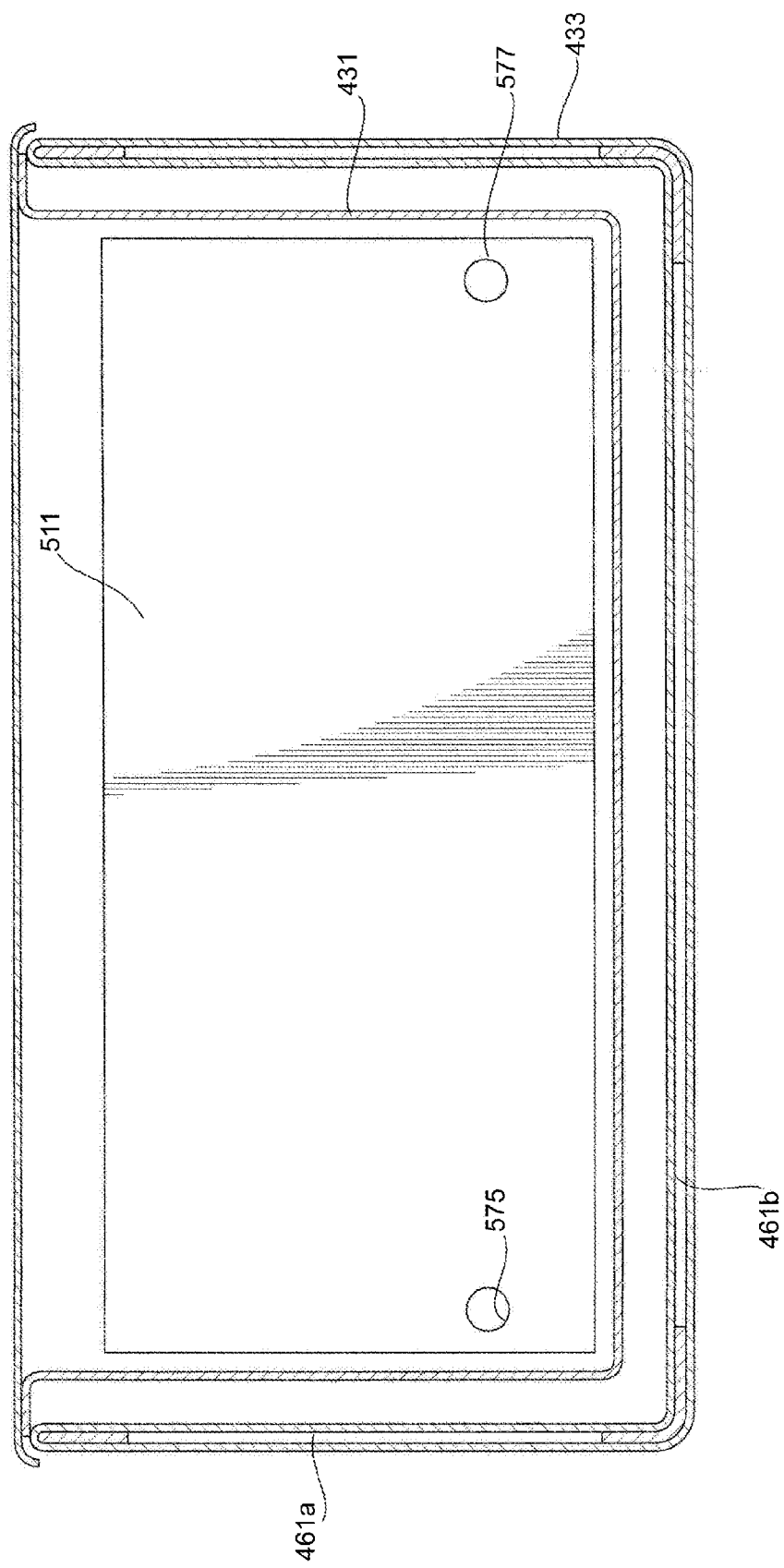
FIG. 31 is taken along line 31-31 of FIG. 26 showing and end plate.
Figure 32:
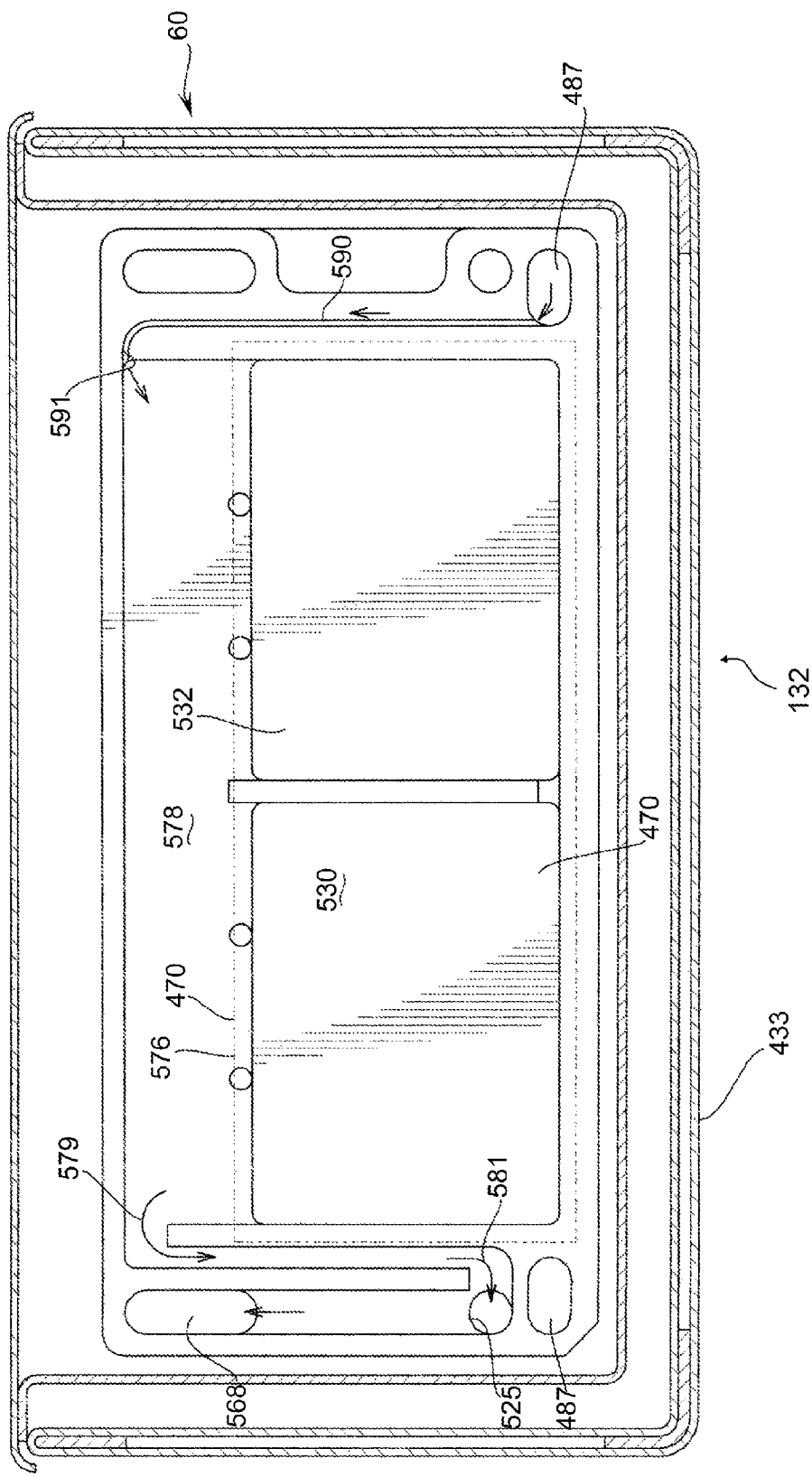
FIG. 32 is taken along line 32-32 of FIG. 26 showing a front view of a cell and illustrating the flow of the operating fluid therethrough in one form.

As shown in FIG. 25, there is an isometric view of the electrolyzer 420. The electrolyzer 420 in general comprises the hydrogen producing portion 422 and an operating fluid cooling system 423. As described above and as shown in FIGS. 5 and 5C, there is shown a heat exchanger 353 which is one form of cooling the internal operating fluid which is water, and in one form an\ electrolyte solution described further herein. The operating fluid cooling system 423 of the second embodiment as shown in FIGS. 25-51 is integrated with the casing structure to show one form of cooling the fluid while minimizing the footprint of the device. It should be noted that the isometric view in FIG. 25 would likely have a further encasement positioned therearound in an operating model where the outer containment structure 433 would be, for example, quite warm with the waste heat generated from the electrodes transferred to the operating fluid. As shown in FIG. 26, there is a top view of the hydrogen producing portion 422, which is comprised of a plurality of cells 434. The cells 434 are similar to the cells described above and as shown in FIG. 8-18; however, the modified cells shown herein have a slight advantage of the manifold channel 487 as shown in FIG. 32, which is different from the manifold channel 87 as shown in FIG. 14 where the throughput of the fluid is more electrically insular from the current in the form as shown in the second embodiment. The details of the plurality of cells 434, as shown in FIG. 26, will be discussed further herein. As further shown in FIG. 26, there is a contact plate 634 which is in communication with the active electrode 636. At the opposing longitudinal region there is a contact plate 638 which is in electrical communication with the active electrode 640. As discussed above, the electrodes 636 and 640 can either be anode or cathode, depending on the flow of the electrical current, to create either oxygen or hydrogen on either side of the passive electrodes which are interposed between the electric current. As further shown in FIG. 26, there is a schematic showing biasing members such as fans 642, which are configured to direct air through the open channel region 435 as shown in FIG. 27.

As shown in FIG. 26, the electrolyzer 420 further comprises a control system 426 which operates to circulate the operating fluid, separate the gas from the liquid, and further provide a water sensing system to replenish the fluid within the plurality of cells. Of course, the control system 426 could be separated over a wider array of components and not necessarily consolidated on one end portion of the electrolyzer. Further, the control system need not have all of the functionality discussed immediately above to be defined as a control system.

In general, the electrolyzer 420 as shown in FIG. 27 comprises an inner containment structure 431 and an outer containment structure 433. Interposed between the containment structures is the open channel region 435, which is configured to have air pass therethrough. As further shown in FIGS. 27 and 29, there is a float member 690 which measures the fluid level of the operating fluid contained within the inner containment structure 431. In general, the fluid level should be substantially level throughout the inner containment structure and throughout the plurality of cells. Therefore, the containment structure 431 generally operates as a type of bathtub for the operating fluid and the various components flooded therein with the operating fluid. An electric logic system can detect when the float sensor 690 determines there is a low level of operating fluid, and additional fluid can then be introduced by opening the valve 494, which would allow water (in a preferred form) to enter the system. If the electrolyte is used, the electrolyte in most forms will not be sacrificed and will remain within the inner containment structure 431. If electroplating is utilized for the various electrodes, then it is possible to not utilize an electrolyte which would be further described herein.

Therefore, there will first be an overall discussion of the fluid cooling system 423 with reference to FIGS. 27-32.

In FIG. 28, there is shown an isometric view of the outer containment structure 433. It should be noted that there can further be a secondary outer containment structure which is schematically indicated by the hashed line 488. This secondary outer containment structure could extend around the primary outer containment structure 433. In this form, this outer containment structure would provide some insulation from the potential heat buildup of the operating fluid passing through the outer containment structure as described immediately below. As shown in FIG. 25, the various output lines would extend in the outer portion of the containment structure, where for example the water/electrolyte mixture fluid entry port 492 having the valve 490 would for example extend through the outer containment structure as well as the hydrogen and oxygen exit lines. In general, this containment structure comprises an inner surface 437 which in one form is a channel-like region. The inner surface is a sufficient width and height to allow the outer surface of the inner containment structure 431 to be positioned therein providing the open channel region 435 as shown in FIG. 27.

Referring again to FIG. 28, it can be appreciated that there are first communication ports 441 and 443 which in one form are positioned on lateral regions of the outer containment structure on the first and second lateral members 457 and 459. Further, there is a second communication port 445. In general, the communication ports 441 and 443 in one form are discharge ports passing fluid from the control system 426 to the cooling channels 461. Further, the second communication port 445 is configured to pass the operating fluid back to the control system and in one form directly to the fluid biasing member 489 (see FIG. 27) which will be described further herein. Referring now to FIG. 28, it can be appreciated that the cooling channels 461 are comprised of an inner plate 463 and an outer plate 465. As shown in FIG. 27, the cooling channel has a first section 461a and a second section 461b. The first and second sections are separated by a separation member 467 which is best shown in FIG. 28. There is further an additional separation member 469.

FIG. 28 best shows the path of the fluid flow to and from the control system 426. As shown in FIG. 27, the operating fluid exits the control system 426, and in particular, the central chamber 491. The fluid passes into the first section 461a and extends longitudinally down this section and takes a downward laterally inward path to the second section 461b. The arrows 487 show the general path of the fluid where the fluid travels in the longitudinally forward direction back up through the second section 461b of the cooling channel and passes through the second communication port 445. It should be noted that the inner surface 437 of the outer containment structure 433 is thermally conductive and transfers heat from the inner and outer surface regions thereof.

Referring back to FIG. 26, it can be seen that the inner containment structure 431 is provided with an inner surface 491 which is slightly greater than the outer surface of the plurality of cells 422. In general, the plurality of cells 422 are configured to have an operating fluid, such as water and more specifically water with an electrolyte pass through a manifold channel 487. As described later in more detail, the manifold channel is comprised of the plurality of stacked cells which each have a surface-correlating location to form an elongate channel which is best shown in FIG. 26. To provide a preview of the discussion to come, the manifold channel 487 in the right hand portion of FIG. 32 is in fluid communication with the fluid entry channel 590, which has an entry port 591 in the upper portion of the hydrogen sub-chamber 132. The description of the fluid entry system and the gas removal will be described further herein with a detailed description of the plurality of cells. At any rate, the operative fluid is configured to come from the control system 426 as shown in FIG. 26, and travel down along the manifold 487 where it exits from the back plate 511 as indicated by arrows 493. The fluid then travels along the inner surface 491 of the inner containment structure 431 back to the control system chamber 513. Thereafter, now referring to FIG. 27 which is taken along line 27-27 of FIG. 26, the fluid exits the control system chamber 513 and enters into the cooling channel 461a in a manner as best shown and described above with reference to FIG. 28.

Figure 29:
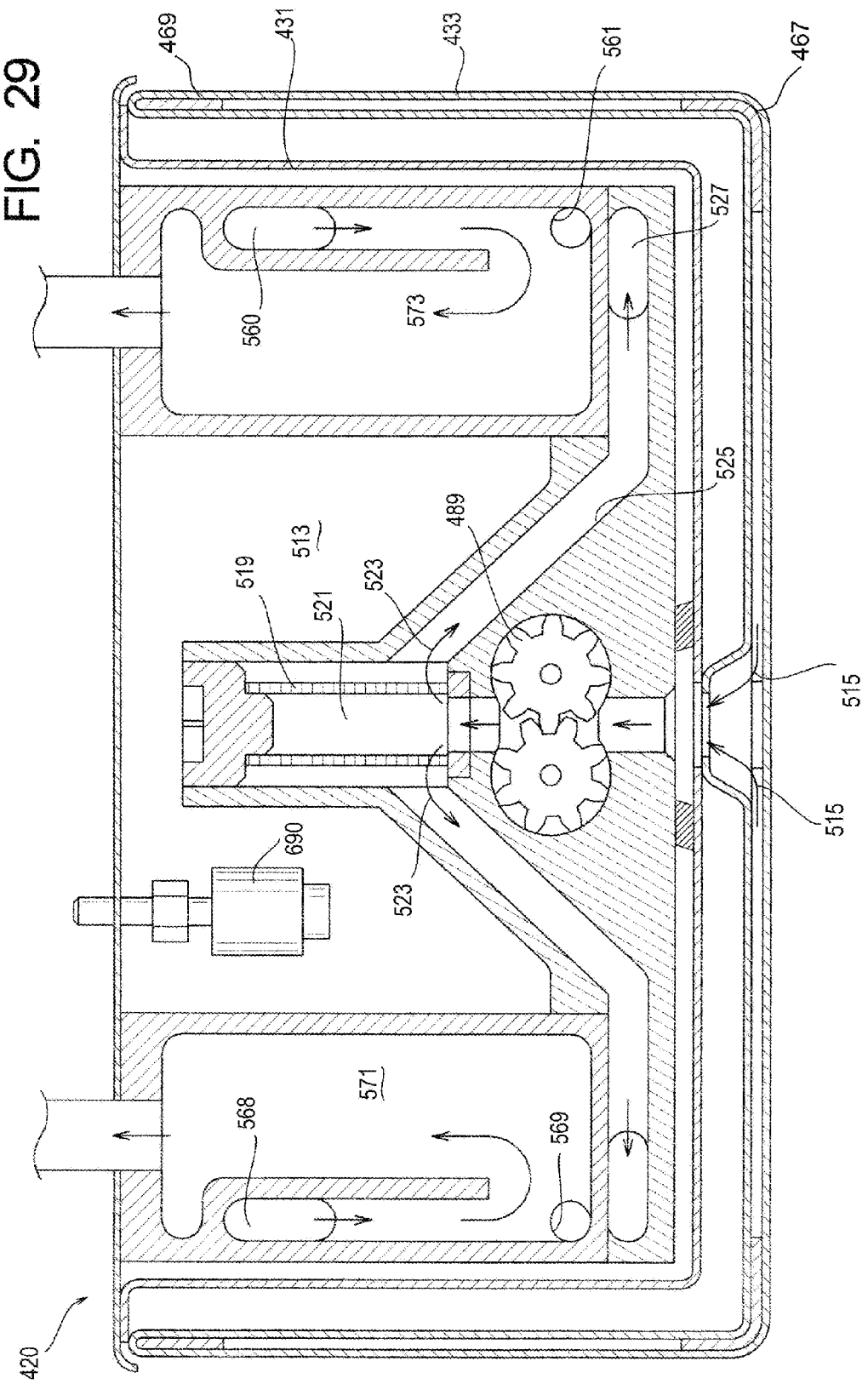
FIG. 29 is a cross-sectional view taken along line 29-29 of FIG. 26 showing the circulation of the operating fluid through a portion of the electrolyzer 420.

Referring now to FIG. 29, it can be appreciated that the fluid reenters the control system chamber 513 as shown by arrows 515 in FIG. 29. The fluid biasing mechanism 489 in one form is a gear pump, but could be a plurality of types of pumps or mechanisms to reposition fluid.

After the fluid has passed through the gear pump, it extends radially through the filter 519 in one form. The filter can be cylindrical and have an inner chamber region 521 where the water is configured to pass therethrough as indicated by the arrows 523. In this form, the water extends through the lower subline 525 and into the longitudinal extending passage 527 which is in communication with the manifold channel 487 as shown in FIG. 26. Therefore, it can be appreciated that the complete circuit of the fluid is configured to replenish the fluid level throughout the plurality of subchambers 532 and 530 described herein, as well as recirculate the fluid through the fluid cooling system 423 to properly transfer heat therefrom so is the unit does not overheat. It should be reiterated that in one form, the electrolyzer 420 is at atmospheric pressure and is not a pressurized unit. Therefore, the operating fluid, which in the preferred form is water or water with an electrolyte mixture, should be maintained well below the boiling point and preferred form at the prescribed range of 140-180 degrees F. In one form the material comprises cells as plastic which can function up to 180 degrees F.

Figure 45:
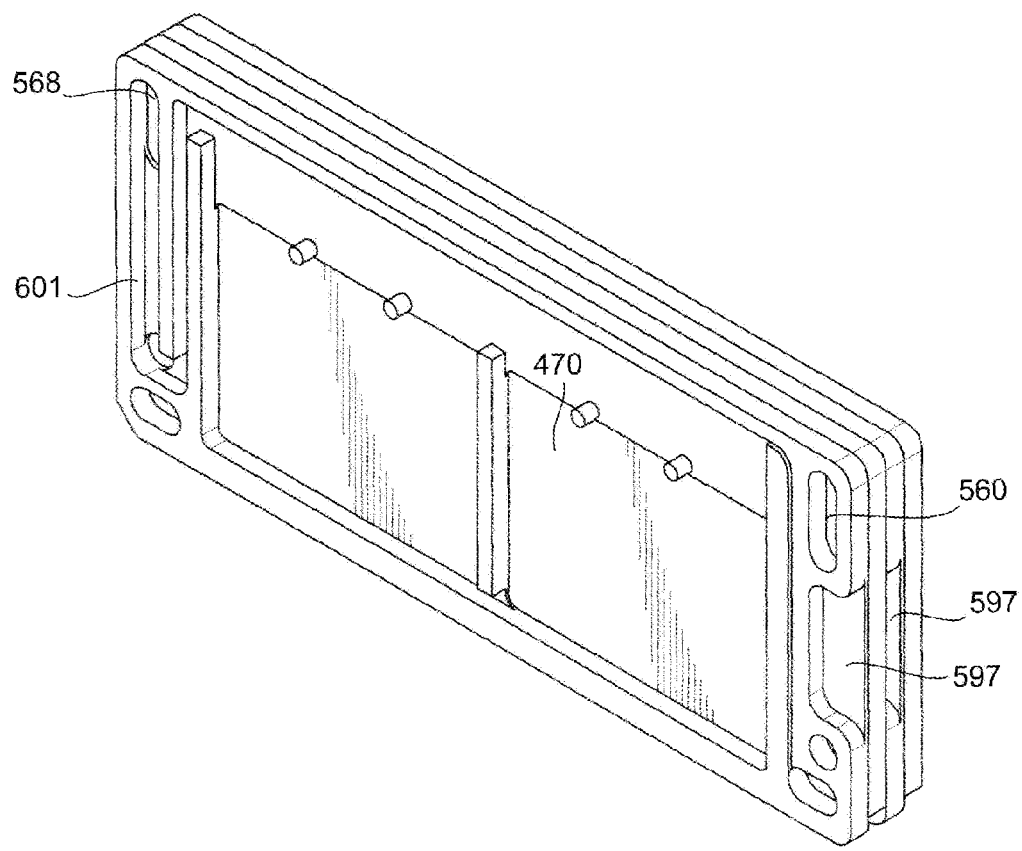
FIG. 45 shows four cell sections comprising (for example) four cells.

Of course other forms of the unit could be pressurized to increase the boiling level of the operating fluid as well as decrease the bubble size of the hydrogen and oxygen, which is produced on either side of the passive electrode 70 as shown in FIGS. 12 and 470 as shown in FIG. 45 in the second embodiment. In one form the members as shown in FIG. 12 could be vibrated so the prescribed desirable frequency to shake the bubbles loose from the electrode 70. In one form the resonant frequency of the electrode can be determined and match a frequency generated to a resonant frequency or thereabouts to induce a vibration thereon to further stimulate the removal of the oxygen hydrogen bubbles from the surface. For example, direct current passes in the unit between the anode and cathode but the frequency generator can be utilized to alternate the amplitude of the amperes traveling through.

Figure 30:
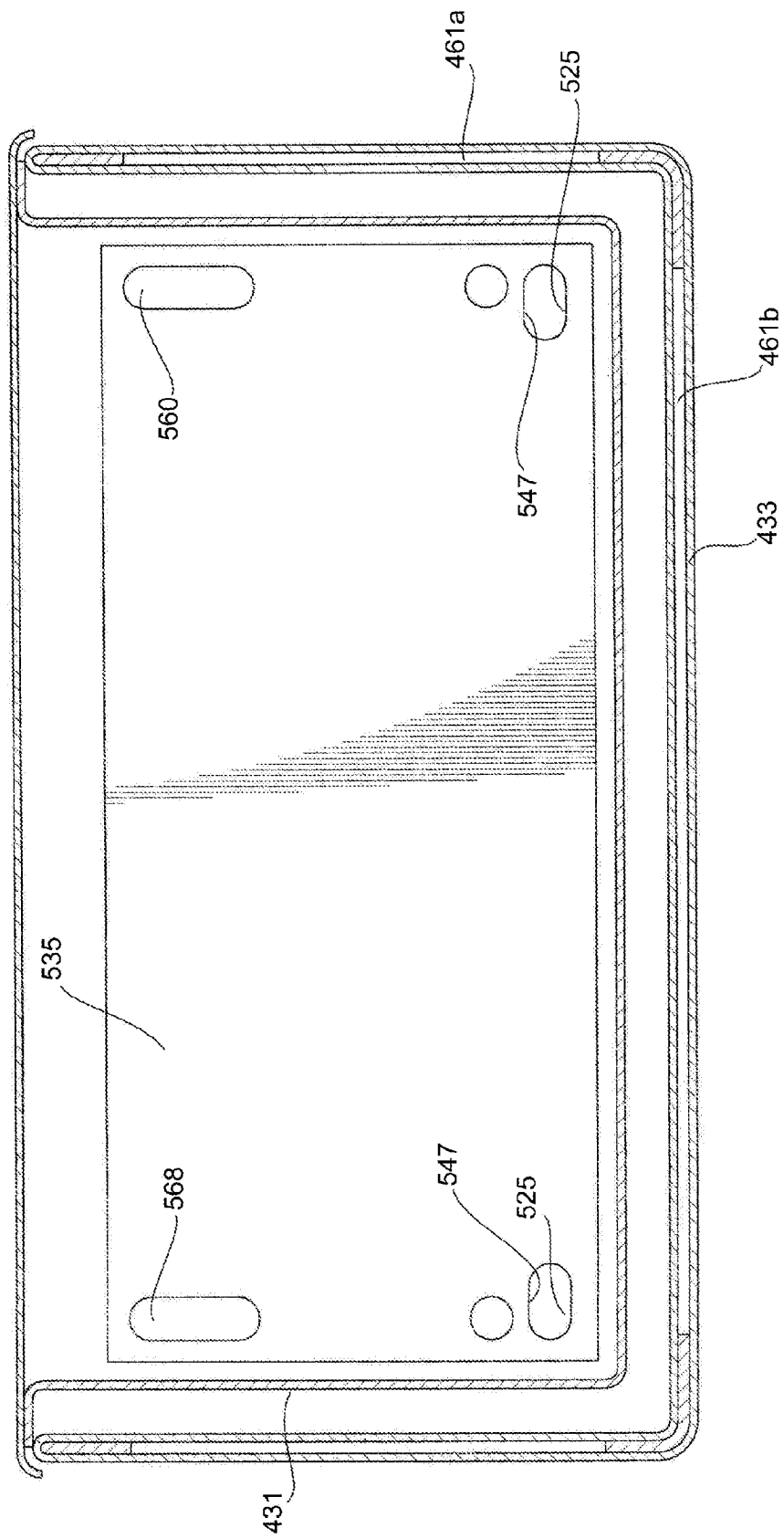
FIG. 30 is a sectional view taken along 30-30 of FIG. 26 showing an end plate and the various passages extending along the longitudinal axis of the unit which includes hydrogen and oxygen connection lines as well as an operating fluid manifold in the lower portion of the plate.

As shown in FIG. 30, the first end plate 535 is shown, and the port 547 is configured to communicate the manifold channel 487 (see FIG. 26) with the control system chamber 513. It should be further noted that the hydrogen and oxygen collection lines 560 and 568 as shown in FIG. 30 are positioned in the upper region of the plurality of cells 434 (see FIG. 26), and FIG. 30 shows the first end plate 535 which provides communication of the lines 568 and 560 to the oxygen and hydrogen collection chambers 571 and 573 as shown in FIG. 29. Further shown in FIG. 29 are the secondary passageways 569 and 561 which allow a certain amount of gas to pass therethrough and extend in the longitudinal first direction from the right to left-hand portions, as shown in FIG. 26, to the collection chambers. As shown in FIG. 31, it can be seen that the second end plate 511, otherwise referred to as the backplate 511, provides openings for the electrolyte fluid to pass therethrough, indicated at 575 and 577. In one form the opening 575 in FIG. 31 could be reduced in this cross-sectional area to increase the fluid resistance passing through to incite greater pressure within the manifold 47 as shown in FIG. 26 to induce to fluid flow into the hydrogen and oxygen subchambers through the first passage 590 as shown in FIG. 32.

Figure 33:
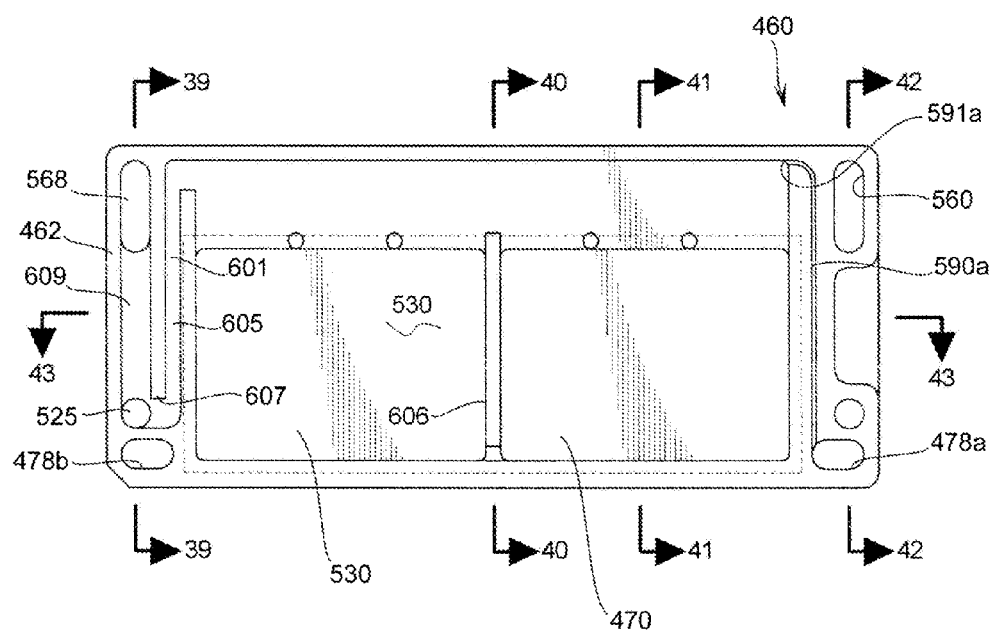
FIG. 33 shows a front view of a cell with the electrode which in one form is a metallic electrode shown in the central portion of the cell.

Referring now to FIG. 33, there is shown a front view of a cell 460 of the second embodiment. The cell 460 is similar to the cells shown in FIGS. 9-11, described above with a few modifications. In general, each of the cells are made in one form by matching pieces separated by an electrode 470 and a membrane 466 (see FIG. 44).

With reference to FIG. 33, there will be a general discussion of the various sectional views looking at the first section member 462. In general, the first section members are mirror image of the second section member 464, although it should be reiterated that this need not be the case. As shown in FIG. 39, it can be appreciative that the oxygen passageway 568 is in communication with the second leg 609, which in turn is in communication with the oxygen subchamber. FIG. 40 is a center cross section showing the middle section separating member 606, which is provided with the fluid passageway 602 in the lower portion, so the lateral regions of the subchamber 530 (see FIG. 32) can communicate with one another.

FIG. 41 shows a cross-section of the subchamber 530. It should be noted that the spatial elements 610 are provided on both of the section members and aid in maintaining the separation between these adjacent members. FIG. 42 shows the cutout region 597 described below, and further illustrates the hydrogen passageway 560.

FIG. 43 shows a sectional view in the horizontal plane, perpendicular to a vertical axis, showing the first leg 605 of FIG. 33 and second leg 609 of the oxygen gas trap 601. Further, on the right-hand side there is shown the fluid entry channel 590a, which allows input from the manifold channel 487.

Figure 36:
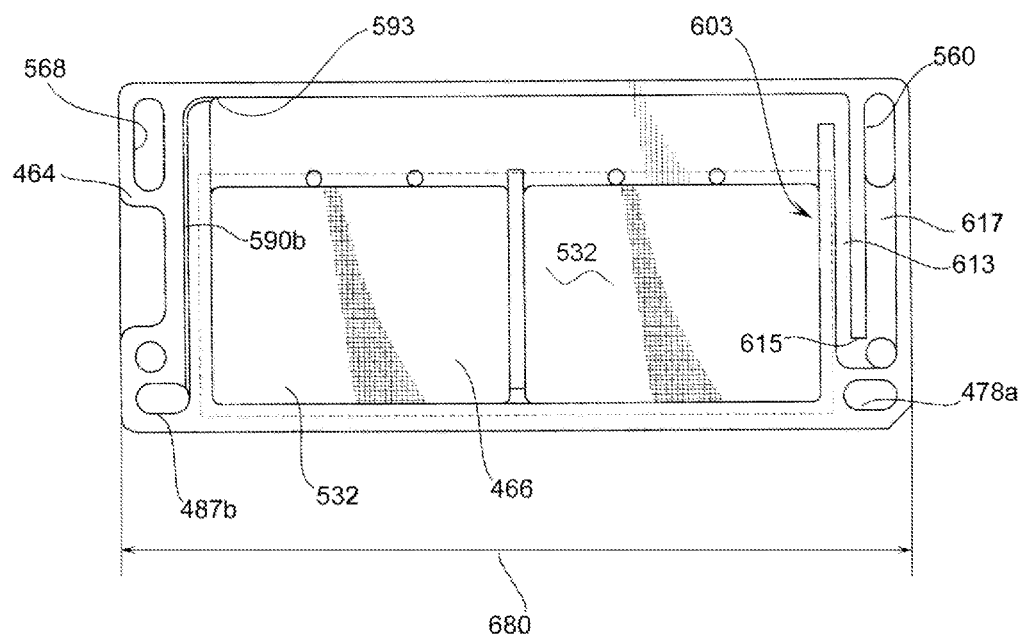
FIG. 36 shows a front view of a second section member with a membrane which in one form is a hydrophobic membrane positioned in the rearward portion of the cell.
Figure 37:
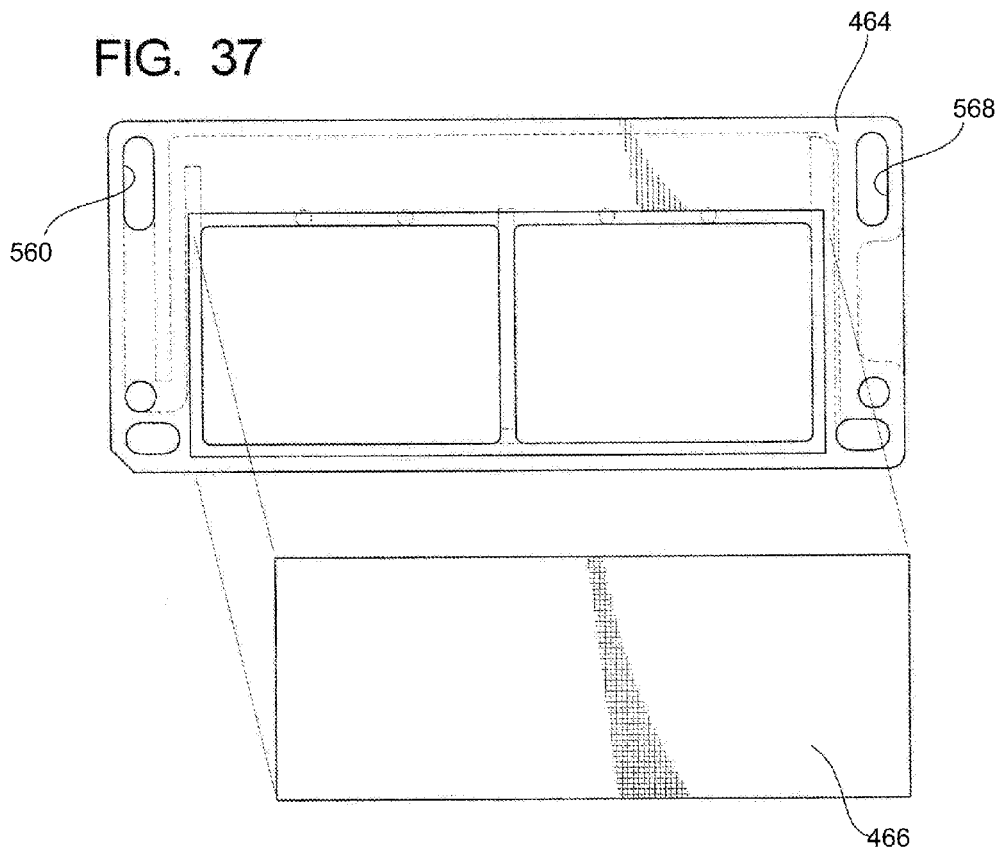
FIG. 37 shows a rear view of the second section showing the membrane in a partial exploded manner.

Referring now to FIGS. 33 and 36, it can be appreciated that these two members are front views of first and second sections 462 and 464. Referring to FIG. 33, the first section 462 in general has the electrode 470 positioned in the rearward portion, and the front part of the electrode 470 defines the oxygen subchamber 530 (see FIG. 12). The second section 464 as shown in FIG. 36 would be positioned in the front portion and the rearward portion of the member shown in FIG. 33 to form one have of the cell members of the plurality of cells 434 (as shown in FIG. 26). It should be noted that In the case of having water without electrolyte the membrane 466 could be a proton exchange membrane that can be utilized to facilitate the electrical current passing through. Of course in this form, the unit could further function as a fuel cell by operating the various components of the hydrogen and oxygen separation in reverse meaning hydrogen is supplied to the unit so as to induce electric current which is common in the art of fuel cells. References such as U.S. Pat. No. 4,037,023 and U.S. Pat. No. 5,231,954 are incorporated by reference.

FIG. 33 shows the surface defining the manifold channel, with the right-portion referred to as 478a and the left-hand portion referred to as 478b. The manifold channel 478a is shown in FIG. 33 where the fluid entry channel 590a extends vertically and is configured to dispense the operating fluid through the entry port 591a. Therefore, as the fluid flows down the right-hand manifold channel 478a, fluid is directed upward through the fluid entry channel 590a to flood the oxygen subchamber 530.

As described in detail above, when a current is passed through the plurality of cells, gas is produced in a similar manner as shown in FIG. 12. As shown in FIG. 33, as gas is produced, the oxygen passes through the oxygen gas trap past the first leg 605 downward past the lower point 607 and then along the second leg 609 upwardly to the oxygen connection line 568 where the oxygen gas extends longitudinally along the plurality of cells 434 to the oxygen collection chamber 571 as shown in FIG. 26.

It should be noted that in FIG. 33 the lower subline 525 further allows for a certain amount of gas to pass therethrough. Experimentation has found that there is a fair amount of frothing that can occur when gases mate, and the gas trap mechanisms 601 and 603 (as shown in FIGS. 33, 36) are configured to aid in containing the foaming within the oxygen and hydrogen subchambers.

Now referring to FIG. 36, it can be appreciated that the second section 464 is shown which is substantially similar to the first section 462 shown in FIG. 33. In fact, FIG. 33 and FIG. 36 are substantially mirror images of one another, with the exception of the separating material of the electrode 470 in FIG. 33 and the membrane 466.

Referring again to FIG. 36, it can be seen that in front portion of the membrane 466, there is defined a hydrogen subchamber 532 where the second section 464 could be placed behind the first section as shown in FIG. 33 and a closed chamber would be formed, with hydrogen bubbles forming on the rearward portion of the electrode 470 of FIG. 33 in a similar manner as shown in FIG. 12.

Referring yet again to FIG. 36, in a similar manner, the manifold channel 478b is configured to deliver the operating fluid along the plurality of cells, which have sufficient pressure to force the operating fluid up the fluid entry channel 590b and out the entry port 593 into the hydrogen subchamber 532. The membrane 466 is similar to the membrane 66 described above, and in a preferred form the membrane is a hydrophobic material which repels the surface tension around the bubbles of oxygen and hydrogen to allow them to pass vertically upwardly. In the case of FIG. 36, the hydrogen bubbles flow upwardly (of course it should be noted that the creation of hydrogen and oxygen is contingent on the direction of the current which in one form is a direct current) through the hydrogen gas trap 603. In general, hydrogen gas will pass down the first leg 613 past the low point 615 to the upper leg 617 and along the hydrogen connection line 560. The gas then travels in a longitudinally forward direction to the hydrogen collection chamber 573 as shown in FIG. 26 and FIG. 29. FIG. 29 shows the cross-sectional view where hydrogen and oxygen are dispersed from their respective chambers 573 and 571 vertically outward towards the extraction ports 673 and 671 as shown in FIG. 25. Referring now to FIG. 32, it can be appreciated that the operating fluid passes through the manifold 487, through the fluid entry channel 590, and into the oxygen subchamber 530. In general, it is desirable to have the fluid level at least the height of the member at the upper portion indicated at 576. The fluid level is desirably below the upper perimeter region 576 of the electrode member within the oxygen subchamber 530 such that the current passes through the electrode member to produce the hydrogen and the oxygen. As described above in the first embodiment of the cell 60, the upper region of the subchamber indicated at 578 is provided so that when the bubbles form, the net volume raises within the subchambers. One issue introduced above is that of foaming. The gas traps 601 and 603 of FIGS. 33-36 help prevent the disbursement of the foam throughout the system. In other words, the fluid can have a tendency to bubble excessively and create a foam-like air gas composition which can flood the unit. As shown in FIG. 32, the passage of the gas indicated at arrow 579 downward to the lower region at 581 tends to prevent the foam bubbles from propagating. A portion of the gas can then exit down the lower subline 525 and the remainder of the gas is channeled upwardly through the oxygen passageway 568 as shown in FIG. 32. Of course, a similar type of gas removal occurs on the opposing side of the electrode 470 for escape of the hydrogen gas on the opposing lateral region through the gas trap 603 as shown in FIG. 36.

Figure 34:
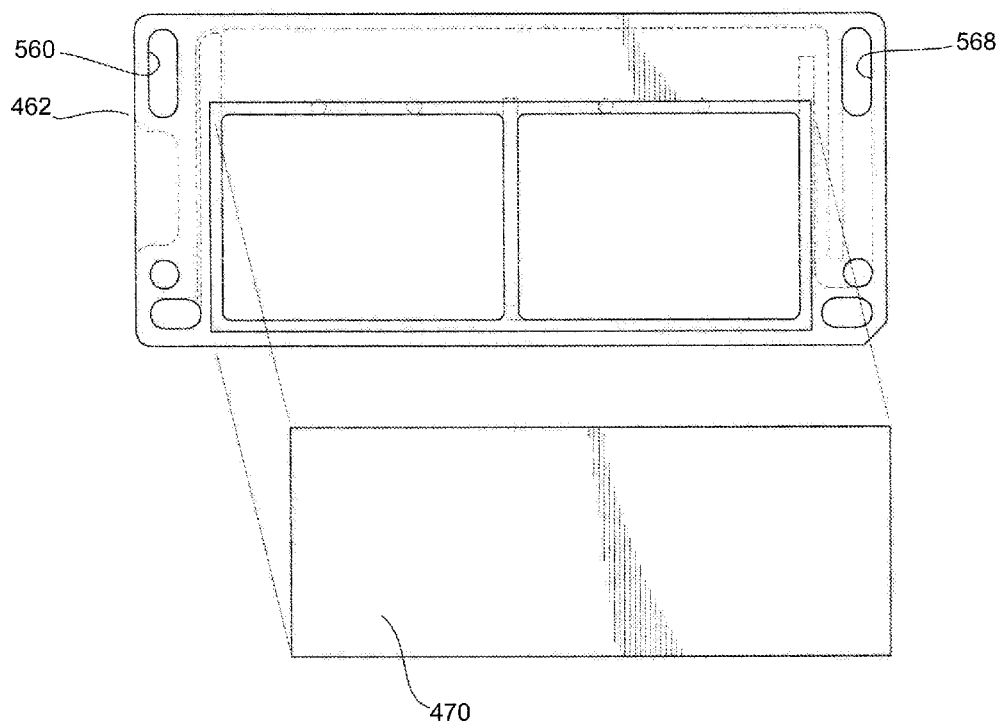
FIG. 34 shows a rear view of a first section member of a cell where an electrode is positioned thereon.
Figure 35:
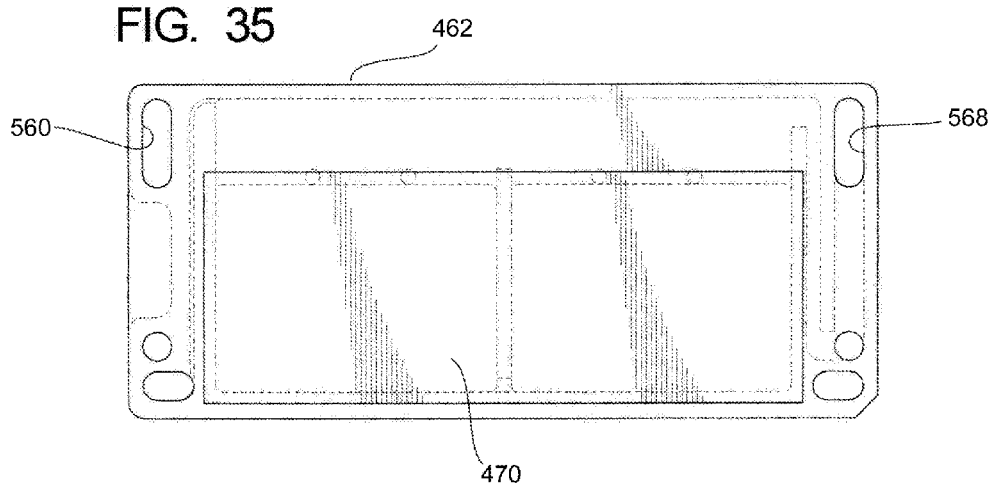
FIG. 35 shows the electrolyte positioned adjacent to the first section member of a cell.
Figure 38:
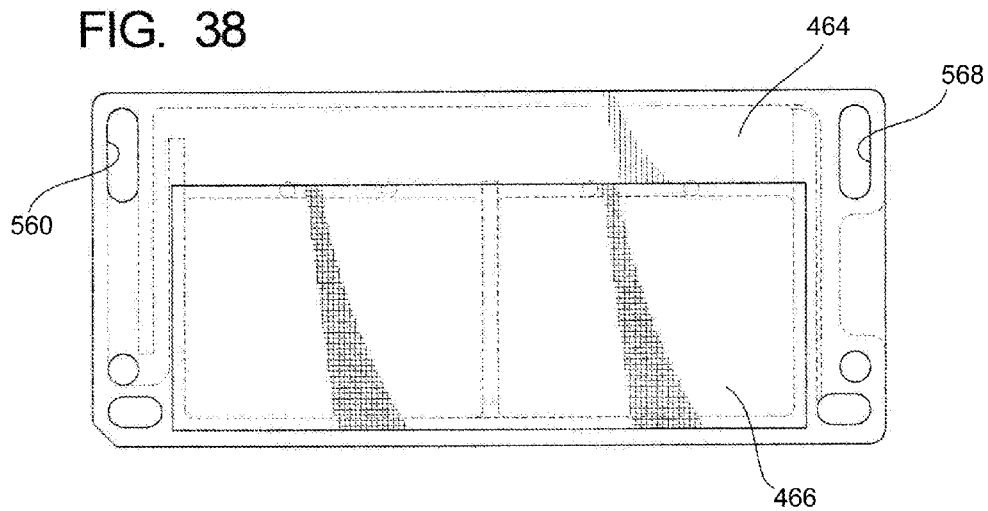
FIG. 38 shows the membrane positioned adjacent to the rearward surface of the second section of a cell.

With the foregoing description in place, there will now be a discussion of the assembly of the second embodiment of the cells 460. As shown in FIG. 34, there is a first section 462 where in the rearward portion the electrode 470 is positioned thereagainst. FIG. 35 shows the electrode placed against the rearward surface of the first section 462. Now referring to FIG. 37, there is shown a second section 464 with a membrane member 466 placed upon the rearward surface of this section. FIG. 38 shows the membrane attached to the rearward surface of the second section 464. The membrane could be attached by way of an adhesive, or by simply being fitted thereagainst. Both the electrode 470 and the membrane 466 can be attached in a similar manner.

In one form the electrode can have electrode plating positioned thereon the electrode. In one form electroplating of the electrode(s) 470 can reduce the resistance barrier for electrons to pass because of the surface effects. Effectively, the resistance drops and the lower voltage per-cell could be utilized between 1.65 V plus or minus 20% which could be 80-85% efficiency as present analysis indicates.

Figure 44:
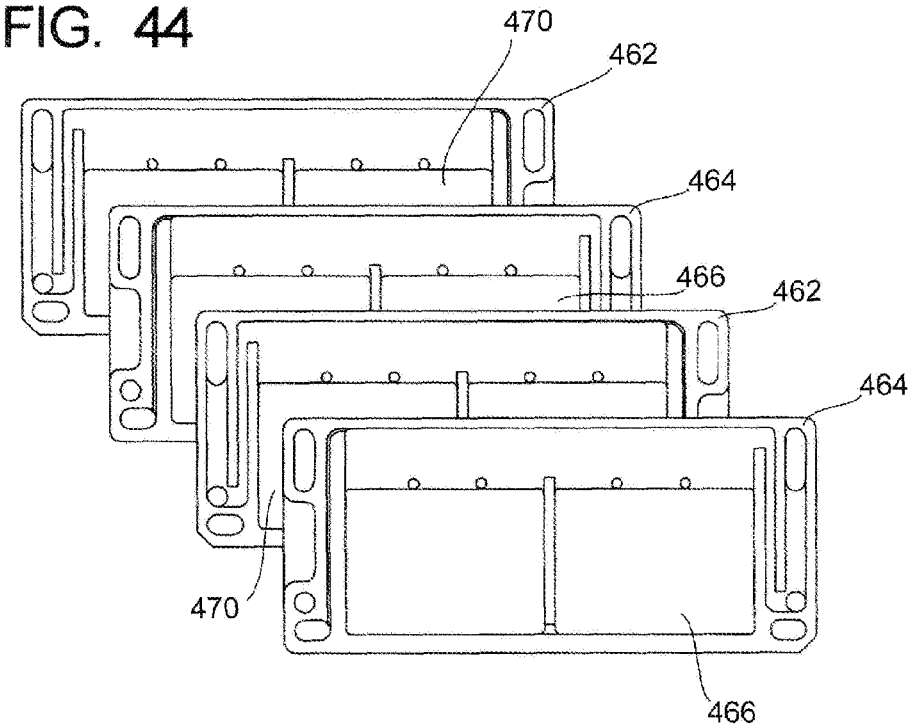
FIG. 44 shows a plurality of cell sections in a partially exploded view.

Now referring to FIG. 44, there is shown, in a partially exploded view, a plurality of first and second section members 462 and 464 which collectively will comprise a plurality of cells, and more particularly, two cells. The lower right plate is a plate having a membrane 466 positioned thereon, and it can be appreciated that when the plurality of section members are positioned adjacent to one another as shown in FIG. 45, the cells can be created to any prescribed length. As best shown in FIG. 45, the surface defining the cutout region 597 is provided which has the desirable effect of reducing the amount of material required to make each section. Further, when the sections are plastic injected molded, this region provides a cutout portion so there is not a large pooling of hot plastic injected material requiring a greater cool time in this region.

Figure 46:
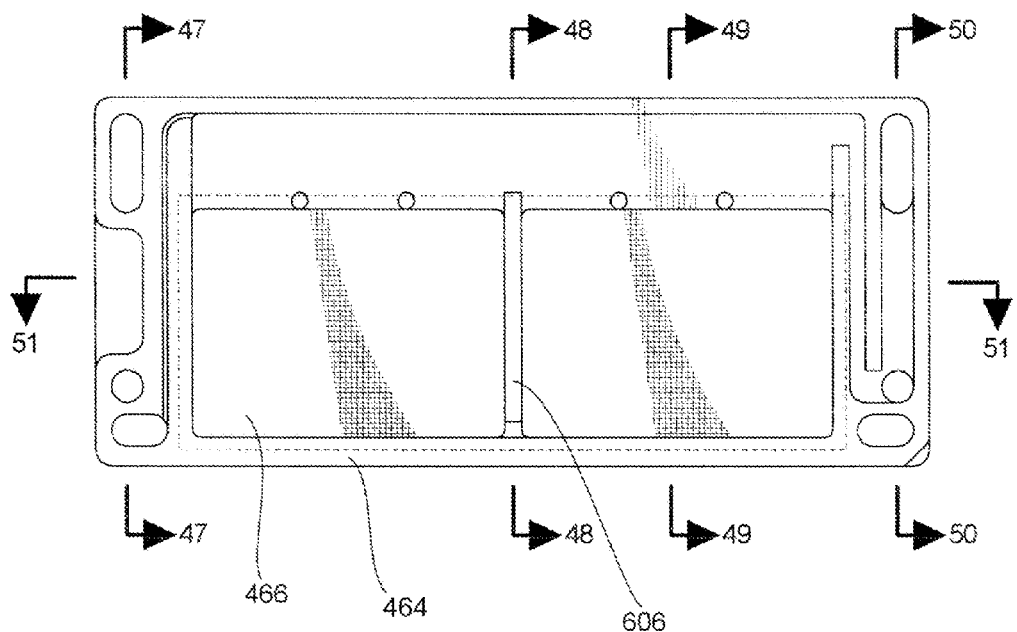
FIG. 46 shows a second cell section which in one form works in conjunction with a first cell section to form a stackable cell.

Referring now to FIG. 46, there is shown a front view of a second section member 464 having the membrane 466 positioned thereon. This front view in FIG. 46 is a front view of the collection of first and second members 462 and 464 as shown in FIG. 45. Because the second section 464 in this form is substantially a mirror image from left to right of the first section, the disclosure and description of this material is relevant to the first section member 462. Of course, the members need not be mere identical copies of one another.

Sequentially going from the sectional figures from FIG. 46, FIG. 47 shows a sectional view of the oxygen passageway 568 and illustrates how the oxygen subchamber 530 communicates with this passage. It can be further seen how the lower subline 525 is in communication in the lower region of the plurality of cells.

Now referring to FIG. 48, there is shown a sectional view along the center portion of the cells where the thin sheets of electrode (which in one form is a metallic member 470) and the membrane 466 are interposed between the first and second sections 462 and 464. The separating member 602 as shown in FIG. 46 helps maintain the volume of each of the oxygen and hydrogen subchambers and keep a separation of the membrane and the electrode. Of course it can be appreciated that the upper portions of the oxygen subchambers 530 and the hydrogen subchambers 532 are shown in the upper portion of FIG. 40 above the separator member 606.

Now referring to FIG. 50, there is shown the opposing view of FIG. 47 where the hydrogen subchambers 532 are in communication with the hydrogen passageway 560. It can be appreciated that the oxygen subchamber 530 is not in communication with the hydrogen passageway 560.

FIG. 51 shows the sectional view taken at line 51-51 of FIG. 46 illustrating the various subchambers as well as the cutouts 597 this view illustrates the various passages of the p-trap mechanisms for the hydrogen and oxygen for purpose of removing the gas from their respective subchambers.

While the present the invention is illustrated by description of several embodiments and while the illustrative embodiments are described in detail, it is not the intention of the applicants to restrict or in any way limit the scope of the appended claims to such detail. Additional advantages and modifications within the scope of the appended claims will readily appear to those sufficed in the art. The invention in its broader aspects is therefore not limited to the specific details, representative apparatus and methods, and illustrative examples shown and described. Accordingly, departures may be made from such details without departing from the spirit or scope of applicants' general concept.

Therefore I claim:

1. An electrolyte replenishment system for a modular electrolyzer having a plurality of cells each cell including a first gas production chamber and a second gas production chamber with a gas impermeable wall there between, wherein each cell is at least partially filled with an electrolyte fluid up to an operating fluid level, the electrolyte replenishment system comprising:
   a. a first gas receiving chamber in gaseous communication with the first gas production chamber of each cell;
   b. a first gas receiving chamber inlet to the first gas receiving chamber from the first gas production chamber of each cell, the first gas receiving chamber inlet at a point below the operating fluid level of the electrolyzer;
   c. a second gas receiving chamber adjacent the first gas receiving chamber in gaseous communication with the second gas production chamber of each cell;
   d. a second gas receiving chamber inlet to the second gas receiving chamber from the second gas production chamber of each cell, the second gas receiving chamber inlet at a point below the operating fluid level of the electrolyzer;
   e. a partial separating wall between the first as receiving chamber and the second gas receiving chamber; and
   f. a surface defining a fluid passageway between the first gas receiving chamber and the second gas receiving chamber, the fluid passageway below the operating fluid level of the electrolyzer.

2. The electrolyte replenishment system as recited in claim 1 further comprising:
   a. an electrolyte fluid inlet in fluid communication with the first gas receiving chamber and second gas receiving chamber; and
   b. wherein the electrolyte fluid inlet is in fluid communication with the first gas receiving chamber and second gas receiving chamber through a plurality of fluid inlet orifices wherein all such fluid inlet orifices are below the operating fluid level, and
   c. the orifices forming a flame protection system.

3. The electrolyte replenishment system as recited in claim 2 further comprising;
   a. a fluid height sensor system in fluid communication with the first gas receiving chamber and second gas receiving chamber;
   b. the fluid height sensor system detecting the actual fluid level within the first gas receiving chamber and second gas receiving chamber; and
   c. wherein the fluid height sensor system actuates valves and or pumps for input and/or output of fluid from the first gas receiving chamber and second gas receiving chamber.

4. A unit for production of oxygen and hydrogen gas from an electrolyte fluid, the production unit comprising:
   a. a cell grid comprising a plurality of hydrogen subchambers and oxygen subchambers, a manifold channel providing an electrolyte fluid to be passed there through and distributed to the oxygen and hydrogen sub-chambers;
   b. wherein the manifold channel is below an operating electrolyte fluid level of the cell grid;
   c. a first electrode positioned at one longitudinal end of the cell grid;
   d. a second electrode positioned at a second longitudinal end of the cell grid wherein a voltage differential between the first and second electrode induces an electric current passing through the cell grid;
   e. a passive electrode interposed between the electric current so as to produce oxygen in the oxygen subchamber and hydrogen in the hydrogen subchamber where the manifold channel provides an operating fluid to the oxygen and hydrogen subchambers by way of an entry port positioned in an upper region well above the operating electrolyte fluid level of at least one of the oxygen and hydrogen sub-chambers above so as to maintain an electric flux current through the manifold channel to be less than an average electric flux current through the oxygen and hydrogen sub-chambers.

5. The unit as recited in claim 4 where the manifold channel provides a communication line dispersing electrolyte into the oxygen and hydrogen subchambers separately and the manifold channel directs fluid to a longitudinal end portion of the plurality of cells.

6. The electrolyzer as recited in claim 4 where the operating fluid is an electrolyte solution.

7. The electrolyzer as recited in claim 6 where a membrane is interposed between at least one of two passive electrodes in part forming hydrogen and oxygen subchambers, the membrane having properties of allowing ions to pass there through.

8. The electrolyzer as recited in claim 4 where the operating fluid is a nonelectrolyte solution.

9. The electrolyzer as recited in claim 8 where at least one of the passive electrodes are electroplated.

* * * * *